(12) United States Patent
Murtaza et al.

(10) Patent No.: US 11,354,084 B2
(45) Date of Patent: Jun. 7, 2022

(54) OPTIMIZING AUDIO DELIVERY FOR VIRTUAL REALITY APPLICATIONS

(71) Applicant: Fraunhofer-Gesellschaft zur Förderung der angewandten Forschung e.V., Munich (DE)

(72) Inventors: Adrian Murtaza, Nuremberg (DE); Harald Fuchs, Röttenbach (DE); Bernd Czelhan, Erlangen (DE); Jan Plogsties, Fürth (DE); Matteo Agnelli, Nuremberg (DE); Ingo Hofmann, Nuremberg (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 21 days.

(21) Appl. No.: 16/845,602

(22) Filed: Apr. 10, 2020

(65) Prior Publication Data

US 2020/0278828 A1 Sep. 3, 2020

Related U.S. Application Data

(63) Continuation of application No. PCT/EP2018/077770, filed on Oct. 11, 2018.

(30) Foreign Application Priority Data

Oct. 12, 2017 (EP) ..................... 17196259

(51) Int. Cl.
*G06F 3/12* (2006.01)
*G06F 3/16* (2006.01)
(Continued)

(52) U.S. Cl.
CPC ......... *G06F 3/165* (2013.01); *G02B 27/0093* (2013.01); *G02B 27/0179* (2013.01);
(Continued)

(58) Field of Classification Search
CPC .......... G06F 3/165; G06F 3/012; G06F 3/167; G02B 27/0093; G02B 27/0179; G02B 2027/0187; H04L 29/0651
(Continued)

(56) References Cited

U.S. PATENT DOCUMENTS 10,600,153 B2   3/2020  Roimela et al.
2002/0103554 A1* 8/2002  Coles .................. G08C 13/00
                                                    700/94
(Continued)

FOREIGN PATENT DOCUMENTS

CN      101299809 A      11/2008
CN      105939482 A      9/2016
(Continued)

OTHER PUBLICATIONS

Shinji Matsumoto, "Office Action for JP Application No. 2020-520204", dated Jun. 3, 2021, JPO, Japan.
(Continued)

*Primary Examiner* — Jin Ge
(74) *Attorney, Agent, or Firm* — Novick, Kim & Lee, PLLC; Jae Youn Kim; Jihun Kim

(57) ABSTRACT

There are disclosed techniques, systems, methods and instructions for a virtual reality, VR, augmented reality, AR, mixed reality, MR, or 360-degree video environment.
In one example, the system includes at least one media video decoder configured to decode video signals from video streams for the representation of VR, AR, MR or 360-degree video environment scenes to a user. The system includes at least one audio decoder configured to decode audio signals from at least one audio stream. The system is configured to request at least one audio stream and/or one audio element of an audio stream and/or one adaptation set to a server on the basis of at least the user's current viewport and/or head
(Continued)

orientation and/or movement data and/or interaction metadata and/or virtual positional data.

77 Claims, 18 Drawing Sheets

(51) Int. Cl.
    *G02B 27/00* (2006.01)
    *G02B 27/01* (2006.01)
    *G06F 3/01* (2006.01)
    *H04L 65/70* (2022.01)
(52) U.S. Cl.
    CPC .............. *G06F 3/012* (2013.01); *G06F 3/167* (2013.01); *H04L 29/0651* (2013.01); *G02B 2027/0187* (2013.01)
(58) Field of Classification Search
    USPC ........................................................ 345/633
    See application file for complete search history.

(56) References Cited

U.S. PATENT DOCUMENTS

| | | |
|---|---|---|
| 2004/0086186 A1 | 5/2004 | Kusogami et al. |
| 2006/0212147 A1 | 9/2006 | Bennett et al. |
| 2008/0022348 A1 | 1/2008 | Shen |
| 2010/0040238 A1 | 2/2010 | Jang et al. |
| 2013/0117377 A1 | 5/2013 | Miller |
| 2015/0296247 A1 | 10/2015 | Glasser |
| 2016/0255348 A1* | 9/2016 | Panchagnula ........ H04N 19/146 375/240.02 |
| 2016/0260196 A1 | 9/2016 | Roimela et al. |
| 2017/0127118 A1 | 5/2017 | Hirabayashi et al. |
| 2017/0178408 A1 | 6/2017 | Bavor, Jr. et al. |
| 2017/0221264 A1 | 8/2017 | Perry |
| 2017/0237983 A1 | 8/2017 | Adeel et al. |
| 2018/0047332 A1* | 2/2018 | Kuwahara ............... G06F 3/147 |
| 2018/0206057 A1* | 7/2018 | Kim ....................... G10L 19/008 |
| 2019/0005986 A1* | 1/2019 | Peters .................... H04S 7/303 |
| 2020/0094141 A1* | 3/2020 | Fersch ................... H04L 67/38 |

FOREIGN PATENT DOCUMENTS

| | | |
|---|---|---|
| EP | 3065406 A1 | 9/2016 |
| JP | 2004-072694 A | 3/2004 |
| JP | 2007-029506 A | 2/2007 |
| JP | 2009-043274 A | 2/2009 |
| RU | 2621633 C2 | 6/2017 |
| WO | 2017/048713 A1 | 3/2017 |
| WO | 2017/120681 A1 | 7/2017 |

OTHER PUBLICATIONS

Dottling, Martin, "Office Action for EP Application 18 783 491 .6", dated Jun. 18, 2021, EPO, Germany.

Hong Lei, "Written Opinion and Search Report for SG Application No. 11202003269S", dated Mar. 17, 2021, IPOS, Singapore.

ISO/IEC 23008-3:2015, Information technology—High efficiency coding and media delivery in heterogeneous environments—Part 3: 3D audio.

N16950, Study of ISO/IEC Dis 23000-20 Omnidirectional Media Format.

P. Boustead et al.: "DICE: Internet delivery of immersive voice communication for crowded virtual spaces", Virtual Reality, 2005. Proceedings, Mar. 12, 2005, pp. 35-41, XP031572858.

Paul Boustead et al., "DICE: Internet Delivery of Immersive Voice Communication for Crowded Virtual Spaces", Mar. 12, 2005.

Fen Wang, "Office Action for CN Application No. 201880080196.6", dated Sep. 9, 2021, CNIPA, China.

Nirmalya Sinha, Office Action for IN Application No. 202037015367, dated Aug. 17, 2021, Intellectual Property India, India.

* cited by examiner

OPTIMIZING AUDIO DELIVERY FOR VIRTUAL REALITY APPLICATIONS

CROSS-REFERENCES TO RELATED APPLICATIONS

This application is a continuation of copending International Application No. PCT/EP2018/077770, filed Oct. 11, 2018, which is incorporated herein by reference in its entirety, and additionally claims priority from European Application No. EP 17196259.0, filed Oct. 12, 2017, which is incorporated herein by reference in its entirety.

BACKGROUND OF THE INVENTION

In a Virtual Reality (VR) environment or similarly in an Augmented Reality (AR) or Mixed Reality (MR) or 360-degree video environments, the user may usually visualise full 360-degree content using for example a Head Mounted Display (HMD) and listen to it over headphones (or similarly over loudspeakers, including correct rendering dependent to its position).

In a simple use case, the content is authored in such a way that only one audio/video scene (i.e., 360-degree video for example) is reproduced at a certain moment in time. The audio/video scene has a fixed location (e.g., a sphere with the user positioned in the center), and the user may not move in the scene, but it may only rotate his head in various directions (yaw, pitch, roll). In this case, different video and audio is played back (different viewports are displayed) to the user based on the orientation of his head.

While for video, the video content is delivered for the entire 360-degree scene, together with metadata for describing the rendering process (e.g., stitching information, projection mapping, etc.) and selected based on the current user's viewport, for audio the content is the same for the entire scene. Based on the metadata the audio content is adapted to the current user's viewport (e.g., an audio object is rendered differently based on the viewport/user orientation information). It should be noted that 360-degree content refers to any type of content that comprises in more than one viewing angle at the same moment in time, that the user may choose from (for example by his head orientation or by using a remote-control device).

In a more complex scenario, when the user may move in the VR scene, or "jump" from one scene to the next one, the audio content might also change (e.g., audio sources which are not audible in one scene may become audible in the next scene—"a door is opened"). With existing systems, complete audio scenes may be encoded into one stream and, if needed, into additional streams (dependent on the main stream). Such systems are known as Next Generation Audio systems (e.g., MPEG-H 3D Audio). Examples of such use cases may contain:

Example 1: The user selects to enter a new room, and the entire audio/video scene changes Example 2: The user moves in the VR scene, opens the door and walks through, implying a transition of audio from one scene to the next scene that may be used For the purpose of describing this scenario, the notion of Discrete Viewpoints in space is introduced, as discrete location in space (or in the VR environment), for which different audio/video content is available.

The "straight-forward" solution is to have a real-time encoder which changes the encoding (number of audio elements, spatial information, etc.) based on feedback from the playback device about user position/orientation. This solution would imply, for example in a streaming environment, a very complex communication between a client and server:

The client (which usually is assumed to be using only simple logic) might use advanced mechanisms for conveying not only requests for different streams, but also complex information about encoding details that would enable processing of the right content based on the user's position.

The Media Server is usually pre-populated with different streams (formatted in a specific way that allows for "segment-wise" delivery) and the main function of the server is to provide information about the available streams and cause their delivery when requested. In order to enable scenarios that allow the encoding based on the feedback from the playback device, the Media Server might use advanced communication links with multiple live media encoders, and the capacity to create all the signaling information on the fly (e.g., Media Presentation Description) that could change in real time.

Although such system could be imagined, its complexity and computational requirements are beyond the functionality and features of equipment and systems available today or even in that will be developed in the next decades.

Alternatively, the content representing the complete VR environment ("the complete world") could be delivered all the time. This would solve the problem, but might use an enormous bitrate that is beyond the capacity of the available communications links.

This is complex for a real-time environment, and in order to enable such use cases using available systems, alternative solutions are proposed that enable this functionality with a low complexity.

2. Terminology and Definitions

The following terminology is used in the technical field:

Audio Elements: audio signals that may be represented for example as audio objects, audio channels, scene based audio (Higher Order Ambisonics—HOA), or any combination of all.

Region-of-Interest (ROI): One region of the video content (or of the environment displayed or simulated) that is of interest to the user at one moment in time. This may be commonly a region on a sphere for example, or a polygonal selection from a 2D map. The ROI identifies a specific region for a particular purpose, defining the borders of an object under consideration.

User position information: location information (e.g., x, y, z coordinates), orientation information (yaw, pitch, roll), direction and speed of movement, etc.

Viewport: Part of the spherical video that is currently displayed and viewed by the user.

Viewpoint: the center point of the Viewport.

360-degree video (also known as immersive video or spherical video): represents in the context of this document a video content that contains more than one view (i.e., viewport) in one direction at the same moment in time. Such content may be created, for example, using an omnidirectional camera or a collection of cameras. During playback the viewer has control of the viewing direction.

Media Presentation Description (MPD) is a syntax e.g. XML containing information about media segments, their relationships and information that may be used to choose between them.

Adaptation Sets contain a media stream or set of media streams. In the simplest case, one Adaptation Set containing all audio and video for the content, but to reduce bandwidth, each stream can be split into a different Adaptation Set. A common case is to have one video Adaptation Set, and multiple audio Adaptation Sets (one for each supported language). Adaptation Sets can also contain subtitles or arbitrary metadata.

Representations allow an Adaptation Set to contain the same content encoded in different ways. In most cases, Representations will be provided in multiple bitrates. This allows clients to request the highest quality content that they can play without waiting to buffer. Representations can also be encoded with different codecs, allowing support for clients with different supported codecs.

In the context of this application the notions of the Adaptation Sets are used more generic, sometimes referring actually to the Representations. Also, the media streams (audio/video streams) are generally encapsulated first into Media segments that are the actual media files played by the client (e.g., DASH client). Various formats can be used for the Media segments, such as ISO Base Media File Format (ISOBMFF), which is similar to the MPEG-4 container format, or MPEG-2 Transport Stream (TS). The encapsulation into Media Segments and in different Representations/Adaptation Sets is independent of the methods described in here, the methods apply to all various options.

Additionally, the description of the methods in this document is centered around a DASH Server-Client communication, but the methods are generic enough to work with other delivery environments, such as MMT, MPEG-2 TS, DASH-ROUTE, File Format for file playback etc.

In general terms, an adaptation set is at a higher layer with respect to a stream and may comprise metadata (e.g., associated to positions). A stream may comprise a plurality of audio elements. An audio scene may me associated to a plurality of streams delivered as part of a plurality of adaptation sets.

3. Current Solutions

Current solutions are:
[1]. ISO/IEC 23008-3:2015, Information technology—High efficiency coding and media delivery in heterogeneous environments—Part 3: 3D audio
[2]. N16950, Study of ISO/IEC DIS 23000-20 Omnidirectional Media Format The current solutions are limited in provide independent VR experience at one fixed location which allows user to change his orientation but not to move in the VR environment.

SUMMARY

According to an embodiment, a system for a virtual reality, VR, augmented reality, AR, mixed reality, MR, or 360-degree video environment configured to receive video and audio streams to be reproduced in a media consumption device may have:
  at least one media video decoder configured to decode video signals from video streams for the representation of VR, AR, MR or 360-degree video environments to a user, and
  at least one audio decoder configured to decode audio signals from audio streams for the representation of audio scenes,
  wherein the system is configured to request first audio streams and second audio streams and/or one audio element of an audio stream and/or one adaptation set to a server on the basis of at least the user's current viewport and/or head orientation and/or movement data and/or interaction metadata and/or virtual positional data, and
  wherein first audio elements in the first audio streams are more relevant and/or more audible than second audio elements in the second audio streams, wherein the first audio streams are requested and/or received at a higher bitrate than the bitrate of the second audio streams.

According to another embodiment, a system for a virtual reality, VR, augmented reality, AR, mixed reality, MR, or 360-degree video environment configured to receive video and audio streams to be reproduced in a media consumption device may have:
  at least one media video decoder configured to decode video signals from video streams for the representation of VR, AR, MR or 360-degree video environments to a user, and
  at least one audio decoder configured to decode audio signals from at least one audio stream for the representation of an audio scene,
  wherein the system is configured to request at least one audio stream to a server on the basis of at least the user's current viewport and/or head orientation and/or movement data and/or interaction metadata and/or virtual positional data, and
  wherein the system is configured to control the request of the at least one audio stream to the server on the basis of a distance of the user's position from the boundaries of neighboring and/or adjacent video environments associated to different audio scenes.

One embodiment may have: a server for delivering audio and video streams to a client for a virtual reality, VR, augmented reality, AR, mixed reality, MR, or 360-degree video environment, the video and audio streams to be reproduced in a media consumption device,
  which server may have: an encoder to encode and/or a storage to store video streams to describe a video environment, the video environment being associated to an audio scene;
  which server may further have: an encoder to encode and/or a storage to store a plurality of streams and/or audio elements and/or adaptation sets to be delivered to the client, the audio streams and/or audio elements and/or adaptation sets being associated to at least one audio scene,
  wherein the server is configured to:
    select and deliver a video stream on the basis of a request from the client, the video stream being associated to an environment;
    select an audio stream and/or audio element and/or adaptation set on the basis of a request from the client, the request being associated to at least the user's current viewport and/or head orientation and/or movement data and/or interaction metadata and/or virtual positional data and to an audio scene associated to the environment; and
    deliver the audio stream to the client,
  wherein the request is based on a distance of the user's position from the boundaries of neighboring and/or adjacent video environments associated to different audio scenes.

Another embodiment may have: a server for delivering audio and video streams to a client for a virtual reality, VR, augmented reality, AR, mixed reality, MR, or 360-degree video environment, the video and audio streams to be reproduced in a media consumption device, which server may have: an encoder to encode and/or a storage to store video streams to describe a video environment, the video environment being associated to an audio scene;

which server may further have: an encoder to encode and/or a storage to store a plurality of audio streams and/or audio elements and/or adaptation sets to be delivered to the client, the audio streams and/or audio elements and/or adaptation sets being associated to at least one audio scene, wherein the server is configured to:
select and deliver a video stream on the basis of a request from the client, the video stream being associated to an environment;
select an audio stream and/or audio element and/or adaptation set on the basis of a request from the client, the request being associated to at least the user's current viewport and/or head orientation and/or movement data and/or interaction metadata and/or virtual positional data and to an audio scene associated to the environment; and
deliver the audio stream to the client,
wherein first audio elements in the first audio streams are more relevant and/or more audible than second audio elements in the second audio streams, wherein the first audio streams are requested and/or received at a higher bitrate than the bitrate of the second audio streams.

According to an embodiment, a method for a virtual reality, VR, augmented reality, AR, mixed reality, MR, or 360-degree video environment configured to receive video and/audio streams to be reproduced in a media consumption device may have the steps of:

decoding video signals from video streams for the representation of VR, AR, MR or 360-degree video environments to a user,
decoding audio signals from audio streams for the representation of audio scenes,
requesting to, and/or obtaining from, a server at least one audio stream on the basis of the user's current viewport and/or positional data and/or head orientation and/or movement data and/or metadata and/or virtual positional data and/or metadata, and
controlling the request of the at least one stream to the server on the basis of a distance of the user's position from the boundaries of neighboring and/or adjacent video environments associated to different audio scenes.

According to another embodiment, a method for a virtual reality, VR, augmented reality, AR, mixed reality, MR, or 360-degree video environment configured to receive video and/audio streams to be reproduced in a media consumption device may have the steps of:

decoding video signals from video streams for the representation of VR, AR, MR or 360-degree video environments to a user,
decoding audio signals from audio streams for the representation of audio scenes,
requesting to, and/or obtaining from, a server at least one audio stream on the basis of the user's current viewport and/or positional data and/or head orientation and/or movement data and/or metadata and/or virtual positional data and/or metadata, and
wherein first audio elements in the first audio streams are more relevant and/or more audible than second audio elements in the second audio streams, wherein the first audio streams are requested and/or received at a higher bitrate than the bitrate of the second audio streams.

According to an embodiment, a non-transitory digital storage medium having a computer program stored thereon to perform the method for a virtual reality, VR, augmented reality, AR, mixed reality, MR, or 360-degree video environment configured to receive video and/audio streams to be reproduced in a media consumption device, which method may have the steps of:

decoding video signals from video streams for the representation of VR, AR, MR or 360-degree video environments to a user,
decoding audio signals from audio streams for the representation of audio scenes,
requesting to, and/or obtaining from, a server at least one audio stream on the basis of the user's current viewport and/or positional data and/or head orientation and/or movement data and/or metadata and/or virtual positional data and/or metadata, and
controlling the request of the at least one stream to the server on the basis of a distance of the user's position from the boundaries of neighboring and/or adjacent video environments associated to different audio scenes, when said computer program is run by a computer.

According to an embodiment, a non-transitory digital storage medium having a computer program stored thereon to perform the method for a virtual reality, VR, augmented reality, AR, mixed reality, MR, or 360-degree video environment configured to receive video and/audio streams to be reproduced in a media consumption device, which method may have the steps of:

decoding video signals from video streams for the representation of VR, AR, MR or 360-degree video environments to a user,
decoding audio signals from audio streams for the representation of audio scenes,
requesting to, and/or obtaining from, a server at least one audio stream on the basis of the user's current viewport and/or positional data and/or head orientation and/or movement data and/or metadata and/or virtual positional data and/or metadata, and
wherein first audio elements in the first audio streams are more relevant and/or more audible than second audio elements in the second audio streams, wherein the first audio streams are requested and/or received at a higher bitrate than the bitrate of the second audio streams,
when said computer program is run by a computer.

According to an embodiment a system for a virtual reality, VR, augmented reality, AR, mixed reality, MR, or 360-degree video environment may be configured to receive video and audio streams to be reproduced in a media consumption device, wherein the system may comprise: at least one media video decoder configured to decode video signals from video streams for the representation of VR, AR, MR or 360-degree video environment scenes to a user, and at least one audio decoder configured to decode audio signals from at least one audio stream, wherein the system may be configured to request at least one audio stream and/or one audio element of an audio stream and/or one adaptation set to a server on the basis of at least the user's current viewport and/or head orientation and/or movement data and/or interaction metadata and/or virtual positional data.

According to an aspect the system may be configured to provide the server with the user's current viewport and/or head orientation and/or movement data and/or interaction metadata and/or virtual positional data so as to obtain the at least one audio stream and/or one audio element of an audio stream and/or one adaptation set from the server.

An embodiment may be configured so that at least one scene is associated to at least one audio element, each audio element being associated to a position and/or area in the visual environment where the audio element is audible, so that different audio streams are provided for different user's positions and/or viewports and/or head orientations and/or movement data and/or interaction metadata and/or virtual positional data in the scene.

According to another aspect the system may be configured to decide whether at least one audio element of an audio stream and/or one adaptation set is to be reproduced for the current user's viewport and/or head orientation and/or movement data and/or interaction metadata and/or virtual position in the scene, and wherein the system may be configured to request and/or to receive the at least one audio element at the current user's virtual position.

According to an aspect the system may be configured to predictively decide whether at least one audio element of an audio stream and/or one adaptation set will become relevant and/or audible based on at least the user's current viewport and/or head orientation and/or movement data and/or interaction metadata and/or virtual positional data, and wherein the system may be configured to request and/or to receive the at least one audio element and/or audio stream and/or adaptation set at a particular user's virtual position before the predicted user's movement and/or interaction in the scene, wherein the system may be configured to reproduce the at least on audio element and/or audio stream, when received, at the particular user's virtual position after the user's movement and/or interaction in the scene.

An embodiment of the system may be configured to request and/or to receive the at least one audio element at a lower bitrate and/or quality level, at the user's virtual position before a user's movement and/or interaction in the scene, wherein the system may be configured to request and/or to receive the at least one audio element at a higher bitrate and/or quality level, at the user's virtual position after the user's movement and/or interaction in the scene.

According to an aspect the system may be configured so that at least one audio element is associated to at least one scene, each audio element being associated to a position and/or area in the visual environment associated to the scene, wherein the system may be configured to request and/or receive streams at higher bitrate and/or quality for audio elements closer to the user than for audio elements more distant from the user.

According to an aspect in the system at least one audio element may be associated to at least one scene, the at last one audio element being associated to a position and/or area in the visual environment associated to the scene, wherein the system may be configured to request different streams at different bitrates and/or quality levels for audio elements based on their relevance and/or auditability level at each user's virtual position in the scene, wherein the system may be configured to request an audio stream at higher bitrate and/or quality level for audio elements which are more relevant and/or more audible at the current user's virtual position, and/or an audio stream at lower bitrate and/or quality level for audio elements which are less relevant and/or less audible at the current user's virtual position.

In an embodiment in the system at least one audio element may be associated to a scene, each audio element being associated to a position and/or area in the visual environment associated to the scene, wherein the system may be configured to periodically send to the server the user's current viewport and/or head orientation and/or movement data and/or interaction metadata and/or virtual positional data, so that: for a first position, a stream at higher bitrate and/or quality is provided, from the server, and for a second position, a stream at lower bitrate and/or quality is provided, from the server, wherein the first position is closer to the at least one audio element than the second position.

In an embodiment the system a plurality of scenes may be defined for multiple visual environments such as adjacent and/or neighboring environments, so that first streams are provided associated to a first, current scene and, in case of user's transition to a second, further scene, to provide both the streams associated to the first scene and the second streams associated to the second scene.

In an embodiment the system a plurality of scenes may be defined for a first and a second visual environments, the first and second environments being adjacent and/or neighboring environments, wherein first streams associated to the first scene are provided, from the server, for the reproduction of the first scene in case of the user's position or virtual position being in a first environment associated to the first scene, second streams associated to the second scene are provided, from the server, for the reproduction of the second scene in case of the user's position or virtual position being in a second environment associated to the second scene, and both first streams associated to the first scene and second streams associated to the second scene are provided in case of the user's position or virtual position being in a transitional position between the first scene and the second scene.

In an embodiment the system a plurality of scenes may be defined for a first and a second visual environments, which are adjacent and/or neighboring environments, wherein the system is configured to request and/or receive first streams associated to a first scene associated to the first environment, for the reproduction of the first scene in case of the user's virtual position being in the first environment, wherein the system may be configured to request and/or receive second streams associated to the second scene associated to the second environment, for the reproduction of the second scene in case of the user's virtual position being in the second environment, and wherein the system may be configured to request and/or receive both first streams associated to the first scene and second streams associated to the second scene in case of the user's virtual position being in a transitional position between the first environment and the second environment.

According to an aspect the system may be configured so that the first streams associated to the first scene are obtained at a higher bitrate and/or quality when the user is in the first environment associated to the first scene, while the second streams associated to the second scene associated to the second environment are obtained at a lower bitrate and/or quality when the user is in the beginning of a transitional position from the first scene to the second scene, and the first streams associated to the first scene are obtained at a lower bitrate and/or quality and the second streams associated to the second scene are obtained at a higher bitrate and/or quality when the user is in the end of a transitional position from the first scene to the second scene, wherein the lower bitrate and/or quality is lower than the higher bitrate and/or quality.

According to an aspect the system may be configured so that a plurality of scenes may be defined for multiple environments such as adjacent and/or neighboring environments, so that the system may obtain the streams associated to a first current scene associated to a first, current environment, and, in case the distance of the user's position or virtual position from a boundary of the scene is below a predetermined threshold, the system further may obtain audio streams associated to a second, adjacent and/or neighboring environment associated to the second scene.

According to an aspect the system may be configured so that a plurality of scenes may be defined for multiple visual environments, so that the system requests and/or obtains the streams associated to the current scene at a higher bitrate and/or quality and the streams associated to the second scene at a lower bitrate and/or quality, wherein the lower bitrate and/or quality is lower than the higher bitrate and/or quality.

According to an aspect the system may be configured so that a plurality of N audio elements may be defined, and, in case the user's distance to the position or area of these audio elements is larger than a predetermined threshold, the N audio elements are processed to obtain a smaller number M of audio elements (M<N) associated to a position or area close to the position or area of the N audio elements, so as to provide the system with at least one audio stream associated to the N audio elements, in case the user's distance to the position or area of the N audio elements is smaller than a predetermined threshold, or to provide the system with at least one audio stream associated to the M audio elements, in case the user's distance to the position or area of the N audio elements is larger than a predetermined threshold.

According to an aspect the system may be configured so that at least one visual environment scene is associated to at least one plurality of N audio elements (N>=2), each audio element being associated to a position and/or area in the visual environment, wherein the at least at least one plurality of N audio elements is provided in at least one representation at high bitrate and/or quality level, and wherein the at least at least one plurality of N audio elements is provided in at least one representation at low bitrate and/or quality level, where the at least one representation is obtained by processing the N audio elements to obtain a smaller number M of audio elements (M<N) associated to a position or area close to the position or area of the N audio elements, wherein the system may be configured to request the representation at higher bitrate and/or quality level for the audio elements, in case the audio elements are more relevant and/or more audible at the current user's virtual position in the scene, wherein the system may be configured to request the representation at lower bitrate and/or quality level for the audio elements, in case the audio elements are less relevant and/or less audible at the current user's virtual position in the scene.

According to an aspect the system may be configured so that, in case the user's distance and/or the relevance and/or the audibility level and/or angular orientation is lower than a predetermined threshold, different streams are obtained for the different audio elements.

In an embodiment the system may be configured to request and/or obtain the streams on the basis of the user's orientation and/or user's direction of movement and/or user's interactions in the scene.

In an embodiment the system the viewport may be associated to the position and/or virtual position and/or movement data and/or head orientation.

According to an aspect the system may be configured so that different audio elements are provided at different viewports, wherein the system may be configured to request and/or receive, in case one first audio element falls within a viewport, the first audio element at a higher bitrate than a second audio element which does not fall within the viewport.

According to an aspect the system may be configured so as to request and/or receive first audio streams and second audio streams, wherein the first audio elements in the first audio streams are more relevant and/or more audible than the second audio elements in the second audio streams, wherein the first audio streams are requested and/or received at a higher bitrate and/or quality than the bitrate and/or quality of the second audio streams.

According to an aspect the system may be configured so that at least two visual environment scenes are defined, wherein at least one first and second audio elements are associated to a first scene associated to a first visual environment, and at least one third audio element is associated to a second scene associated to a second visual environment, wherein the system may be configured to obtain metadata describing that the at least one second audio element is additionally associated with the second visual environment scene, and wherein the system may be configured to request and/or receive the at least first and second audio elements, in case the user's virtual position is in the first visual environment, and wherein the system may be configured to request and/or receive the at least second and third audio elements, in case the user's virtual position is in the second visual environment scene, and wherein the system may be configured to request and/or receive the at least first and second and third audio elements, in case the user's virtual position is in transition between the first visual environment scene and the second visual environment scene.

An embodiment of the system may be configured so the at least one first audio element is provided in at least one audio stream and/or adaptation set, and the at least one second audio element is provided in at least one second audio stream and/or adaptation set, and the at least one third audio element is provided in at least one third audio stream and/or adaptation set, and wherein the at least first visual environment scene is described by metadata as a complete scene which may use the at least first and second audio streams and/or adaptation sets, and wherein the second visual environment scene is described by metadata as an incomplete scene which may use the at least third audio stream and/or adaptation set and the at least second audio stream and/or adaptation sets associated with the at least first visual environment scene, wherein the system comprises a metadata processor configured to manipulate the metadata, to allow merging the second audio stream belonging to the first visual environment and the third audio stream associated with the second visual environment into a new single stream, in case the user's virtual position is in the second visual environment.

According to an aspect the system comprises a metadata processor configured to manipulate the metadata in at least one audio stream prior to the at least one audio decoder, based on user's current viewport and/or head orientation and/or movement data and/or interaction metadata and/or virtual positional data.

According to an aspect the metadata processor may be configured to enable and/or disable at least one audio element in at least one audio stream prior to the at least one audio decoder, based on user's current viewport and/or head orientation and/or movement data and/or interaction metadata and/or virtual positional data, wherein the metadata processor may be configured to disable at least one audio element in at least one audio stream prior to the at least one audio decoder, in case the system decides that the audio element is not to be reproduced anymore as a consequence of a current viewport and/or head orientation and/or movement data and/or interaction metadata and/or virtual positional data, and wherein the metadata processor may be configured to enable at least one audio element in at least one audio stream prior to the at least one audio decoder, in case the system decides the audio element is to be reproduced as a consequence of a user's current viewport and/or head orientation and/or movement data and/or interaction metadata and/or virtual positional data.

According to an aspect the system may be configured to disable the decoding of audio elements selected the basis of the user's current viewport and/or head orientation and/or movement data and/or metadata and/or virtual position.

According to an aspect the system may be configured to merge at least one first audio stream associated to the current audio scene to at least one stream associated to a neighboring, adjacent and/or future audio scene.

According to an aspect the system may be configured to obtain and/or collect statistical or aggregated data on the user's current viewport and/or head orientation and/or movement data and/or metadata and/or virtual positional data, so as to transmit a request to the server associated to the statistical or aggregated data.

According to an aspect the system may be configured to deactivate the decoding and/or reproduction of at least one stream on the basis of metadata associated to the at least one stream and on the basis of the user's current viewport and/or head orientation and/or movement data and/or metadata and/or virtual positional data.

According to an aspect the system may be configured to: manipulate metadata associated with a group of selected audio streams, based on at least the user's current or estimated viewport and/or head orientation and/or movement data and/or metadata and/or virtual positional data, so as to: select and/or enable and/or activate audio elements composing the audio scene to be reproduced; and/or enable the merge of all selected audio streams into a single audio stream.

According to an aspect the system may be configured to control the request of the at least one stream to the server on the basis of distance of the user's position from the boundaries of neighboring and/or adjacent environments associated to different scenes or other metrics associated to the position of the user in the current environment or predictions on the future environment.

According to an aspect in the system information may be provided from the server system, for each audio element or audio object, wherein the information includes descriptive information about the locations in which the sound scene or the audio elements are active.

According to an aspect the system may be configured to choose between reproducing one scene and composing or mixing or muxing or superposing or combining at least two scenes on the basis of the current or future or viewport and/or head orientation and/or movement data and/or metadata and/or virtual position and/or a user's selection, the two scenes being associated to different neighboring and/or adjacent environments.

According to an aspect the system may be configured to create or use at least the adaptation sets so that: a number of Adaptation Sets are associated with one Audio Scene; and/or additional information is provided that relates each Adaptation Set to one Viewpoint, or one Audio Scene; and/or additional information is provided that may include: Information about the boundaries of one Audio Scene and/or information about the relation between one Adaptation Set and one Audio Scene (e.g., Audio Scene is encoded in three streams that are encapsulated into three Adaptation Sets) and/or information about the connection between the boundaries of the audio scene and the multiple Adaptation Sets.

According to an aspect the system may be configured to: receive a stream for a scene associated to a neighboring or adjacent environment; start decoding and/or reproducing the stream for the neighboring or adjacent environment at the detection of the transition of a boundary between two environments.

According to an aspect the system may be configured for operating as a client and a server configured for delivering video and/or audio streams to be reproduced in a media consumption device.

According to an aspect the system may be configured to: request and/or receive at least one first adaptation set comprising at least one audio stream associated with at least one first audio scene; request and/or receive at least one second adaptation set comprising at least one second audio stream associated with at least two audio scenes, including the at least one first audio scene; and enable a merge of the at least one first audio stream and of the at least one second audio stream into a new audio stream to be decoded, based on metadata available regarding user's current viewport and/or head orientation and/or movement data and/or metadata and/or virtual positional data and/or information describing an association of the at least one first adaptation set to the at least one first audio scene and/or an association of the at least one second adaptation set to the at least one first audio scene.

According to an aspect the system may be configured to receive information about user's current viewport and/or head orientation and/or movement data and/or metadata and/or virtual positional data and/or any information characterizing changes triggered by the user's actions; and receive information about the availability of adaptation sets and information describing an association of at least one adaptation set to at least one scene and/or Viewpoint and/or viewport and/or position and/or virtual position and/or movement data and/or orientation.

According to an aspect the system may be configured to decide if at least one audio element from at least one audio scene embedded in at least one stream and at least one additional audio element from at least one additional audio scene embedded in at least one additional stream are to be reproduced; and cause, in case of a positive decision, an operation of merging or composing or muxing or superposing or combining the at least one additional stream of the additional audio scene to the at least one stream of the at least one audio scene.

According to an aspect the system may be configured to manipulate audio metadata associated with the selected audio streams, based on at least the user's current viewport and/or head orientation and/or movement data and/or metadata and/or virtual positional data, in order to: select and/or enable and/or activate the audio elements composing the audio scene decided to be reproduced; and enable the merge of all selected audio streams into a single audio stream.

According to an aspect, a server may be provided for delivering audio and video streams to a client for a virtual reality, VR, augmented reality, AR, mixed reality, MR, or 360-degree video environment, the video and audio streams to be reproduced in a media consumption device, wherein the server may comprise an encoder to encode and/or a storage to store video streams to describe a visual environment, the visual environment being associated to an audio scene; wherein the server further may comprise an encoder to encode and/or a storage to store a plurality of streams and/or audio elements and/or adaptation sets to be delivered to the client, the streams and/or audio elements and/or adaptation sets being associated to at least one audio scene, wherein the server is configured to select and deliver a video stream on the basis of a request from the client, the video stream being associated to an environment; select an audio stream and/or audio element and/or adaptation set on the basis of a request from the client, the request being associated to at least the user's current viewport and/or head orientation and/or movement data and/or interaction metadata and/or virtual positional data and to an audio scene associated to the environment; and deliver the audio stream to the client.

According to an aspect the streams may be encapsulated into adaptation sets, each adaptation set including a plurality of streams associated to different representations, at different bitrate and/or quality, of a same audio content, wherein the selected adaptation set is selected on the basis of the request from the client.

According to an aspect the system may be operating as a client and the server.

According to an aspect the system may include a server.

According to an aspect a method may be provided for a virtual reality, VR, augmented reality, AR, mixed reality, MR, or 360-degree video environment configured to receive video and/audio streams to be reproduced in a media consumption device (e.g., playback device), comprising:

decoding video signals from video streams for the representation of VR, AR, MR or 360-degree video environment scenes to a user, and decoding audio signals from audio streams, requesting to, and/or obtaining from, a server, at least one audio stream on the basis of the user's current viewport and/or positional data and/or head orientation and/or movement data and/or metadata and/or virtual positional data and/or metadata.

According to an aspect a computer program may be provided comprising instructions which, when executed by a processor, cause the processor to perform the above method.

BRIEF DESCRIPTION OF THE DRAWINGS

Embodiments of the present invention will be detailed subsequently referring to the appended drawings, in which.

DETAILED DESCRIPTION OF THE INVENTION

Inventive Aspects

Figure 1A:
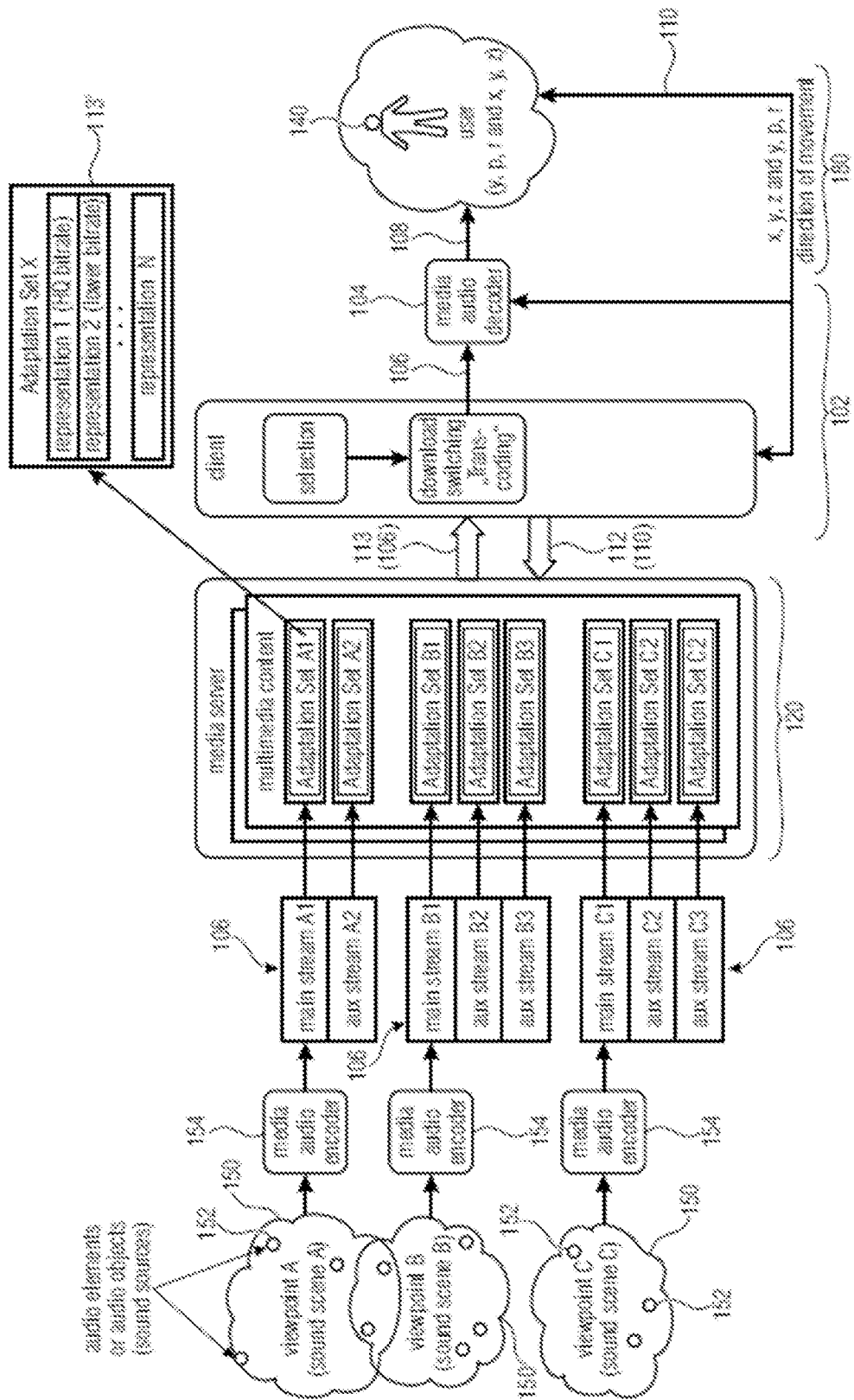
FIGS. 1a-1h show inventive examples.

Herein below (e.g., FIG. 1aff.) there are disclosed examples of systems according to inventive aspects.

Examples of an inventive system (which may be embodied by different examples disclosed below) are collectively indicated with 102. A system 102 may be a client system, for example, as it may obtain from a server system (e.g., 120) audio and/or video streams for the representation of audio scenes and/or visual environments to a user. The client system 102 may also receive metadata from the server system 120 which provide, for example, side and/or auxiliary information regarding the audio and/or video streams.

The system 102 may be associated to (or comprise in some examples) a media consumption device (MCD) which actually reproduces audio and/or video signals to a user. In some examples, the user may wear the MCD.

The system 102 may perform requests to the server system 120, the requests being associated to at least one user's current viewport and/or head orientation (e.g., angular orientation) and/or movement data and/or interaction metadata and/or virtual positional data 110 (several metrics may be provided). The viewport and/or head orientation and/or movement data and/or interaction metadata and/or virtual positional data 110 may be provided in feedback from the MCD to the client system 102, which, in turn, may provide the request to the server system 120 on the basis of this feedback.

In some cases, the request (which is indicated with 112) may contain the user's current viewport and/or head orientation and/or movement data and/or interaction metadata and/or virtual positional data 110 (or an indication or a processed version thereof). On the basis of the user's current viewport and/or head orientation and/or movement data and/or interaction metadata and/or virtual positional data 110, the server system 120 will provide the audio and/or video streams and/or metadata that may be used. In this case, the server system 120 may have knowledge of the position of the user (e.g., in a virtual environment) and may associate the correct streams to the user's positions.

In other cases, the request 112 from the client system 102 may contain explicit requests of particular audio and/or video streams. The request 112 may be in this case based on the user's current viewport and/or head orientation and/or movement data and/or interaction metadata and/or virtual positional data 110. The client system 102 has the knowledge of the audio and video signals that have to be rendered to the user, even if the client system 102 has not, stored therein, the streams that may be used. The client system 102 may, in examples address particular streams in the server system 120

The client system 102 may be a system for a virtual reality, VR, augmented reality, AR, mixed reality, MR, or 360-degree video environment configured to receive video and audio streams to be reproduced in a media consumption device, wherein the system 102 comprises:
at least one media video decoder configured to decode video signals from video streams for the representation of VR, AR, MR or 360-degree video environment scenes to a user, and
at least one audio decoder 104 configured to decode audio signals (108) from at least one audio stream 106,
wherein the system 102 is configured to request 112 at least one audio stream 106 and/or one audio element of an audio stream and/or one adaptation set to a server 120 on the basis of at least the user's current viewport and/or head orientation and/or movement data and/or interaction metadata and/or virtual positional data 110.

It is to be noted that in VR, AR, MR environments, the user 140 may be meant at being in a particular environment (e.g., a particular room). The environment is described with video signals which are encoded, for example, at the server-side (side of the server system 120, which does not necessarily include the server system 120, but which may comprise a different encoder which has previously encoded the video streams which have been thereafter stored in a storage of the server 120). At each instant, in some examples the user may enjoy only some video signals (e.g., viewport).

In general terms, each environment may be associated to a particular audio scene. The audio scene may be understood as the collection of all sounds which are to be reproduced to the user in the particular environment and over a particular period of time.

Traditionally, the environments have been understood as being in a discrete number. Accordingly, the number of environments has been understood as being finite. For the same reasons, the number of audio scenes has been understood as being finite. Therefore, in conventional technology, VR, AR, MR systems have been designed so that:

The user is intended to be in one single environment at each time; therefore, for each environment:
The client system 102 requests to the server system 120 only the video streams associated to the single environment;
The client system 102 requests to the server system 120 only the audio streams associated to the single scene.

This approach has resulted in inconvenience.

For example, all the audio streams are to be delivered all together to the client system 102 for each scene/environment, and completely new audio streams need to be delivered when the user moves to a different environment (e.g., when the user passes through a door, hence implying a transmission of environments/scenes).

Further, unnatural experience has been caused in some cases: for example, when a user is close to a wall (e.g., a virtual wall of a virtual room), he should experience sounds coming from the other side of the wall. However, this experience is impossible with the traditional environments: the collection of audio streams associated to the current scene obviously do not contain any stream associated to the adjacent environments/scenes.

On the other side, the user's experience is usually improved when the bitrate of the audio streams is increased. This may cause further issues: the higher the bitrate, the higher the payload that the server system needs to deliver to the client system 102. For example, when an audio scene contains multiple audio sources (conveyed as audio elements) some of them located near to the user position and others far away from it, the sound sources located far away would be less audible. Therefore, delivering all audio elements at the same bitrate or quality level may lead to very high bitrates. This implies non-efficient audio stream delivery. If the server system 120 delivers the audio streams at the highest possible bitrate, inefficient delivery is caused, as sounds with a low audibility level or low relevance to the overall audio scene would notwithstanding involve high bitrate, similarly to relevant sounds generated closer to the user. Therefore, if all the audio streams of one scene are delivered at highest bitrate, the communication between the server system 120 and the client system 102 would unnecessarily increase payload. If all the audio streams of one scene are delivered at lower bitrate, the user's experience will not be satisfactory.

The problems of communication exacerbate the inconvenient discussed above: when a user passes through a door, he would be supposed to instantaneously change the environment/scene, which would involve that, instantaneously, the server system 120 should provide all the streams to the client system 102.

Therefore, traditionally it was not possible to solve problems discussed above.

However, with the invention, it is possible to solve these problems: the client system 102 provides a request to the server system 120 which may also be based on the user's current viewport and/or head orientation and/or movement data and/or interaction metadata and/or virtual positional data (and not only based on the environment/scene). Accordingly, the server system 120 may provide, for each instant, the audio streams to be rendered for each, for example, user's position.

For example, if the user never goes close to the wall, there is no need for the client system 102 to request the streams of the neighboring environment (e.g., they may requested by the client system 102 only when the user approaches the wall). Moreover, the streams coming from outside the wall may have a reduced bitrate, as they may be heard at low volume. Notably, more relevant streams (e.g., streams coming from audio objects within the current environment) may be delivered by the server system 120 to the client system 102 at the highest bitrate and/or highest quality level (as a consequence of the fact that the less relevant streams are at lower bitrate and or quality level, hence leaving free band for the more relevant streams).

A lower quality level can be obtained for example by reducing the bitrate or by processing the audio elements in such way that the useful data to be transmitted is reduced, while the used bitrate per audio signal is kept constant. For example, if a number of 10 audio objects are located at different positions all far away from the user, these objects can be mixed into a lower number of signals based on the user position:

At positions very far away from the user position (e.g. higher than a first threshold) the objects are mixed into 2 signals (other numbers are possible, based on their spatial position and semantic) and delivered as 2 "virtual objects"

At positions closer to the user position (e.g. lower than the first threshold but higher than a second threshold smaller than the first threshold) the objects are mixed into 5 signals (based on their spatial position and semantic) and delivered as 5 (other numbers are possible) "virtual objects"

At positions very close to the user positions (lower than the first and second thresholds) the 10 objects are delivered as 10 audio signals provided the highest quality.

While for the highest quality the audio signals may all be considered very important and audible, the user may be able to individually localize each object. For the lower quality levels at positions far away, some of the audio objects may become less relevant or less audible, therefore the user would not be anyhow able to individually localize the audio signals in space and therefore reducing the quality level for delivery of these audio signals would not lead to any reduction of the quality of experience for the user.

Another example is when the user goes beyond a door: in the transitional position (e.g., at the boundary between two different environments/scenes), the server system 120 will provide both the streams of both the scenes/environment, but at lower bitrates. This is because the user will experience sounds coming from two different environments (the sounds may be merged together from different audio streams originally associated to different scenes/environments) and there arises no need for highest quality level of each sound source (or audio element).

In view of the above, the invention permits to go beyond the traditional approach of the discrete number of visual environments and audio scenes, but may permit a gradual representation of different environments/scenes, giving a more realistic experience to the user.

Herein below it is considered that each visual environment (e.g., virtual environment) is associated to an audio scene (attributes of the environments may also be attributes of the scene). Each environment/scene may be associated, for example, to geometrical coordinate system (which may be a virtual geometrical coordinate system). The environment/scene may have boundaries, so that, when the user's position (e.g., virtual position) goes beyond at the boundaries, a different environment/scene is reached. The boundaries may be based on the used coordinate system. The environment may comprise audio objects (audio elements, sound sources) which may be positioned in some particular coordinates of the environment/scene. With respect, for example, to the relative position and/or orientation of the user with respect to the audio objects (audio elements, sound sources), the client system 102 may request different streams and/or the server system 120 may provide different streams (e.g., at higher/lower bitrates and/or quality levels in accordance to the distance and/or orientation).

More in general, the client system 102 may request to and/or obtain from the server system 120 different streams (e.g., different representations of the same sounds at different bitrates and/or quality levels) on the basis of their audibility and/or relevance. The audibility and/or relevance may be determined, for example, on the basis of the of at least user's current viewport and/or head orientation and/or movement data and/or interaction metadata and/or virtual positional data.

In several examples, there is the possibly of merging different streams. In several cases, there is the possibility of composing or mixing or muxing or superposing or combining at least two scenes. There is for example the possibility of using a mixer and/or renderer (which may, for example, be used downstream of multiple decoders, each decoding at least one audio stream), or performing a stream muxing operation e.g., upstream of the decoding of the streams. In other cases, there may be the possibility of decoding different streams and render them with different loudspeaker setups.

It is to be noted that the present invention does not necessarily refuse the concept of visual environment and audio scene. In particular, with the invention, audio and video streams associated to a particular scene/environment may be delivered from the server system 120 to the client system 102 when the user enters a environment/scene. Notwithstanding, within the same environment/scene, different audios streams and/or audio objects and/or adaptation sets may be requested, addressed and/or delivered. In particular, there may be the possibility that:

at least some of the video data associated to the visual environment are delivered from the server 120 to the client 102 at the user's entrance into a scene; and/or at least some of the audio data (streams, objects, adaptation sets . . . ) are delivered to the client system 102 only on the basis of current (or future) viewport and/or head orientation and/or movement data and/or metadata and/or virtual position and/or a user's selection/interaction; and/or (in some cases): some audio data are delivered to the client system 102 on the basis of the current scene (irrespective of the position current or future or viewport and/or head orientation and/or movement data and/or metadata and/or virtual position and/or a user's selection), while the remaining audio data are delivered on the basis of the current or future or viewport and/or head orientation and/or movement data and/or metadata and/or virtual position and/or a user's selection.

To be noted that the various elements (server system, client system, MCD, etc.) can represent elements in different hardware devices or even in the same ones (e.g., the client and the MCD can be implemented as part of the same mobile phone, or similarly the client can be in PC connected to a secondary screen which would comprise the MCD)

EXAMPLES

One embodiment of the system 102 (client) as shown in FIG. 1a is configured to receive (audio) streams 106 on the basis of a defined position in an environment (e.g., virtual environment), which may be understood as being associated to a video and audio scene (hereinafter referred to as scene 150). Different positions in the same scene 150 in general imply different streams 106 or different metadata associated to the streams 106 to be provided to an audio decoder 104 of the system 102 (from a media server 120, for example). The system 102 is connected to a Media Consumer Device (MCD) from which it receives feedback associated to the position and/or virtual position of the user in the same environment. In the following, the position of the user in the environment may be associated with the particular viewport which the user enjoys (the viewport being intended, for example, the surface, hypothesized as a rectangular surface projected on a sphere, that is represented to the user).

In an exemplary scenario, when the user moves in the VR, AR and/or MR scene 150, the audio content may be imagined as being virtually generated by one or more audio sources 152, which might change. The audio sources 152 may be understood as virtual audio sources, in the sense that they may refer to positions in the virtual environment: the rendering of each audio source is adapted to the user position (e.g., in a simplified exemplification, the level of the audio source is higher when the user is closer to the position of the audio source, and lower when the user is more distant from the audio source). Each audio element (audio source) is notwithstanding encoded in audio streams that are provided to the decoder. The audio streams may be associated to various positions and/or areas in the scene. For example, audio sources 152 which are not audible in one scene may become audible in the next scene, e.g. when a door in the VR, AR and/or MR scene 150 is opened. The user may then select to enter a new scene/environment 150 (e.g., a room), and the entire audio scene changes. For the purpose of describing this scenario, the term of discrete viewpoints in space may be utilized, as a discrete location in space (or in the VR environment), for which a different audio content is available.

In general terms, the media server 120 may provide streams 106 associated to the particular scene 150 on the basis of the position of the user in the scene 150. The streams 106 may be encoded by at least one encoder 154 and provided to the media server 120. The media server 120 may transmit the streams 113 with communications 113 (e.g., via a communication network). The provision of the streams 113 may be based on the requests 112 set out by the system 102 on the basis of the position 110 of the user (e.g., in the virtual environment). The position 110 of the user may also be understood as being associated to the viewport which the user enjoys (as for each position, there is one single rectangle which is represented) and to the viewpoint (as the viewpoint is the center of the viewport). Hence, the provision of the viewport may be, in some examples, the same as the provision of the position.

Figure 1B:
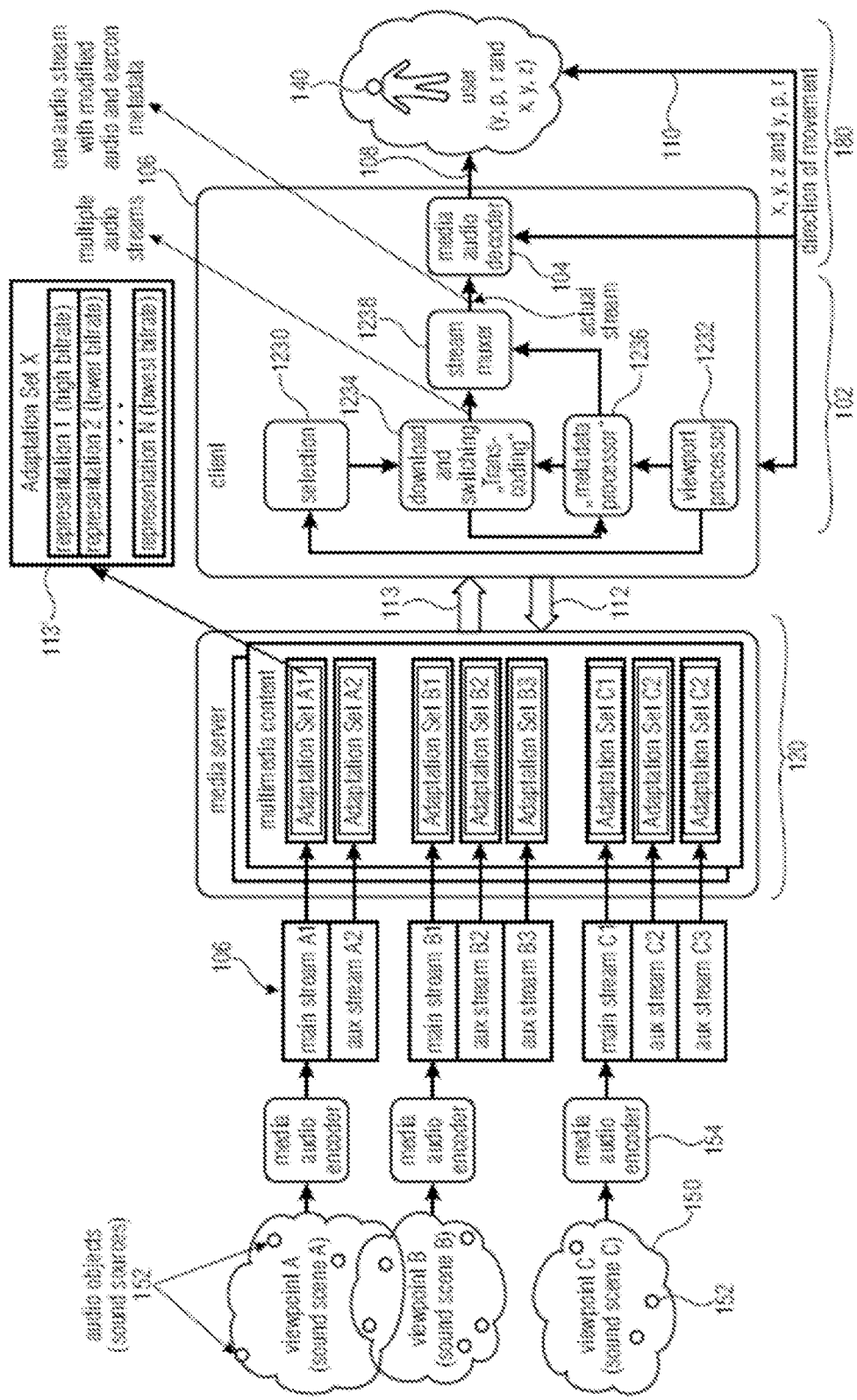

The system 102 as shown in FIG. 1b is configured to receive (audio) streams 113 on the basis of another configuration at the client side. In this example implementation at the encoding side a plurality of media encoders 154 are provided that may be used for creating one or more streams 106 for each available scene 150 associated with one sound scene part of one viewpoint.

The media server 120 may store multiple audio and (not shown) video adaptation sets comprising different encodings of the same audio and video streams at different bitrates. Additionally, the media server may contain descriptive information of all adaptation sets, which may include availability of all the created adaptation sets. The adaptation sets may include also information describing an association of one adaptation set to one particular audio scene and/or viewpoint. In this way, each adaptation set may be associated with one of the available audio scene.

The adaptation sets may include furthermore information describing the boundaries of each audio scene and/or viewpoint that may contain e.g. a complete audio scene or just individual audio objects. The boundaries of one audio scene may be defined, for example, as geometrical coordinates of a sphere (e.g., center and radius).

The system 102 on the client side may receive information about the current viewport and/or head orientation and/or movement data and/or interaction metadata and/or virtual position of the user or any information characterizing changes triggered by the user's actions. Moreover, the system 102 may receive also information about the availability of all the adaptation sets and information describing an association of one adaptation set to one audio scene and/or viewpoint; and/or information describing the "boundaries" of each audio scene and/or viewpoint (that can contain e.g., complete audio scene or just individual objects). For example, such information can be provided as part as Media Presentation Description (MPD) XML syntax in case of a DASH delivery environment.

The system 102 may provide an audio signal to the media consumption device (MCD) used for content consumption. The media consumption device is also responsible for collection information about user location and/or orientation and/or direction of movement (or any information characterizing changes triggered by the user's actions) as position and transition data 110.

A viewport processor 1232 may be configured to receive said position and transition data 110 from the media consumption device side. The viewport processor 1232 may also receive information about and the ROI signaled in the Metadata and all information available at the receiving end (system 102). The viewport processor 1232 may then decide based on all information received and/or derived from the received and/or available metadata, what audio viewpoint it should be reproduced at a certain moment in time. For example, the viewport processor 1232 may decide that one complete audio scene is to be reproduced, one new audio scene 108 has to be created out of all available audio scenes, e.g., only some audio elements from multiple audio scenes are to be reproduced, while other remaining audio elements of these audio scenes are not to be reproduced. The viewport processor 1232 may also decide if a transition between two or more audio scenes has to be reproduced.

A selection part 1230 may be provided to select, based on the information received from the viewport processor 1232 one, or more, adaptation sets out of the available adaptation sets as signaled in the information received by the receiving end; the selected adaptation sets completely describing the audio scene that should be reproduced at the current location of the user. This audio scene can be one complete audio scene as defined at the encoding side or a new audio scene may have to be created out of all available audio scenes.

Additionally, in the case when a transition between two or more audio scenes is about to happen based on the indication of the viewport processor 1232, the selection part may be configured to select one, or more, adaptation sets out of the available adaptation sets as signaled in the information received by the receiving end; the selected adaptation sets completely describing the audio scene that may need to be reproduced in the near future (e.g., if the user walk in the direction of a next audio scene with a certain speed, it can be predicted that the next audio scene will be needed and it is selected in advance of the reproduction).

Additionally, some adaptation sets corresponding to the neighboring locations may be first selected at lower bitrate and/or lower quality level, e.g. a representation encoded at a lower bitrate is chosen out the available representations in one adaptation set, and based on the position changes the quality is increased by selecting a higher bitrate for those specific adaptation sets e.g. a representation encoded at higher bitrate is selected out of the available representations in one adaptation set.

A download and switching part 1234 may be provided to request, based on the indication received from the selection part, one, or more, adaptation sets out of the available adaptation sets from the media server, being configured to receive, one, or more, adaptation sets out of the available adaptation sets from the media server and extract metadata information from all received audio streams.

A metadata processor 1236 may be provided to receive from the download and switching information about the audio streams received, information that may include the audio metadata corresponding to each audio stream received. The metadata processor 1236 may be also configured to process and manipulate the audio metadata associated with each audio stream 113, based on the information received from the viewport processor 1232 that may include information about the user location and/or orientation and/or direction of movement 110, in order to select/enable the useful audio elements 152 composing the new audio scene as indicated by the viewport processor 1232, allow the merge of all audio streams 113 into a single audio stream 106.

A stream muxer/merger 1238 that may be configured to merge all selected audio streams into one audio stream 106 based on the information received from the metadata processor 1236 that may include the modified and processed audio metadata corresponding to all received audio streams 113.

Figure 1C:
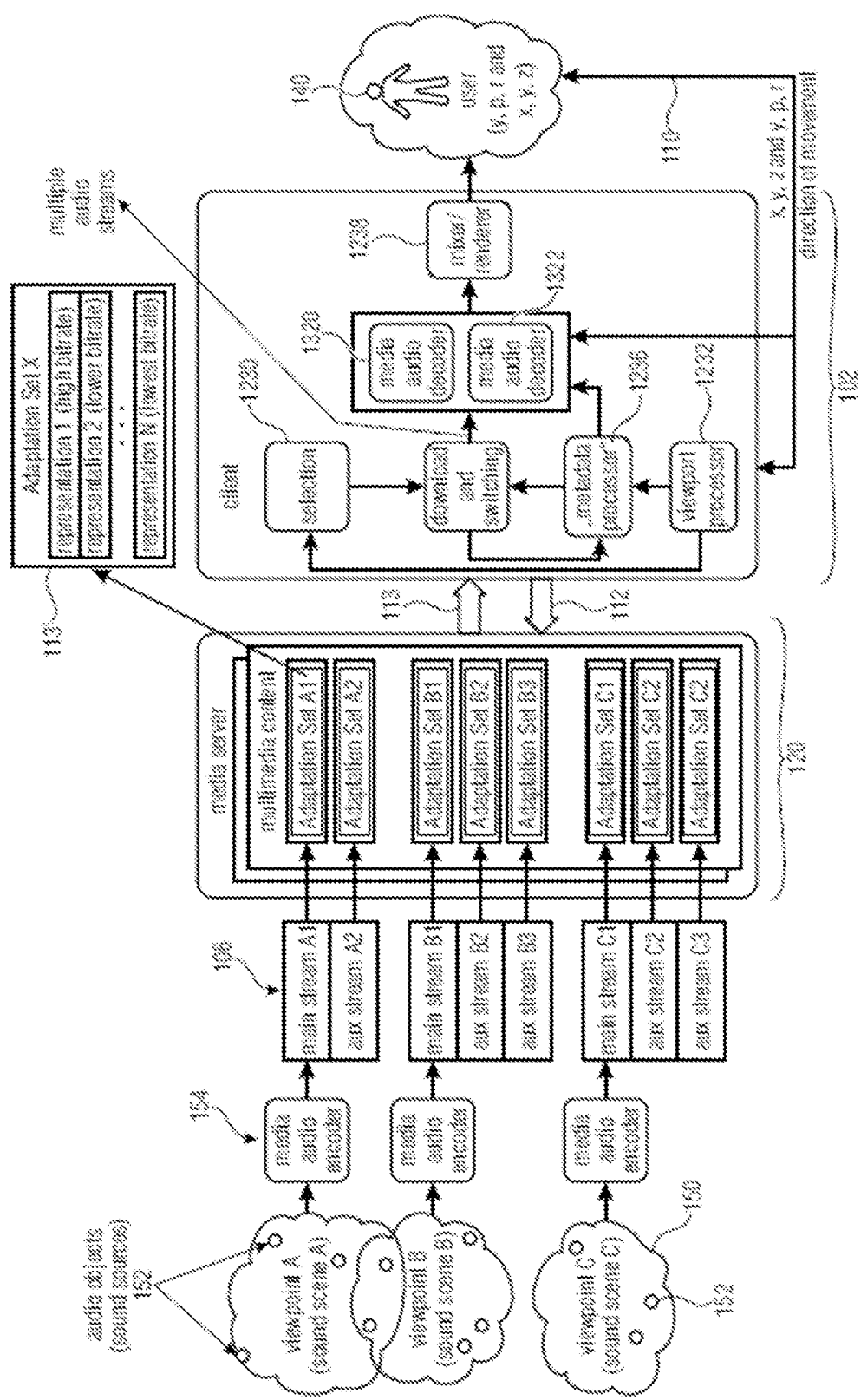
Figure 1D:
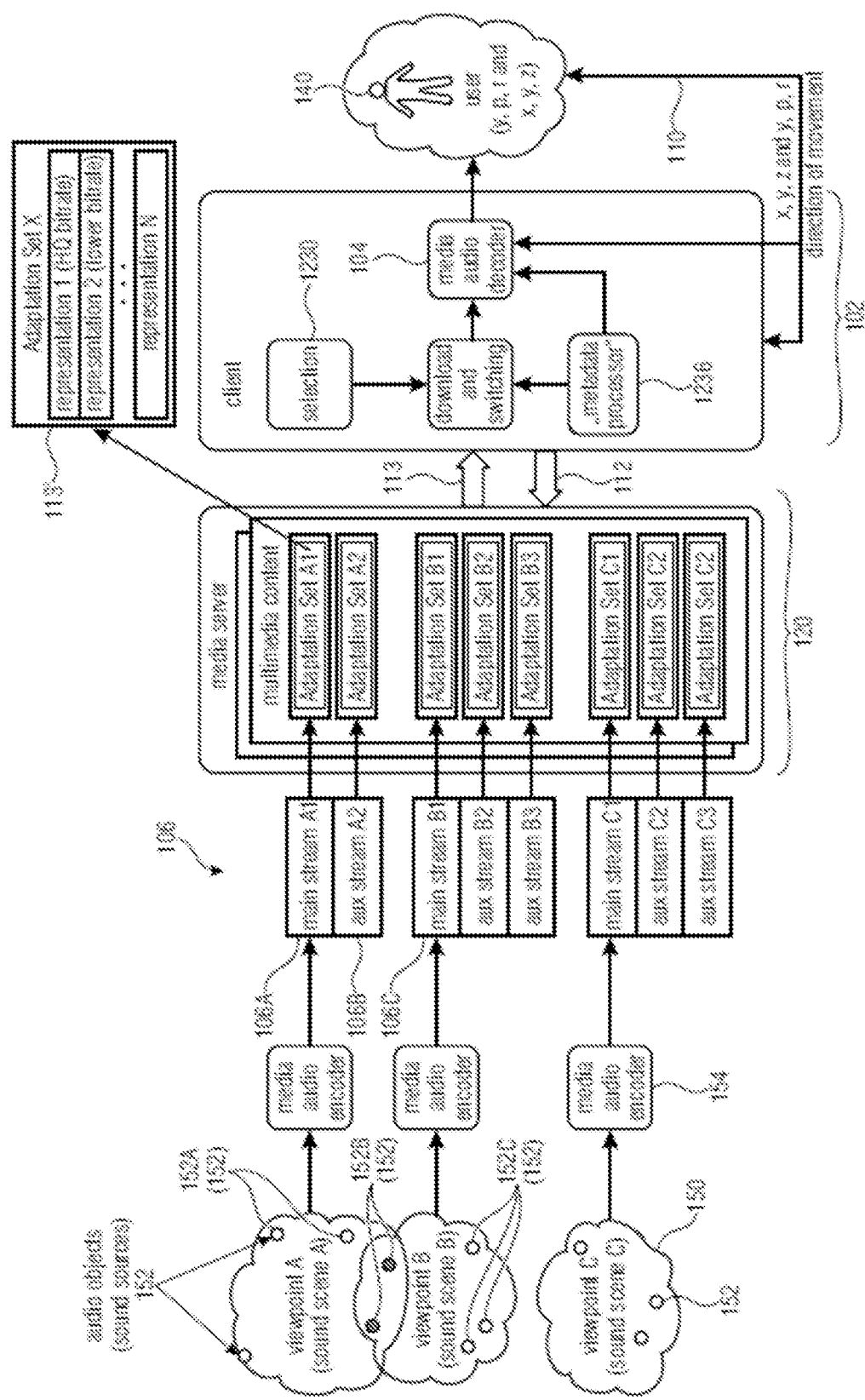
Figure 1E:
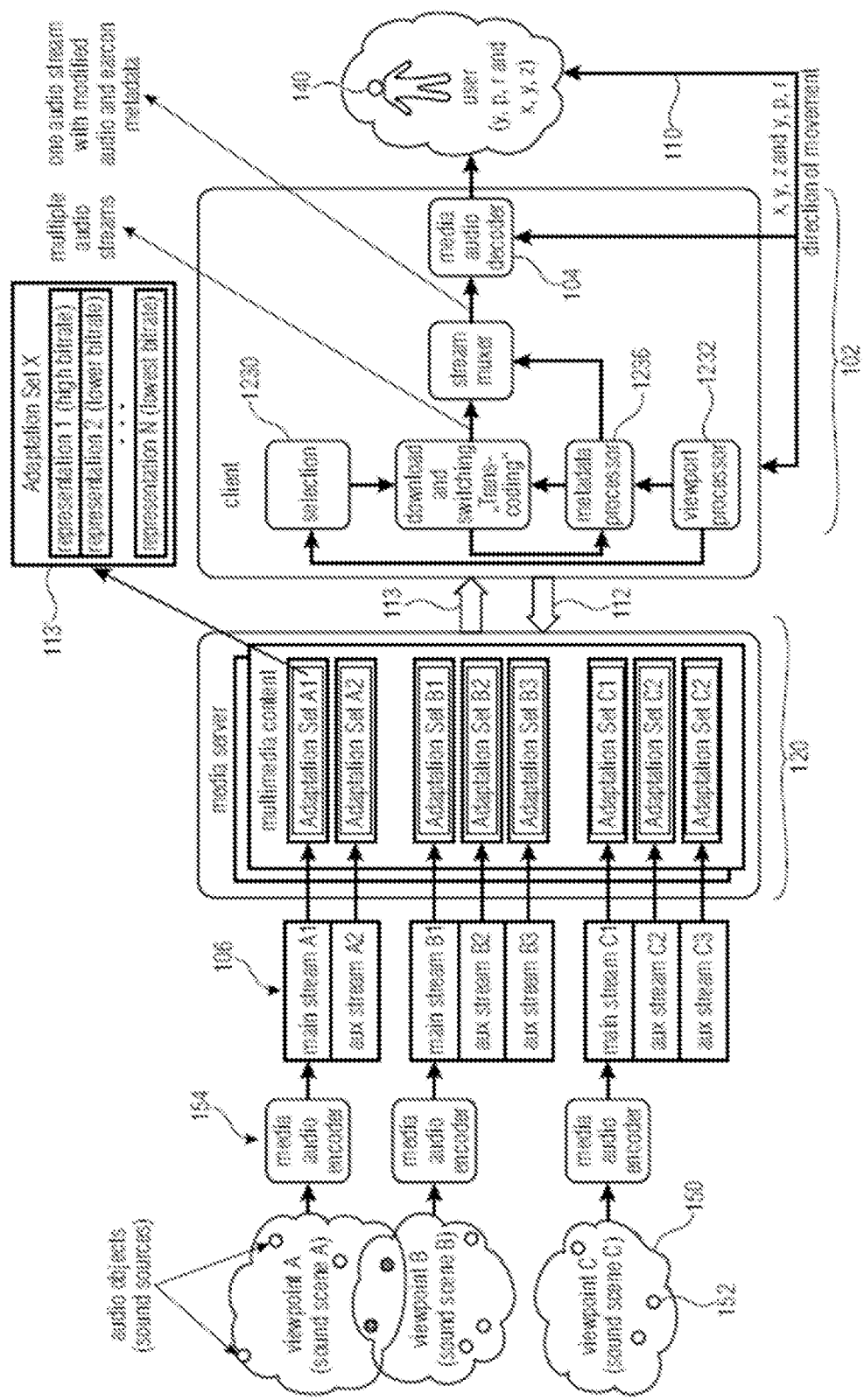
Figure 1F:
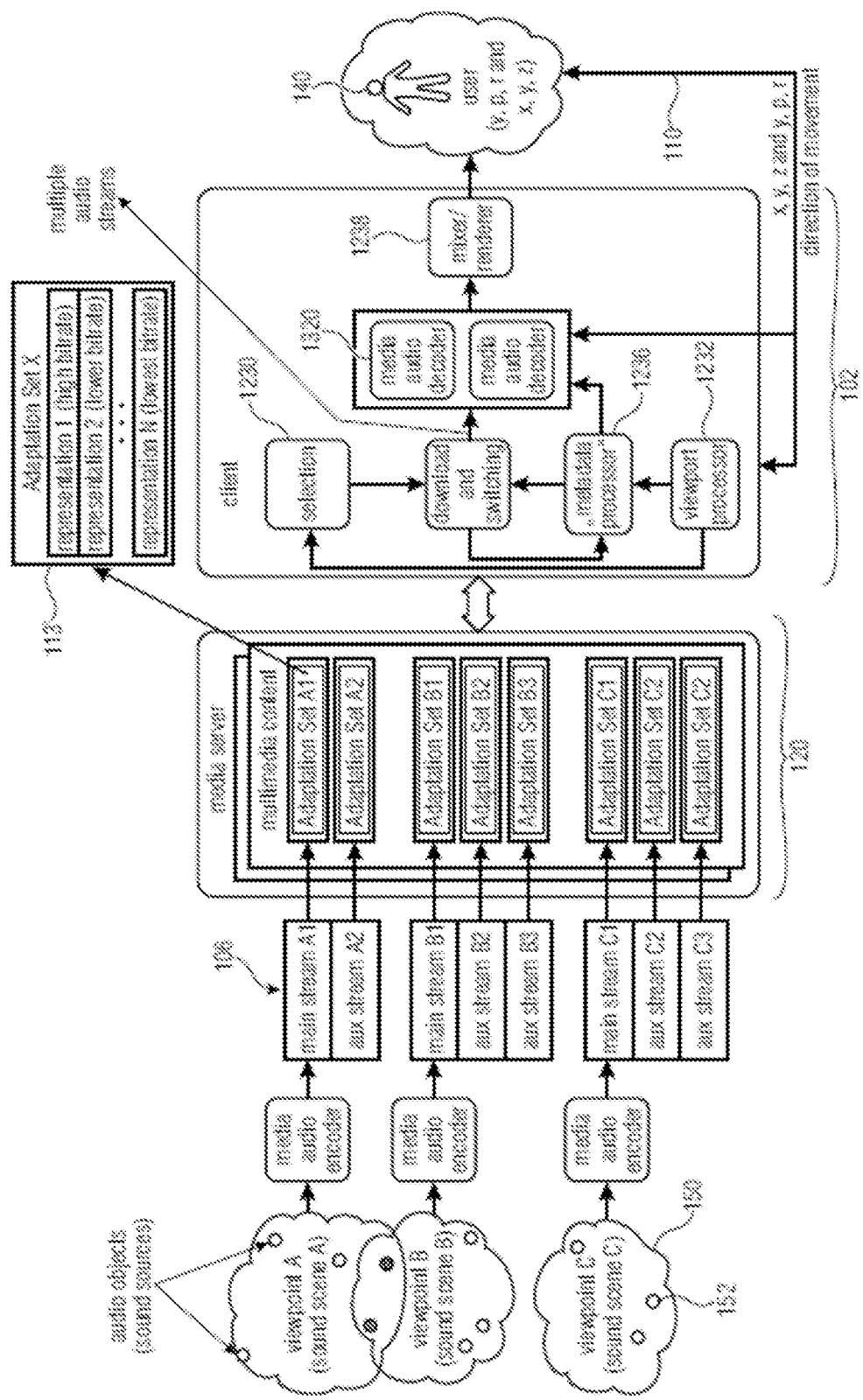
Figure 1G:
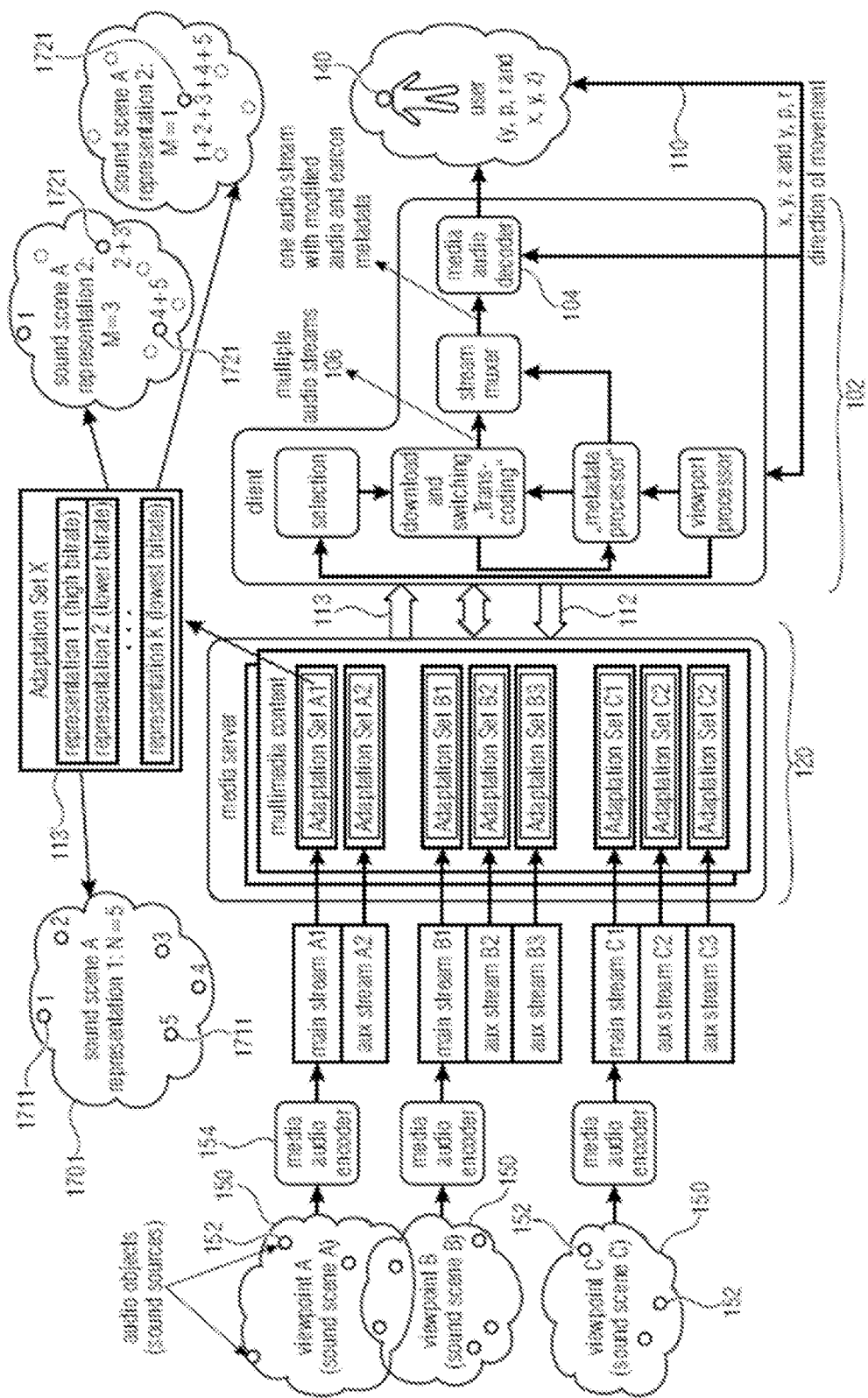

The media decoder 104 configured to receive and decode at least one audio stream for the reproduction of the new audio scene as indicated by the viewport processor 1232 based on the information about the user location and/or orientation and/or direction of movement In another embodiment the system 102 as shown in FIG. 1*g* may be configured to receive audio streams 106 at different audio bitrates and/or quality levels. The hardware configuration of this embodiment is similar to that of FIG. 1*b*. At least one visual environment scene 150 may be associated to at least one plurality of N audio elements (N>=2), each audio element being associated to a position and/or area in the visual environment. The at least one plurality of N audio elements 152 is provided in at least one representation at high bitrate and/or quality level, and wherein the at least one plurality of N audio elements 152 is provided in at least one representation at low bitrate and/or quality level, where the at least one representation is obtained by processing the N audio elements 152 to obtain a smaller number M of audio elements 152 (M<N) associated to a position or area close to the position or area of the N audio elements 152.

The processing of the N audio elements 152 could be for example a simple addition of the audio signals or could be an active downmix based on their spatial position 110 or rendering of audio signals using their spatial position to a new virtual position located in between the audio signals. The system may be configured to request the representation at higher bitrate and/or quality level for the audio elements, in case the audio elements are more relevant and/or more audible at the current user's virtual position in the scene, wherein the system is configured to request the representation at lower bitrate and/or quality level for the audio elements, in case the audio elements are less relevant and/or less audible at the current user's virtual position in the scene.

Figure 1H:
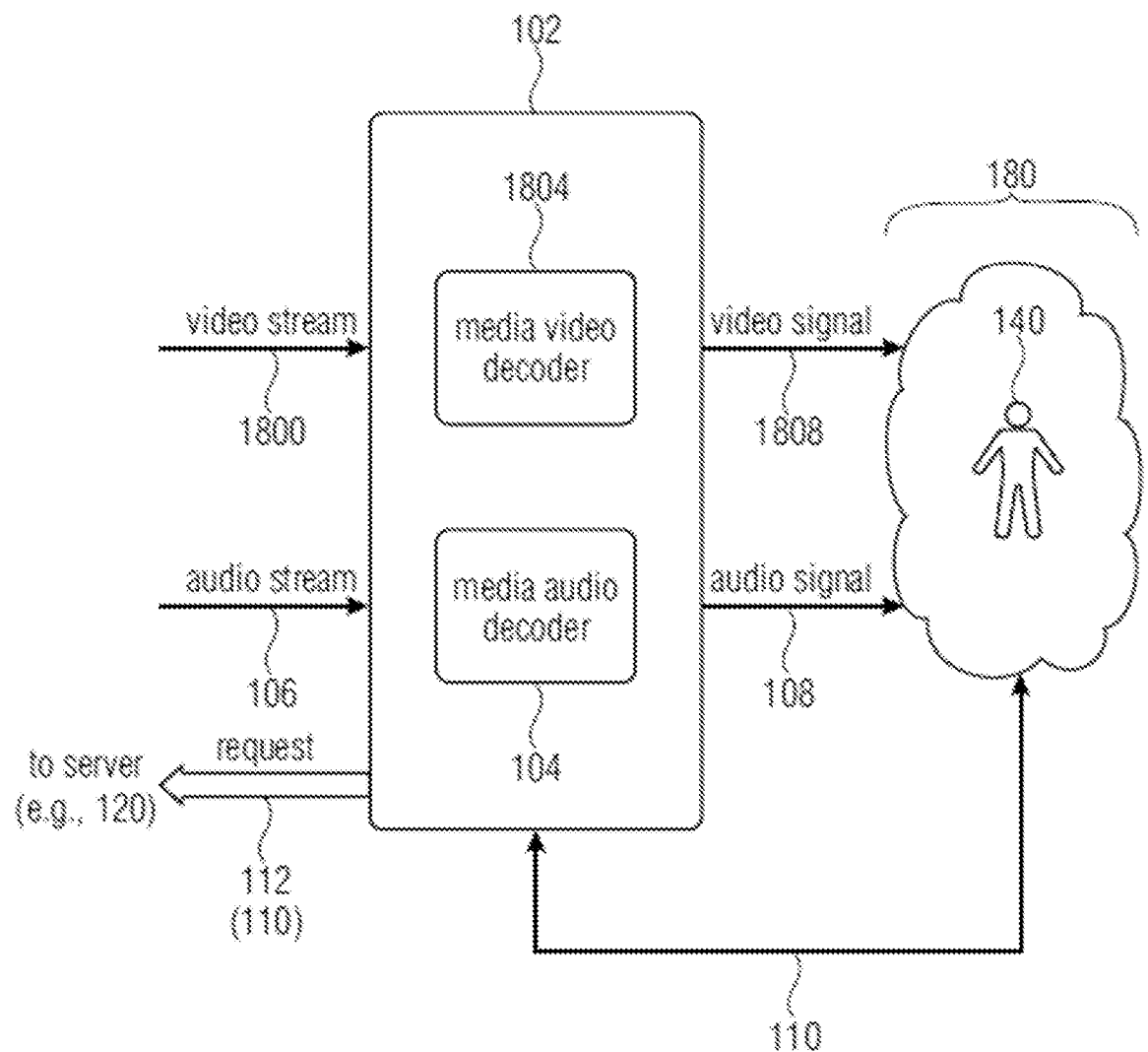

FIG. 1h shows an example of a system (which may be the system 102) showing a system 102 for a virtual reality, VR, augmented reality, AR, mixed reality, MR, or 360-degree video environment configured to receive video streams 1800 and audio streams 106 to be reproduced in a media consumption device, wherein the system 102 may comprise:

at least one media video decoder 1804 configured to decode video signals 1808 from video streams 1800 for the representation of a VR, AR, MR or 360-degree video environment to a user, and at least one audio decoder 104 configured to decode audio signals 108 from at least one audio stream 106.

The system 102 may be configured to request (112) at least one audio stream 106 and/or one audio element of an audio stream and/or one adaptation set to a server (e.g. 120) on the basis of at least the user's current viewport and/or head orientation and/or movement data and/or interaction metadata and/or virtual positional data 110 (e.g., provided as feedback from the media consumption device 180.

Figure 2A:
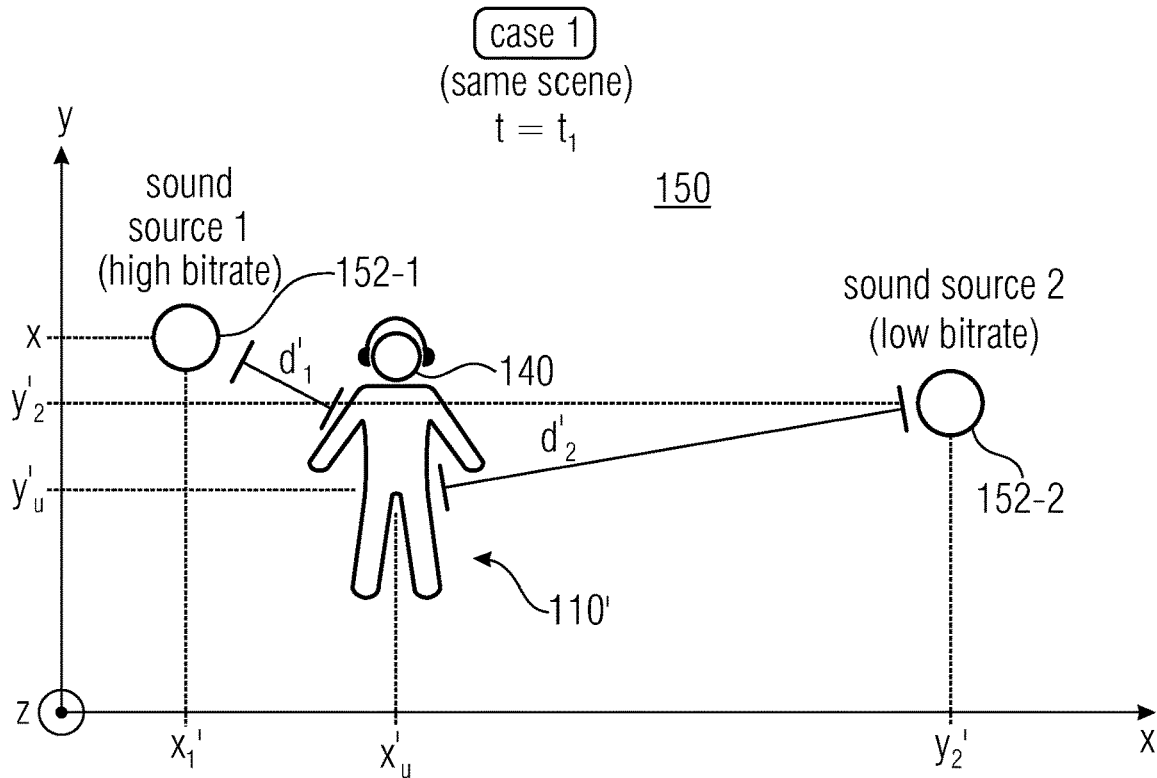
FIGS. 2a-6 show inventive scenarios.

The system 102 may be the same of the system 102 of FIGS. 1a-1g and/or obtain the scenarios of FIG. 2a ff.

The present examples also refer to a method for a virtual reality, VR, augmented reality, AR, mixed reality, MR, or 360-degree video environment configured to receive video and/audio streams to be reproduced in a media consumption device [e.g., playback device], comprising:

decoding video signals from video streams for the representation of VR, AR, MR or 360-degree video environment scenes to a user, and decoding audio signals from audio streams, requesting to, and/or obtaining from, a server, at least one audio stream on the basis of the user's current viewport and/or positional data and/or head orientation and/or movement data and/or metadata and/or virtual positional data and/or metadata.

Case 1

Different scenes/environments 150 in general imply the reception of different streams 106 from a server 120. However, the streams 106 received by the audio decoder 104 may also be conditioned by the position of the user in the same scene 150.

At a first (starting) moment ($t=t_1$) shown in FIG. 2a, a user is positioned e.g. in a scene 150, having a first defined position in a VR-environment (or AR-environment, or MR-environment). In the Cartesian XYZ-system (e.g., horizontal) a first viewport (position) 110' of the user is associated with the coordinates $x'_u$ and $y'_u$ (the axis Z is here oriented to exit from the paper). In this first scene 150, two audio elements 152-1 and 152-1 are located, having respective coordinates $x'_1$ and $y'_1$ for audio element 1 (152-1) and $x'_2$ and $y'_2$ for audio element 2 (152-2). The distance $d'_1$ of the user to the audio element 1 (152-1) is smaller than the distance $d'_2$ (152-1) of the user to the audio element 2. All of the user position (viewport) data are transmitted from the MCD to the system 102.

Figure 2B:
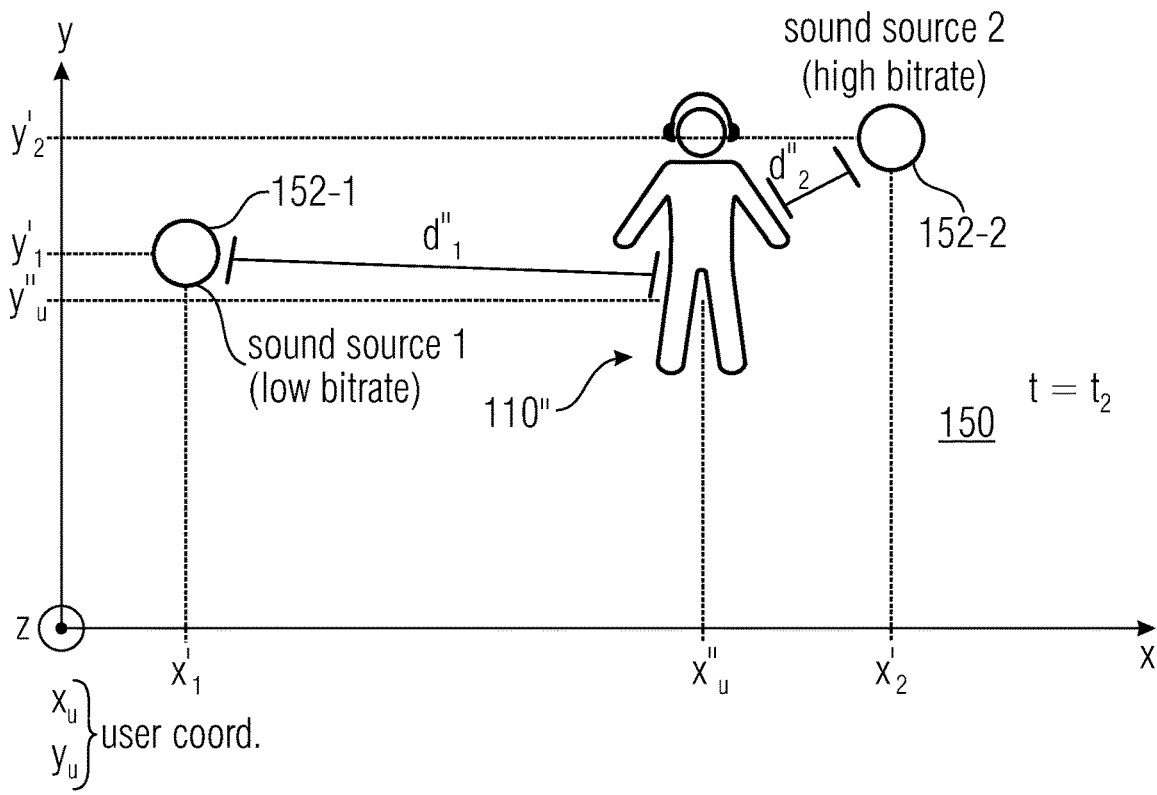

At a second exemplary moment ($t=t_2$) shown in FIG. 2b, the user is positioned e.g. in the same scene 150, but in a second, different position. In the Cartesian XY-system a second viewport (position) 110" of the user is associated with the new coordinates $x''_u$ and $y''_u$ (the axis Z is here oriented to exit from the paper). Now the distance $d''_1$ of the user from the audio element 1 (152-1) is greater than the distance $d''2$ of the user from the audio element 2 (152-2). All of the user position (viewport) data are again transmitted from the MCD to the system 102.

The user, equipped with said MCD for visualizing a certain viewport within a 360-degree environment may be listening, for example, over headphones. The user may enjoy the reproduction of different sounds for different positions depicted in FIGS. 2a and 2b of the same scene 150.

Any position and/or any transition and/or viewport and/or virtual position and/or head orientation and/or movement data within the scene e.g. from FIGS. 2a to 2b may be periodically transmitted (e.g., in feedback) from the MCD to the system 102 (client) as signal 110. The client may retransmit the position and transition data 110' or 110" (e.g., viewport data) to the server 120. Either the client 102 or the server 120 can decide based on the position and transition data 110' or 110" (e.g., viewport data) which audio streams 106 may be used to reproduce the correct audio scene at the current user position. The client could decide and transmit a request 112 for a corresponding audio stream 106 while the server 120 may be configured to deliver accordingly stream(s) 106 depending of the position information provided by the client (system 102). Alternatively, the server 120 could decide and deliver accordingly stream(s) 106 depending of the position information provided by the client (system 102).

The client (system 102) may request the transmission of the streams to be decoded for representing the scene 150. In some examples, the system 102 may transmit information regarding the highest quality level to be reproduced on the MCD (in other examples, it is the server 120 that decides the quality level to be reproduced on the MCD, on the basis of the position of the user in the scene). In response, the server 120 may select one of a multitude of representations associated with the audio scene to be represented, to deliver at least one stream 106 according to the position 110' or 110" of the user. The client (system 102) may therefore be configured to deliver, e.g., through an audio decoder 104, an audio signal 108 to the user so as to reproduce the sound associated with his actual (effective) position 110' or 110". (adaptation sets 113 may be used: different variants of the same streams, e.g., at different bitrates, may be used for different positions of the user.)

Streams 106 (which may be pre-processed or generated on the fly) may be transmitted to the client (system 102), and may be configured for a multitude of Viewpoints associated with certain sound scenes.

It has been noted that different qualities (e.g., different bitrates) may be provided for different streams 106 according to the particular position (e.g., 110' or 110") of the user in the (e.g., virtual) environment. For example: In case of a plurality of audio sources 152-1 and 152-2, each audio source 152-1 and 152-2 may be associated to a particular position within the scene 150. The closer the user's position 110' or 110' to the first audio source 152-1, the higher the needed resolution and/or quality of the stream associated to the first audio source 152-2. This exemplary case may be applied to the audio element 1 (152-1) in FIG. 2a as well as the audio element 2 (152-2) in FIG. 2b. The more distant the user's position 110 from the second audio source 152-2, the lower the needed resolution of the stream 106 associated to the second audio source 152-2. This exemplary case may be applied to the audio element 2 (152-2) in FIG. 2a as well as the audio element 1 (152-1) in FIG. 2b.

In fact, the first, a close audio source is to be heard at a higher level (and therefore provided at higher bitrate), while the second, a far audio source is to be heard at lower level (which may permit to involve a lower resolution);

Therefore, on the basis of the position 110' or 110" in the environment as provided by the client 102, the server 120 may provide different streams 106 at different bitrates (or other quality). Based on the fact that the audio elements which are far away do not require high quality levels, the overall user quality of experience is preserved even if they are delivered at lower bitrate or quality level.

Hence, different quality levels may be used for some audio elements at different user's positions, while preserving the quality of experience.

Without this solution, all the streams 106 should be provided by the server 120 to the client at the highest bitrate, which would increase the payload in the communication channel from the server 120 to the client.

Case 2

Figure 3:
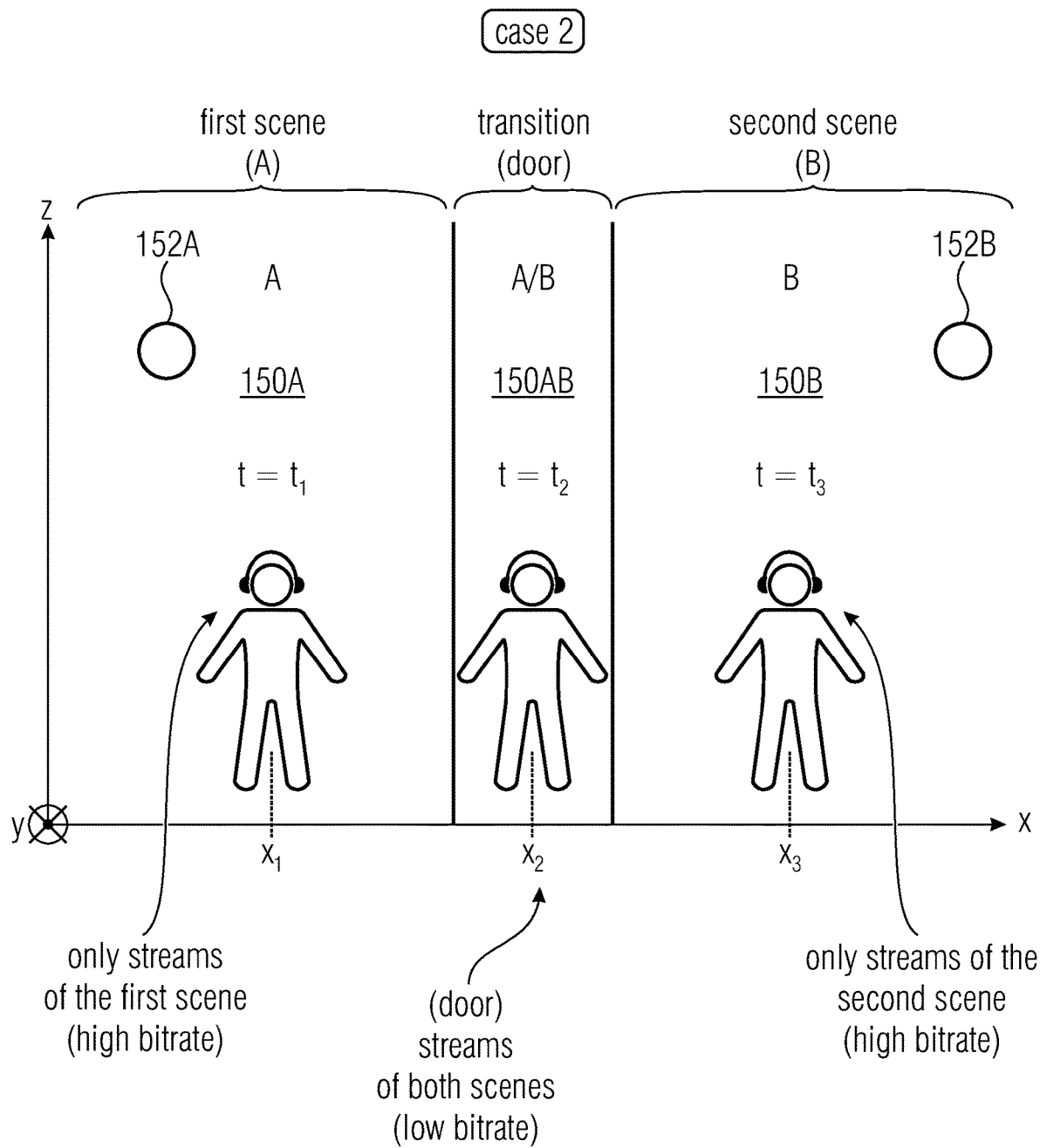

FIG. 3 (case 2) shows an embodiment with another exemplary scenario (represented in a vertical plane XZ of a space XYZ, where the axis Y is represented as entering the paper), wherein the user moves in a first VR, AR and/or MR scene A (150A), opens a door and walks (transition 150AB) through, implying a transition of audio from the first scene 150A at time $t_1$ over a transitory position (150AB) at time $t_2$ to a next (second) scene B (150B) at time $t_3$.

At time point $t_1$ the user may be at a position $x_1$ in the x-direction of a first VR, AR and/or MR scene. At time point $t_3$ the user may be in a different, second VR, AR and/or MR scene B (150B) at position $x_3$. At instant $t_2$ the user may be in a transitional position 150AB, while he is opening a door (e.g., a virtual door) and walking through. The transition therefore implies a transition of audio information from the first scene 150A to the second scene 150B.

In this context, the user is changing his position 110 e.g. from the first VR-environment (characterized by a first viewpoint (A) as shown in FIG. 1a) to the second VR-environment (characterized by a second viewpoint (B) as shown in FIG. 1a). In a particular case, e.g., during the transition through the door located at a position $x_2$ in the x-direction, some audio elements 152A and 152B may be present in both viewpoints (positions A and B).

The user (being equipped with the MCD) is changing his position 110 ($x_1$-$x_3$) toward the door, which may imply that, in the transitional position $x_2$, the audio elements belong to both first scene 150A and second scene 150B. The MCD transmits the new position and transition data 110 to the client, which retransmits it to the media server 120. The user may be enabled to listen to the appropriate audio sources defined by the intermediate position $x_2$ between the first and the second positions $x_1$ and $x_3$.

Any position and any transition from the first position ($x_1$) to the second position ($x_3$) is now periodically (e.g., continuously) transmitted from the MCD to the client. The client 102 may retransmit the position and transition data 110 ($x_1$-$x_3$) to the media server 120, which is configured to deliver accordingly one dedicated item of e.g. a new set of preprocessed streams 106 in a form of an actualized adaptation set 113', depending of the received position and transition data 110 ($x_1$-$x_3$).

The media server 120 may select one of a multitude of representations associated with the aforementioned information, not only regarding the ability of the MCD to display the highest bitrate but also regarding the position and transition data 110 ($x_1$-$x_3$) of the user during his movement from one position to another. (In this context it is possible to use adaptation sets: the media server 120 may decide which adaptation set 113' optimally represents the virtual transition of the user, without interfering with rendering capacity of the MCD.)

The media server 120 may deliver therefore a dedicated stream 106 (e.g., as a new adaptation set 113') according to the transition of positions. The client 102 may be configured to accordingly deliver an audio signal 108 to the user 140, e.g., via the media audio decoder 104.

Streams 106 (generated on the fly and/or preprocessed) may be transmitted in a periodically (e.g., continuously) actualized adaptation set 113' to the client 102.

When the user walks through the door, the server 120 may transmit both the streams 106 of the first scene 150A and the streams 106 of the second scene 150B. This is in order to mix or mux or compose or reproduce simultaneously these streams 106, to give a real impression to the user. Therefore, on the basis of the position 110 of the user (e.g., "position corresponding to the door"), the server 120 transmits different streams 106 to the client.

Even in this case, as the different streams 106 are to be heard simultaneously, they may have different resolutions and may be transmitted from the server 120 to the client at different resolutions. When the user has completed the transition and is in the second (position) scene 150A (and has closed the door behind him), there will be the possibility for the server 120 of reducing or refraining from transmitting the streams 106 of the first scene 150 (in case the server 120 has already provided the client 102 with the streams, the client 102 may decide not to use them).

Case 3

Figure 4:
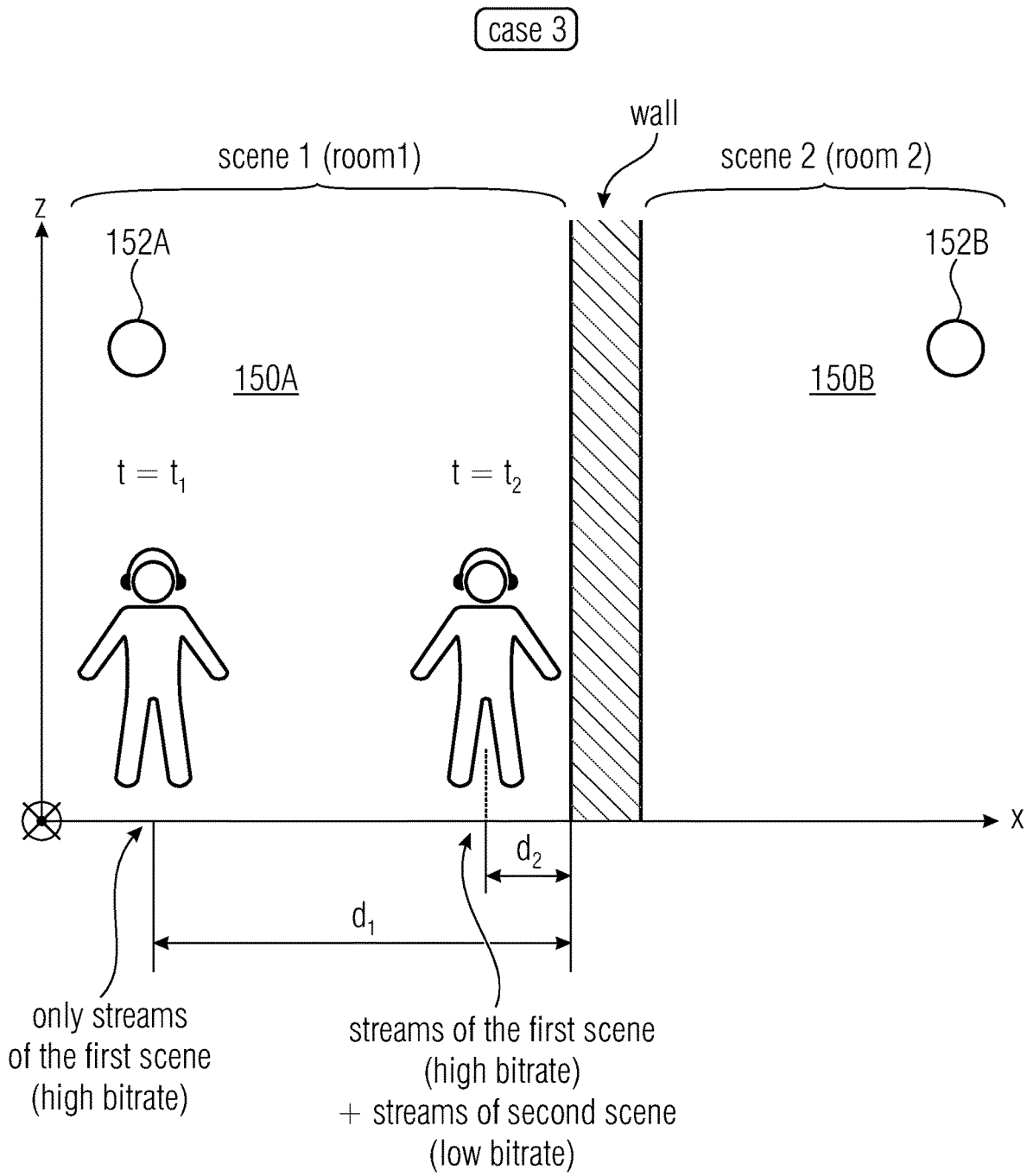

FIG. 4 (case 3) shows an embodiment with another exemplary scenario (represented in a vertical plane XZ of a space XYZ, where the axis Y is represented as entering the paper), where the user moves in a VR, AR and/or MR scene 150A implying a transition of audio from one first position at time $t_1$ to a second position also in the first scene 150A at time $t_2$. The user in the first position may be far from a wall at time $t_1$ at a distance $d_1$ from the wall; and may be close to the wall at time $t_2$, at a distance $d_2$ from the wall. Here, $d_1 > d_2$. While at the distance $d_1$ the user only hears the source 152A of the scene 150A, he may also hear the source 152B of the scene 150B beyond the wall.

When the user is in the second position ($d_2$), the client 102 sends to the server 120 the data regarding the user's position 110 ($d_2$) and receives, from the server 120, not only the audio streams 106 of the first scene 150A, but also the audio streams 106 of the second scene 150B. On the basis of the metadata provided by the server 120, for example, the client 102 will cause the reproduction, e.g., via the decoder 104, of the streams 106 of the second scene 150B (beyond the wall) at a low volume.

Even in this case, the bitrate (quality) of the streams 106 of the second scene 150B may be low, hence involving a reduced transmission payload from the server 120 to the client. Notably, the position 110 ($d_1$, $d_2$) of the client (and/or the viewport) defines the audio streams 106 that are provided by the server 120.

For example, the system 102 may be configured to obtain the streams associated to a first current scene (150A) associated to the first, current environment, and, in case the distance of the user's position or virtual position from a boundary (e.g., corresponding to the wall) of the scene is below a predetermined threshold (e.g., when $d_2 < d_{threshold}$), the system 102 further obtains audio streams associated to the second, adjacent and/or neighboring environment associated to the second scene (150B).

Case 4

Figure 5A:
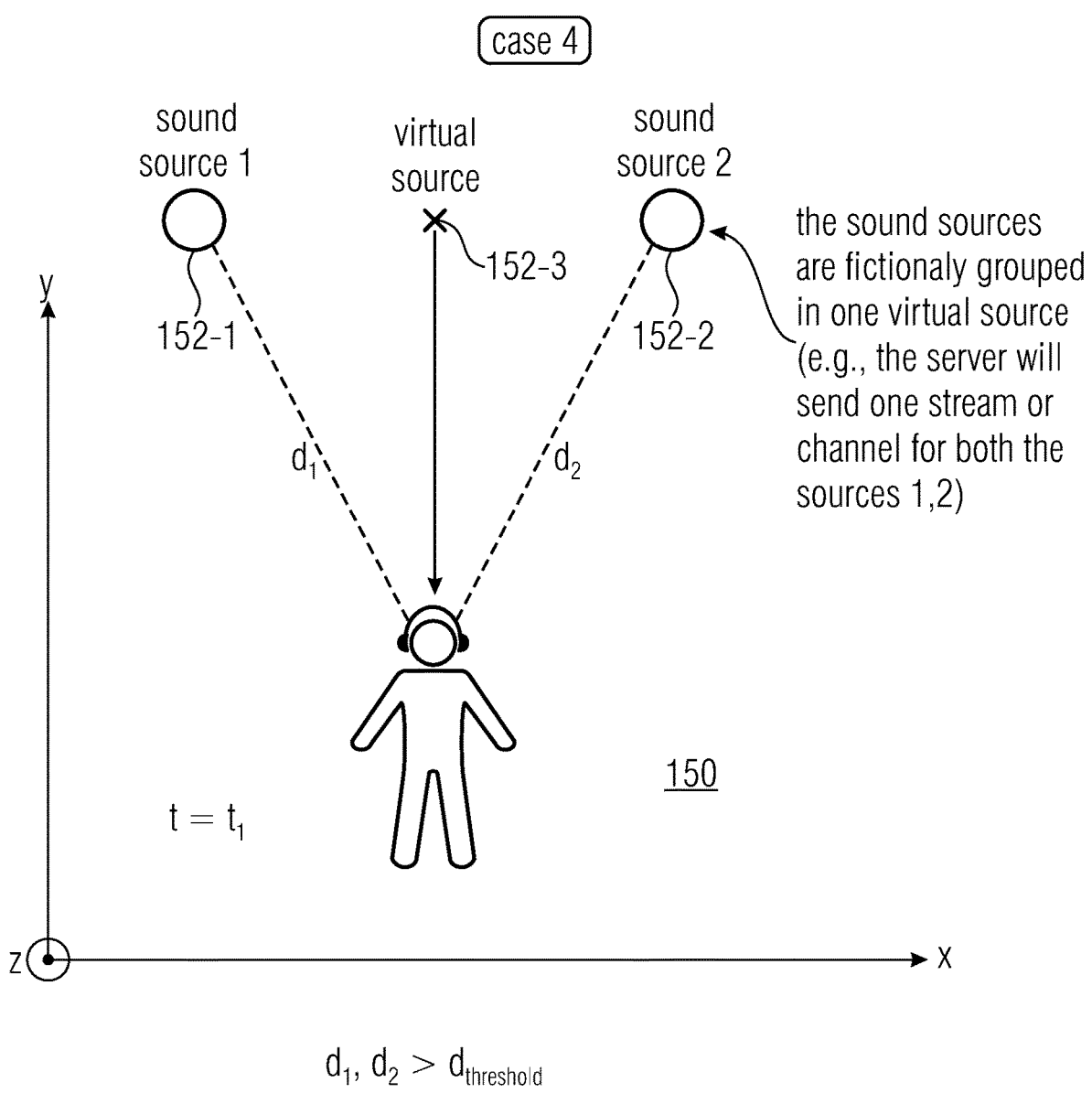
Figure 5B:
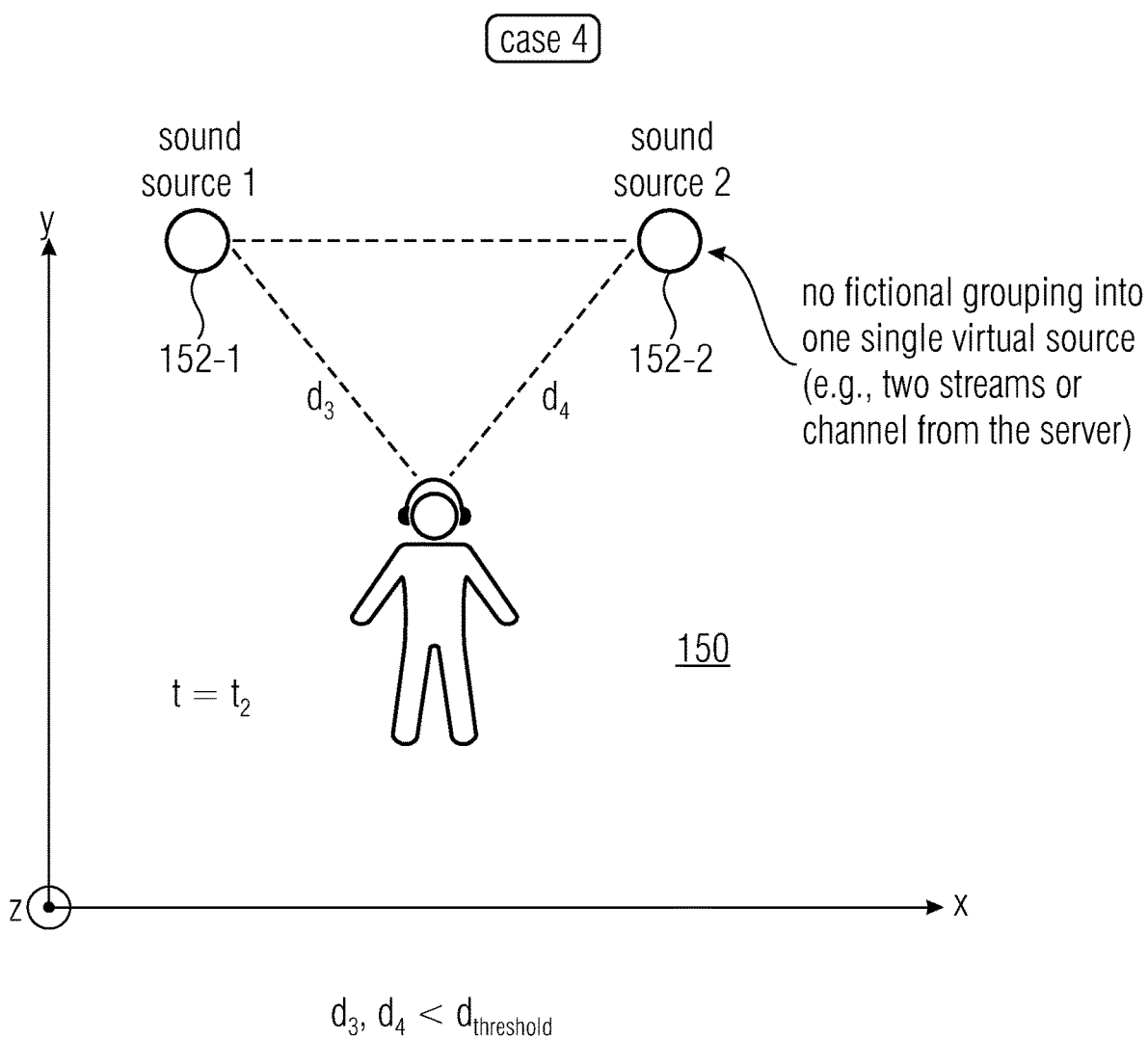

FIGS. 5a and 5b show an embodiment with another exemplary scenario (represented in a horizontal plane XY of a space XYZ, where the axis Z is represented as exiting from the paper), wherein the user is positioned in one and the same VR, AR and/or MR scene 150 but at different instants at different distances to e.g. two audio elements.

At a first instant $t=t_1$ shown in FIG. 5a, a user is positioned e.g. at a first position. In this first position, a first audio element 1(152-1) and a second audio element 2 (152-2) are located (e.g., virtually) at distances $d_1$ and respective $d_2$ from the user equipped with the MCD. Both distances $d_1$ and $d_2$ may be greater in this case than a defined threshold distance $d_{threshold}$, and therefore the system 102 is configured to group both audio elements into one single virtual source 152-3. The position and the properties (e.g., spatial extent) of the single virtual source can be computed based for example on the positions of the original two sources in such a way that it mimics as good as possible the original sound field generated by the two sources (e.g., two well localized point sources can be reproduced in the middle of the distance between them as a single source). The user position data 110 ($d_1$, $d_2$) may be transmitted from the MCD to the system 102 (client) and subsequently to the server 120, which may decide to send an appropriate audio stream 106 to be rendered by the server system 120 (in other embodiments, it is the client 102 which decides which streams to be transmitted from the server 120). By grouping both audio elements into one single virtual source 152-3, the server 120 may select one of a multitude of representations associated with the aforementioned information. (For example, it is possible to deliver accordingly a dedicated stream 106 an adaptation set 113' accordingly associated with e.g. one single channel.) Consequently the user may receive through the MCD an audio signal as being transmitted from the single virtual audio element 152-3 positioned between the real audio elements 1 (152-1) and 2 (152-2).

At a second instant $t=t_2$ shown in FIG. 5b, a user is positioned e.g. in the same scene 150, having a second defined position in the same VR-environment as in FIG. 5a. In this second position, the two audio elements 152-1 and 152-2 are located (e.g., virtually) at distances $d_3$ and respective $d_4$ from the user. Both distances $d_3$ and $d_4$ may be smaller as the threshold distance $d_{threshold}$, and therefore the grouping of the audio elements 152-1 and 152-2 into one single virtual source 152-3 is not used anymore. The user position data are transmitted from the MCD to the system 102 and subsequently to the server 120, which may decide to send another appropriate audio stream 106 to be rendered by the system server 120 (in other embodiments, this decision is made by the client 102). By avoiding to group the audio elements, the server 120 may select a different representation associated with the aforementioned information to deliver accordingly a dedicated stream 106 with an adaptation set 113' accordingly associated with different channels for each audio element. Consequently the user may receive through the MCD an audio signal 108 as being transmitted from two different audio elements 1 (152-1) and 2 (152-2). Therefore the closer the user's position 110 to the audio sources 1 (152-1) and 2 (152-2), the higher the needed quality level of the stream associated to the audio sources has to be selected.

In fact, the closer the audio sources 1 (152-1) and 2 (152-2) are positioned relative to the user, as depicted in FIG. 5b, the higher the level has to be adjusted and therefore the audio signals 108 may be rendered at a higher quality level. In contrast the remote positioned audio sources 1 and 2 represented in FIG. 5a have to be heard at a lower level as reproduced by the single virtual source, therefore being rendered e.g. at a lower quality level.

In a similar configuration a multitude of audio elements may be located in front of a user, all of them being positioned at distances greater than the threshold distance from the user. In one embodiment two groups of five audio elements each may be combined in two virtual sources. The user position data are transmitted from the MCD to the system 102 and subsequently to the server 120, which may decide to send an appropriate audio stream 106 to be rendered by the system server 120. By grouping all of the 10 audio elements into only two single virtual sources the server 120 may select one of a multitude of representations associated with the aforementioned information to deliver accordingly a dedicated stream 106 with an adaptation set 113' accordingly associated with e.g. two single audio elements. Consequently the user may receive through the MCD an audio signal as being transmitted from two distinct virtual audio elements positioned in the same positioning area with the real audio elements.

At a subsequent instant of time, a user is approaching the multitude of (ten) audio elements. In this subsequent scene all of the audio elements are located at distances being smaller as the threshold distance $d_{threshold}$, and therefore the system 102 is configured to terminate the grouping of audio elements. The new user position data are transmitted from the MCD to the system 102 and subsequently to the server 120, which may decide to send another appropriate audio stream 106 to be rendered by the server system 120. By not grouping the audio elements, the server 120 may select a different representation associated with the aforementioned information to deliver accordingly a dedicated stream 106 with an adaptation set 113' accordingly associated with different channels for each audio element. Consequently the user may receive through the MCD an audio signal as being transmitted from ten different audio elements. Therefore, the closer the user's position 110 to the audio sources is, the higher the needed resolution of the stream associated to the audio sources has to be selected.

Case 5

Figure 6:
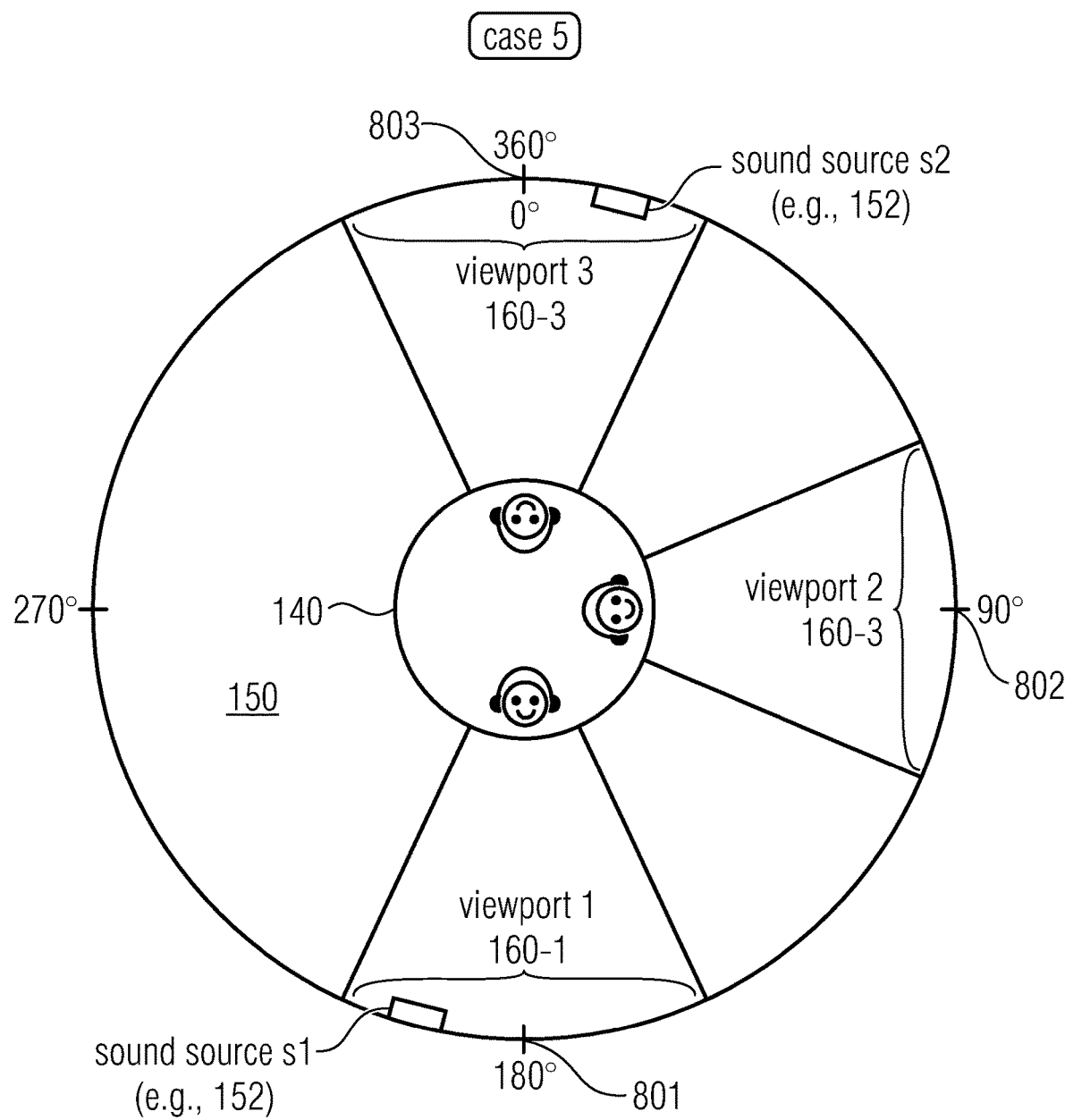

FIG. 6 (case 5) depicts a user 140 located in one position of one single scene 150 wearing a Media Consumer Device (MCD) which may be directed into exemplary three different directions (each associated to a different viewport 160-1, 160-2, 160-3). These directions as shown in FIG. 6 may have an orientation (e.g., angular orientation) in a polar coordinate system and/or Cartesian XY-system pointing at a first viewpoint 801 located e.g. at 180° in the bottom part of FIG. 6, at a second viewpoint 802 located e.g. 90° on the right side of FIG. 6 and at a third viewpoint 803 located e.g. at 0° in the upper part of FIG. 6. Each of these viewpoints is associated to the orientation of the user 140 wearing the Media Consumer Device (MCD), the user being positioned in the centre being offered a specific viewport displayed by the MCD rendering the corresponding audio signal 108 according to the orientation of the MCD.

In this particular VR environment a first audio element s1 (152) is located in the first viewport 160-1, in the neighborhood of the viewpoint located e.g. at 180° and a second audio element s2 (152) is located in the third viewport 160-3 the neighborhood of the viewpoint located e.g. at 180°. Before changing his orientation, the user 140 experiences in the first orientation toward viewport 801 (viewport 160-1) a sound associated with his actual (effective) position being louder from audio element s1 than audio element s2.

By changing his orientation, the user 140 may experience in the second orientation toward viewport 802, a sound associated with his actual position 110 being almost of the same loudness coming sidewise from both audio elements s1 and s2.

Finally, by changing his orientation, the user 140 may experience in the third orientation toward viewport 801 (viewport 160-3) a sound associated with audio element 2 to be louder than the sound associated to the audio element s1 (in fact, the sound coming from audio element 2 arrives from the front, while the sound coming from audio element 1 arrives from rear).

Different viewports and/or orientations and/or virtual position data may therefore be associated to different bitrates and/or qualities.

Other Cases and Examples

Figure 7A:
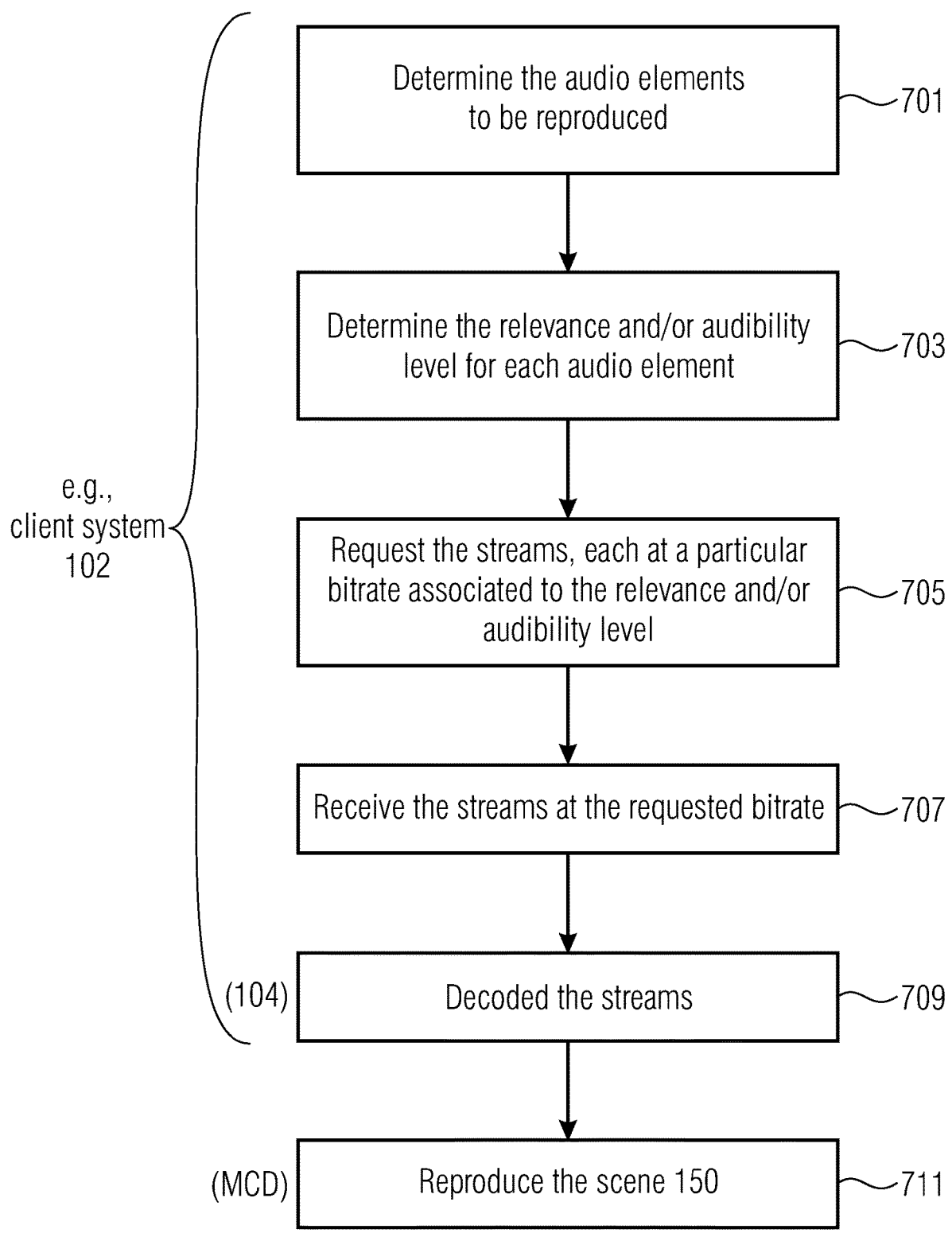
FIGS. 7a-8b show inventive methods.

FIG. 7a shows an embodiment of the method for receiving audio streams by a system in form of a sequence of operation steps in a diagram. At any moment a user of the system 102 is associated with his current viewport and/or head orientation and/or movement data and/or interaction metadata and/or virtual position. At a certain moment the system may determine in step 701 of FIG. 7a the audio elements to be reproduced at the basis of the current viewport and/or head orientation and/or movement data and/or interaction metadata and/or virtual position. Therefore, in a next step 703 the relevance and audibility level for each audio element may be determined. As described above in FIG. 6 a VR environment may have different audio elements located in a particular scene 150 either in the neighborhood of the user or further away, but also having a specific orientation in the 360 degrees surrounding. All of these factors determine the relevance and audibility level for each of said audio element.

In a next step 705 the system 102 may request the audio streams according to the determined relevance and audibility level for each of the audio elements from the media server 120.

In a next step 707 the system 102 may receive the audio streams 113 prepared accordingly by the media server 120, wherein streams with different bitrates may reflect the relevance and audibility level as determined in the foregoing steps.

In a next step 709 the system 102 (e.g., the audio decoder) may decode the received audio streams 113, so that at step 711 the particular scene 150 is reproduced (e.g., by the MCD), according to the current viewport and/or head orientation and/or movement data and/or interaction metadata and/or virtual position.

Figure 7B:
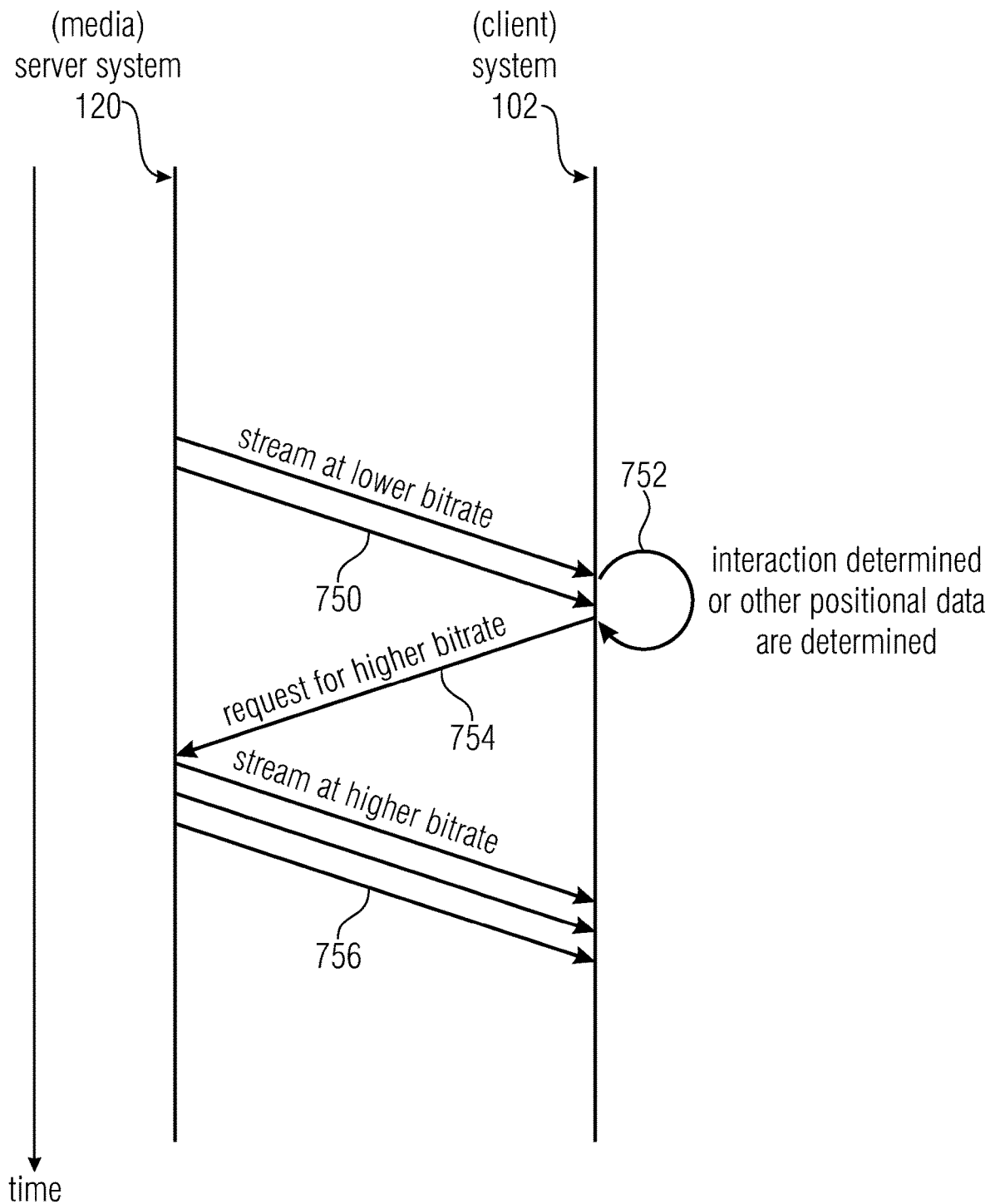

FIG. 7b depicts an interaction between a media server 120 and a system 102 according to the foregoing described sequence of operation diagram. At a certain moment the media server may transmit an audio stream 750 at a lower bitrate, according to foregoing determined lower relevance and audibility level of relevant audio elements of a foregoing scene 150. The system may determine at a subsequent moment 752 that an interaction or a change in positional data occurs.

Such an interaction may result e.g. from either change in positional data in the same scene 150 or e.g. activating a door handle while the user attempts to enter a second scene separated from the first scene by a door provided by the door handle.

A change of current viewport and/or head orientation and/or movement data and/or interaction metadata and/or virtual position may result in a request 754 sent by the system 102 to the media server 120. This request may reflect a higher relevance and audibility level of relevant audio elements determined for that subsequent scene 150. As a response to the request 754 the media server may transmit a stream 756 at a higher bitrate, enabling a plausible and realistic reproduction of the scene 150 by the system 102 at any current user's virtual position.

Figure 8A:
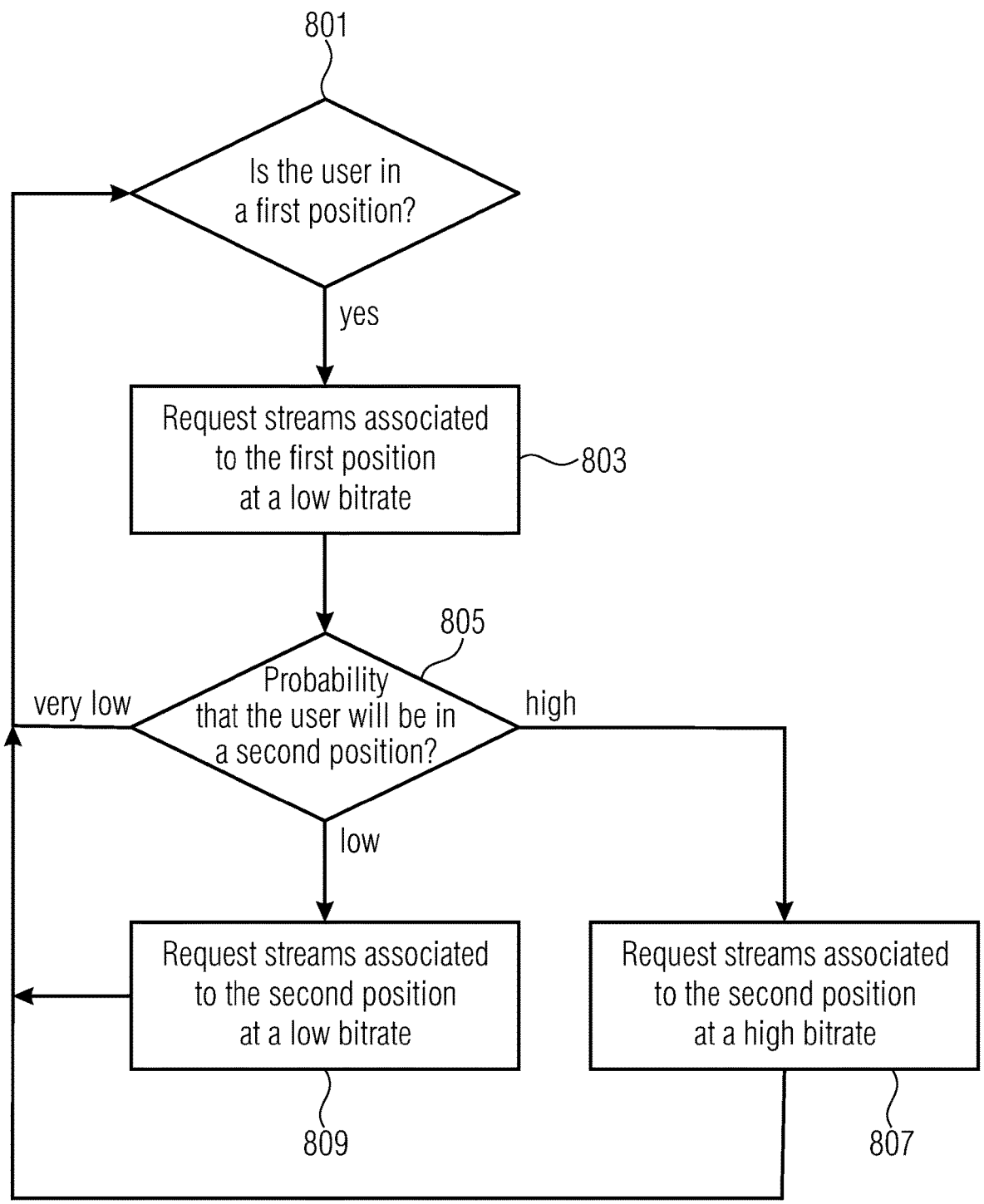

FIG. 8a shows another embodiment of the method for receiving audio streams by a system also in form of a sequence of operation steps in a diagram. At a certain moment 801 a determination of a first current viewport and/or head orientation and/or movement data and/or interaction metadata and/or virtual position may be performed. By deducting an affirmative case, a request of streams associated to the first position defined by a low bitrate may be prepared and transmitted by the system 102 at step 803.

A determining step 805 having three different results may be performed at a subsequent moment. One or two defined threshold(s) may be relevant at this step for determining e.g. a predictive decision regarding a subsequent viewport and/or head orientation and/or movement data and/or interaction metadata and/or virtual position. Therefore, a comparison with a first and/or a second threshold may be performed, regarding the probability of a change into a second position, resulting in e.g. three different subsequent steps to be performed.

At a result reflecting, e.g., a very low probability (e.g., associated to the above comparison with a first predetermined threshold), a new comparison step 801 would be performed.

At a result reflecting a low probability (e.g., higher than the first predetermined threshold but, in examples, lower than a second predetermined threshold higher than the first threshold) may result in a request at step 809 for audio streams 113 at a low bitrate.

At a result reflecting a high probability (e.g., higher than the second predetermined threshold), a request, at step 807, for audio streams 113 at a high bitrate may be performed. A subsequent step to be performed after executing steps 807 or 809 could therefore be again the determining step 801.

Figure 8B:
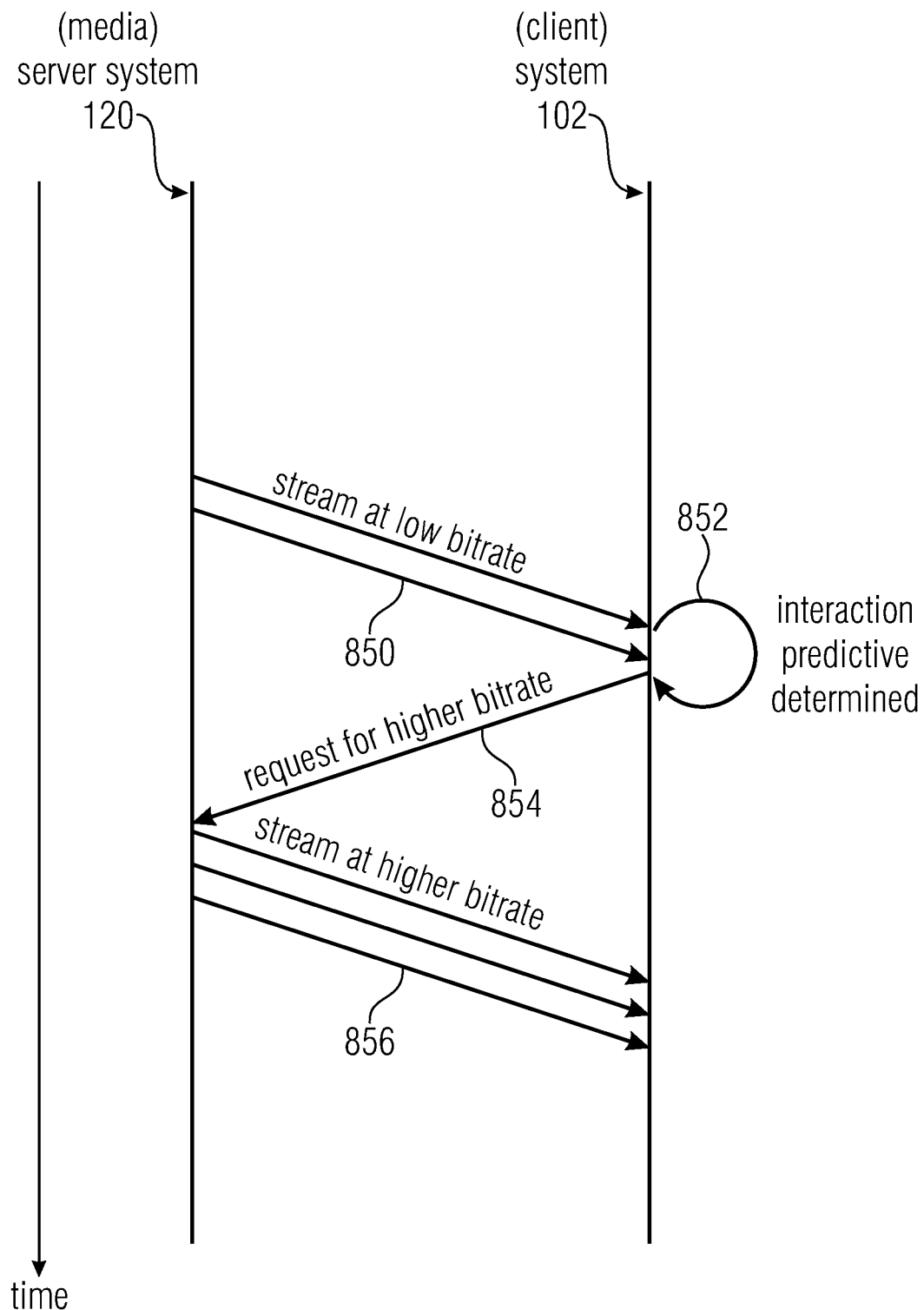

FIG. 8b depicts an interaction between a media server 120 and a system 102 according to only one of the foregoing described sequence of operation diagram. At a certain moment the media server may transmit an audio stream 850 at a low bitrate, according to a foregoing determined low relevance and audibility level of audio elements of a foregoing scene 150. The system may determine at a subsequent moment 852 that an interaction is predictively going to occur. A predictive change of current viewport and/or head orientation and/or movement data and/or interaction metadata and/or virtual position may result in an appropriate request 854 sent by the system 102 to the media server 120. This request may reflect one of the above described cases regarding a high probability of reaching a second position associated with a high bitrate according to the audibility level of the audio elements as may be used for the respective subsequent scene 150. As a response the media server may transmit a stream 856 at a higher bitrate, enabling a plausible and realistic reproduction of the scene 150 by the system 102 at any current user's virtual position.

The system 102 as shown in FIG. 1c is configured to receive audio streams 113 on the basis of another configuration at the client side, wherein the system architecture may use discrete viewpoints based on a solution using multiple audio decoders 1320, 1322. At the client side, the system 102 may embody, for example, parts of the system described in FIG. 1b that additionally or alternatively comprise multiple audio decoders 1320, 1322 that may be configured to decode the individual audio streams as indicated by the metadata processor 1236 for example with a number of audio Elements deactivated.

A mixer/renderer 1238 may be provided in the system 102 being configured to reproduce the final audio scene based on the information about the user location and/or orientation and/or direction of movement, i.e., for example, some of the audio elements which are not audible at that specific location should be disabled or not rendered.

The following embodiments shown in FIGS. 1d, 1e and 1f are based on independent adaptation sets for discrete Viewpoints with flexible adaptation sets. In the case when the user moves in a VR environment, the audio scene may change in a continuous way. For ensuring a good audio experience all the audio elements composing an audio scene at a certain moment in time, may have to be made available to a Media Decoder which can make use of the position information for creating the final audio scene.

If the content is pre-encoded, for a number of pre-defined locations, the system can provide accurate reproduction of the audio scenes at these specific locations under the assumption that these audio scenes do not overlap and the user can "jump/switch" from one location to the next one.

But in the cases when the user "walks" from one location to the next one, audio elements from two (or more) audio scenes can be audible in the same time. A solution for this use cases was provided in the previous systems examples, where independent of the mechanisms provided for decoding multiple audio streams (either using a Muxer with a single Media Decoder or multiple Media Decoder with and additional Mixer/Renderer), the audio streams that describe complete audio scenes have to be provided to the Client.

An optimization is provided in the following by introducing the notion of common audio elements between multiple audio streams.

Discussion on Aspects and Examples

Solution 1: Independent Adaptation Sets for Discrete Locations (Viewpoints).

One way of solving the described problem, is to use complete independent Adaptation Sets for each location. For a better understanding of the solution, FIG. 1a is used as an example scenario. In this example, three different discrete Viewpoints (comprising three different audio scenes) are used for creating a complete VR environment, that the user should be able to move into. Therefore:

The several independent or overlapping Audio Scenes are encoded in a number of Audio Streams. For each Audio Scene, one main stream may be used ore depending on the use case, one main stream and additional auxiliary streams (e.g., some audio objects containing different languages may be encoded in independent streams for efficient delivery). In the example provided, Audio Scene A is encoded into two streams (A1 and A2), Audio Scene B is encoded in three streams (B1, B2 and B3) while Audio Scene C is encoded into three streams (C1, C2 and C3). To be noted that Audio Scene A and Audio Scene B share a number of common elements (in this example two audio objects). Since every scene has to be complete and independent (for independent reproduction, for example on non-VR playback devices), the common elements have to be encoded twice for each scene.

All the Audio Streams are encoded at different bitrates (i.e., different Representations), that allow efficient bitrate adaptation depending on the network connection (i.e., for users using high speed connection the high bitrate coded version is delivered while for users with lower speed network connection a lower bitrate version is delivered).

The Audio Streams are stored on a Media Server, where for each Audio Stream the different encodings at different bitrates (i.e., different Representations) are grouped in one Adaptation Set with the appropriate data signaling the availability of all the created Adaptation Sets.

Additionally, to the Adaptation Sets the Media Server receives information about the location "boundaries" of each Audio Scene and its relation to each Adaptation Set (that may contain e.g., complete audio scene or just individual objects). In this way, each Adaptation Set may be associated with one of the available Audio Scenes. The boundaries of one Audio Scene may be defined, for example, as geometrical coordinates of a sphere (e.g., center and radius).

Each Adaptation Set contains also descriptive information about the locations in which the sound scene or the audio elements are active. For example, if one auxiliary stream contains one or several objects, the Adaptation Set could contain information such as the locations where the objects are audible (e.g., coordinates of the center of a sphere and radius).

the Media Server provides information about the location "boundaries" associated with each Adaptation Set to the Client, for example a DASH Client. For example, this may be embedded into the Media Presentation Description (MPD) XML syntax in case of a DASH delivery environment.

the Client receives information about of the user location and/or orientation and/or direction of movement (or any information characterizing changes triggered by the user's actions)

the Client receives the information about each Adaptation Set, and based on this and the user location and/or orientation and/or direction of movement (or any information characterizing changes triggered by the user's actions, for example comprising x,y,z coordinates and/or yaw, pitch, roll values), the Client selects one, or more Adaptation Sets completely describing an Audio Scene that should be reproduced at the current location of the user.

The Client requests the one, or more Adaptation Sets
Moreover, the Client may select more Adaptation Sets completely describing more than one Audio Scene, and use the Audio Streams corresponding to more than one Audio Scene to create a new Audio Scene that should be reproduced at the current location of the user. For example, if the user walks in the VR environment, and at a moment in time is located in between (or in a location situated at a place where two Audio Scenes have audible effects).

Once the Audio Streams are available, multiple Media Decoders may be used to decode the individual Audio Streams and an additional mixer/renderer 1238 to reproduce the final Audio Scene based on the information about the user location and/or orientation and/or direction of movement (i.e., for example, some of the audio elements which are not audible at that specific location should be disabled or not rendered)

Alternatively, a metadata processor 1236 may be used to manipulate the audio metadata associated with all the Audio Streams, based on the information about the user location and/or orientation and/or direction of movement, in order to:

Select/enable the useful Audio Elements 152 composing the new audio scene;

And to allow the merge of all Audio Streams into a single Audio Stream.

The Media Server delivers the Adaptation Sets that may be used

Alternatively, the Client provides the information about the user positioning to the Media Server and the Media Server provides indication about the Adaptation Sets that may be used.

FIG. 1b shows another example implementation of such a system comprising:

at the encoding side a plurality of Media Encoders that may be used for creating one or more Audio Streams for each available Audio Scene associated with one sound scene part of one Viewpoint a plurality of Media Encoders that may be used for creating one or more video Streams for each available video Scene associated with one video scene part of one Viewpoint. The video encoders are not represented in the figure for simplicity a Media Server that stores multiple audio and video Adaptation Sets comprising different encodings of the same audio and video streams at different bitrates (i.e., different Representations). Additionally, the Media Server contains descriptive information of all Adaptation Sets, which may include availability of all the created Adaptation Sets;

information describing an association of one Adaptation Set to one Audio Scene and/or Viewpoint; In this way, each Adaptation Set may be associated with one of the available Audio Scene;

information describing the "boundaries" of each Audio Scene and/or Viewpoint (that may contain e.g., complete audio scene or just individual objects). The boundaries of one Audio Scene may be defined, for example, as geometrical coordinates of a sphere (e.g., center and radius).

at the client side a system (client system) which may comprise in any of:

a receiving end, that may receive:

information about of the user location and/or orientation and/or direction of movement (or any information characterizing changes triggered by the user's actions)

information about the availability of all the Adaptation Sets and information describing an association of one Adaptation Set to one Audio Scene and/or Viewpoint; and/or information describing the "boundaries" of each Audio Scene and/or Viewpoint (that may contain e.g., complete audio scene or just individual objects). For example, such information may be provided as part as Media Presentation Description (MPD) XML syntax in case of a DASH delivery environment.

a media consumption device side used for content consumption (e.g., based on an HMD). The media consumption device is also responsible for collection information about user location and/or orientation and/or direction of movement (or any information characterizing changes triggered by the user's actions)

a Viewport Processor 1232, that may be configured to receive information about the current viewport that may contain user location and/or orientation and/or direction of movement (or any information characterizing changes triggered by the user's actions) from the media consumption device side.

receive information about and the ROI signaled in the Metadata (Video Viewports signaled as in the OMAF specification).

receive all information available at the receiving end;

decide based on all information received and/or derived from the received and/or available metadata, what Audio/Video Viewpoint it should be reproduced at a certain moment in time. For example, the Viewport Processor 1232 may decide that:

one complete Audio Scene is to reproduced one new Audio Scene has to be created out of all available Audio Scenes (e.g., only some Audio Elements from multiple Audio Scenes are to be reproduced, while other remaining Audio Elements of these Audio Scenes are not to be Reproduced)

a transition between two or more Audio Scenes has to be reproduced a Selection part 1230 configured to select, based on the information received from the Viewport Processor 1232 one, or more, Adaptation Sets out of the available Adaptation Sets as signaled in the information received by the receiving end; the selected Adaptation Sets completely describing the Audio Scene that should be reproduced at the current location of the user. This Audio Scene may be one complete Audio Scene as defined at the Encoding side or a new Audio Scene has to be created out of all available Audio Scenes.

Additionally, in the case when a transition between two or more Audio Scenes is about to happen based on the indication of the Viewport Processor 1232, the Selection part 1230 may be configured to select one, or more, Adaptation Sets out of the available Adaptation Sets as signaled in the information received by the receiving end; the selected Adaptation Sets completely describing the Audio Scene that may need to be reproduced in the near future (e.g., if the user walk in the direction of a next Audio Scene with a certain speed, it may be predicted that the next Audio Scene will be needed and it is selected in advance of the reproduction).

Additionally, some Adaptation Sets corresponding to the neighboring locations may be first selected at lower bitrate (i.e., a Representation encoded at lower bitrate is chosen out the available Representations in one Adaptation Set), and based on the position changes the quality is increased by selecting a higher bitrate for those specific Adaptation Sets (i.e., a Representation encoded at higher bitrate is selected out of the available Representations in one Adaptation Set).

a Download and Switching part that may be configure to:
  request, based on the indication received from the Selection part 1230, one, or more, Adaptation Sets out of the available Adaptation Sets from the Media Server 120;
  receive, one, or more, Adaptation Sets (i.e., one Representation out of all
  Representations available inside each Adaptation Set) out of the available Adaptation Sets from the Media Server 120;
  extract metadata information from all received Audio Streams a Metadata Processor 1236 that may be configured to:
  receive from the Download and Switching information about the Audio Streams received, information that may include the Audio Metadata corresponding to each Audio Stream received
  process and manipulate the Audio Metadata associated with each Audio Stream, based on the information received from the Viewport Processor 1232 that may include information about the user location and/or orientation and/or direction of movement, in order to:
    select/enable the useful Audio Elements 152 composing the new Audio Scene as indicated by the Viewport Processor 1232;
    allow the merge of all Audio Streams into a single Audio Stream.

a Stream Muxer/Merger 1238 that may be configured to merge all selected Audio Streams into one Audio Stream based on the information received from the Metadata Processor 1236, that may include the modified and processed Audio Metadata corresponding to all received Audio Streams a Media Decoder configured to receive and decode at least one Audio stream for the reproduction of the new Audio Scene as indicated by the Viewport Processor 1232 based on the information about the user location and/or orientation and/or direction of movement FIG. 1c shows a system comprising, at the client side, a system (client system) which may embody, for example, parts of the system described in FIG. 1b that additionally or alternatively comprises:
  multiple Media Decoders that may be configured to decode the individual Audio Streams as indicated by the Metadata Processor 1236 (for example with a number of Audio Elements deactivated).
  a mixer/renderer 1238 that may be configured reproduce the final Audio Scene based on the information about the user location and/or orientation and/or direction of movement (i.e., for example, some of the audio elements which are not audible at that specific location should be disabled or not rendered)

Solution 2

FIGS. 1d, 1e and 1f refer to examples according to a Solution 2 of the invention (which may be embodiments of the examples of FIGS. 1a and/or 1b and/or 1c): Independent Adaptation Sets for discrete locations (Viewpoints) with flexible Adaptation Sets.

In the case when the user moves in a VR environment, the Audio Scene 150 may change in a continuous way. For ensuring a good audio experience all the Audio Elements 152 composing an Audio Scene 150 at a certain moment in time, may have to be made available to a Media Decoder which may make use of the position information for creating the final Audio Scene.

If the content is pre-encoded, for a number of pre-defined locations, the system may provide accurate reproduction of the Audio Scenes at these specific locations under the assumption that these Audio Scenes do not overlap and the user may "jump/switch" from one location to the next one.

But in the cases when the user "walks" from one location to the next one, Audio Elements 152 from two (or more) Audio Scenes 150 may be audible in the same time. A solution for this use cases was provided in the previous systems examples, where independent of the mechanisms provided for decoding multiple Audio Streams (either using a Muxer with a single Media Decoder or multiple Media Decoder with and additional Mixer/Renderer 1238), the Audio Streams that describe complete Audio Scenes 150 have to be provided to the Client/system 102.

An optimization is provided in the following by introducing the notion of common Audio Elements 152 between multiple Audio Streams.

FIG. 1d shows an example in which different scenes share at least one audio element (audio object, sound source . . . ). Therefore, the client 102 may receive, for example, one main stream 106A associated only to one scene A (e.g., associated to the environment where the user currently is) and associated to the objects 152A, and one auxiliary stream 106B shared by a different scene B (e.g., a stream in the boundary between the scene A in which the user currently is and a neighboring or adjacent stream B sharing the objects 152B) and associated to the objects 152B.

Therefore, as shown in FIG. 1d:

The several independent or overlapping Audio Scenes are encoded in a number of Audio Streams. The Audio Streams 106 are created in such a way that:
  for each Audio Scene 150, one main stream may be created by containing only the Audio Elements 152 that are part of the respective Audio Scene, but not part of any other Audio Scene; and/or
  for all the Audio Scenes 150 that share Audio Elements 152, the common Audio Elements 152 may be encoded only in auxiliary Audio Streams associated only with one of the Audio Scenes and appropriate metadata information indicating the association with other Audio Scenes is created. Or differently stated the additional metadata indicates the possibility that some Audio Streams may be used together with multiple Audio Scenes; and/or
  depending on the use case, additional auxiliary streams may be created (e.g., some audio objects containing different languages may be encoded in independent streams for efficient delivery).

In the provided embodiment:
  Audio Scene A is encoded into:
    a main Audio Stream (A1, 106A),
    an auxiliary Audio Stream (A2, 106B)
    metadata information that may indicate that some Audio Elements 152B from Audio Scene A are not encoded in these Audio Stream A, but in an auxiliary stream A2 (106B) belonging to different Audio Scene (Audio Scene B)
  Audio Scene B is encoded into:
    a main Audio Stream (B1, 106C),
    an auxiliary Audio Stream (B2),
    an auxiliary Audio Stream (B3), metadata information that may indicate that the Audio Elements 152B from Audio Stream B2 are common Audio Elements 152B that belong also to Audio Scene A.

Audio Scene C is encoded into three streams (C1, C2 and C3).

The Audio Streams 106 (106A, 106B, 106C . . . ) may be encoded at different bitrates (i.e., different Representations), that allow efficient bitrate adaptation, e.g., depending on the network connection (i.e., for users using high speed connection the high bitrate coded version is delivered while for users with lower speed network connection a lower bitrate version is delivered).

The Audio Streams 106 are stored on a Media Server 120, where for each Audio Stream the different encodings at different bitrates (i.e., different Representations) are grouped in one Adaptation Set with the appropriate data signaling the availability of all the created Adaptation Sets. (Multiple representations of streams associated to the same audio signals, but at different bitrates and/or qualities and/or resolutions may be present in the same adaptation set.)

Additionally, to the Adaptation Sets the Media Server 120 may receive information about the location "boundaries" of each Audio Scene and its relation to each Adaptation Set (that may contain e.g., complete audio scene or just individual objects). In this way, each Adaptation Set may be associated with one or more of the available Audio Scenes 150. The boundaries of one Audio Scene may be defined, for example, as geometrical coordinates of a sphere (e.g., center and radius).

Each Adaptation Set may contain also descriptive information about the locations in which the sound scene or the Audio Elements 152 are active. For example, if one auxiliary stream (e.g., A2, 106B) contains one or several objects, the Adaptation Set could contain information such as the locations where the objects are audible (e.g., coordinates of the center of a sphere and radius).

Additionally or in alternative, each Adaptation Set (e.g., the adaptation set associated to the scene B) may contain descriptive information (e.g., metadata) that may indicate that Audio Elements (e.g., 152B) from one Audio Scene (e.g., B) are (also or in addition) encoded in Audio Streams (e.g., 106B) belonging to a different Audio Scene (e.g., A).

the Media Server 120 may provide information about the location "boundaries" associated with each Adaptation Set to the system 102 (Client), for example a DASH Client. For example, this may be embedded into the Media Presentation Description (MPD) XML syntax in case of a DASH delivery environment.

the system 102 (Client) may receive information about of the user location and/or orientation and/or direction of movement (or any information characterizing changes triggered by the user's actions).

the system 102 (Client) may receive information about each Adaptation Set, and based on this and/or the user location and/or orientation and/or direction of movement (or any information characterizing changes triggered by the user's actions, for example comprising x,y,z coordinates and/or yow, pitch, roll values), the system 102 (Client) may select one or more Adaptation Sets completely or partially describing an Audio Scene 150 that should be reproduced at the current location of the user 140.

The system 102 (Client) may request the one, or more Adaptation Sets:

Moreover, the system 102 (Client) may select one or more Adaptation Sets completely or partially describing more than one Audio Scene 150, and use the Audio Streams 106 corresponding to more than one Audio Scene 150 to create a new Audio Scene 150 to be reproduced at the current location of the user 140.

Based on the metadata indicating that Audio Elements 152 are part of multiple Audio Scenes 150, the common Audio Elements 152 may be requested only once for creating the new Audio Scene, instead of requesting them twice, once for each complete Audio Scene.

Once the Audio Streams are available to the client system 102, in examples, one or multiple Media Decoder(s) (104) may be used to decode the individual Audio Streams and/or an additional mixer/renderer to reproduce the final Audio Scene based on the information about the user location and/or orientation and/or direction of movement (i.e., for example, some of the audio elements which are not audible at that specific location should be disabled or not rendered)

Alternatively or in addition, a metadata processor may be used to manipulate the audio metadata associated with all the Audio Streams, based on the information about the user location and/or orientation and/or direction of movement, in order to:

Select/enable the useful Audio Elements 152 (152A-152c) composing the new audio scene; and/or And to allow the merge of all Audio Streams into a single Audio Stream.

The Media Server 120 may deliver the Adaptation Sets that may be used

Alternatively, the system 102 (Client) provides the information about the user 140 positioning to the Media Server 120 and the Media Server provides indication about the Adaptation Sets that may be used.

FIG. 1e shows another example implementation of such a system comprising:

at the encoding side a plurality of Media Encoders 154 that may be used for creating one or more Audio Streams 106 embedding Audio Elements 152 from one or more available Audio Scene 150 associated with one sound scene part of one Viewpoint.

for each Audio Scene 150, one main stream may be created by containing only the Audio Elements 152 that are part of the respective Audio Scene 150, but not part of any other Audio Scene additional auxiliary streams may be created for the same Audio Scene (e.g., some audio objects containing different languages may be encoded in independent streams for efficient delivery).

additional auxiliary streams may be created, that contain:

Audio Elements 152 common to more than one Audio Scene 150 metadata information indicating the association of this auxiliary stream with all other Audio Scenes 150 that share the common Audio Elements 152. Or differently stated the metadata indicates the possibility that some Audio Streams may be used together with multiple Audio Scenes.

- a plurality of Media Encoders that may be used for creating one or more video Streams for each available video Scene associated with one video scene part of one Viewpoint. The video encoders are not represented in the figure for simplicity
- a Media Server 120 that stores multiple audio and video Adaptation Sets comprising different encodings of the same audio and video streams at different bitrates (i.e., different Representations). Additionally, the Media Server 120 contains descriptive information of all Adaptation Sets, which may include
  - availability of all the created Adaptation Sets;
  - information describing an association of one Adaptation Set to one Audio Scene and/or Viewpoint; In this way, each Adaptation Set may be associated with one of the available Audio Scene;
  - information describing the "boundaries" of each Audio Scene and/or Viewpoint (that may contain e.g., complete audio scene or just individual objects). The boundaries of one Audio Scene may be defined, for example, as geometrical coordinates of a sphere (e.g., center and radius).
  - information indicating the association of one Adaptation Set with more than one Audio Scene, that share at least one common Audio Element.
- at the client side a system (client system) which may comprise in any of:
  - a receiving end, that may receive:
    - information about of the user location and/or orientation and/or direction of movement (or any information characterizing changes triggered by the user's actions)
    - information about the availability of all the Adaptation Sets and information describing an association of one Adaptation Set to one Audio Scene and/or Viewpoint; and/or information describing the "boundaries" of each Audio Scene and/or Viewpoint (that may contain e.g., complete audio scene or just individual objects). For example, such information may be provided as part as Media Presentation Description (MPD) XML syntax in case of a DASH delivery environment.
    - information indicating the association of one Adaptation Set with more than one Audio Scene, that share at least one common Audio Element.
  - a media consumption device side used for content consumption (e.g., based on a HMD). The media consumption device is also responsible for collection information about user location and/or orientation and/or direction of movement (or any information characterizing changes triggered by the user's actions)
  - a Viewport Processor 1232, that may be configured to
    - receive information about the current viewport that may contain user location and/or orientation and/or direction of movement (or any information characterizing changes triggered by the user's actions) from the media consumption device side.
    - receive information about and the ROI signaled in the Metadata (Video Viewports signaled as in the OMAF specification).
    - receive all information available at the receiving end;
    - decide based on all information received and/or derived from the received and/or available metadata, what Audio/Video Viewpoint it should be reproduced at a certain moment in time. For example, the Viewport Processor 1232 may decide that:
      - one complete Audio Scene is to reproduced
      - one new Audio Scene has to be created out of all available Audio Scenes (e.g., only some Audio Elements from multiple Audio Scenes are to be reproduced, while other remaining Audio Elements of these Audio Scenes are not to be reproduced)
      - a transition between two or more Audio Scenes has to be reproduced
  - a Selection part 1230 configured to select, based on the information received from the Viewport Processor 1232 one, or more, Adaptation Sets out of the available Adaptation Sets as signaled in the information received by the receiving end; the selected Adaptation Sets completely or partially describing the Audio Scene that should be reproduced at the current location of the user. This Audio Scene may be one complete or partially complete Audio Scene as defined at the Encoding side or a new Audio Scene has to be created out of all available Audio Scenes. Additionally, in the case when Audio Elements 152 belonging to more than one Audio Scene at least one Adaptation Sets is selected based on the information indicating the association of the at least one Adaptation Set with more than one Audio Scene, that contain the same Audio Elements 152.
    Additionally, in the case when a transition between two or more Audio Scenes is about to happen based on the indication of the Viewport Processor 1232, the Selection part 1230 may be configured to select one, or more, Adaptation Sets out of the available Adaptation Sets as signaled in the information received by the receiving end; the selected Adaptation Sets completely describing the Audio Scene that may be needed to be reproduced in the near future (e.g., if the user walk in the direction of a next Audio Scene with a certain speed, it may be predicted that the next Audio Scene will be needed and it is selected in advance of the reproduction).
    Additionally, some Adaptation Sets corresponding to the neighboring locations may be first selected at lower bitrate (i.e., a Representation encoded at lower bitrate is chosen out the available Representations in one Adaptation Set), and based on the position changes the quality is increased by selecting a higher bitrate for those specific Adaptation Sets (i.e., a Representation encoded at higher bitrate is selected out of the available Representations in one Adaptation Set).
  - a Download and Switching part that may be configure to:
    - request, based on the indication received from the Selection part 1230, one, or more, Adaptation Sets out of the available Adaptation Sets from the Media Server 120;
    - receive, one, or more, Adaptation Sets (i.e., one Representation out of all Representations available inside each Adaptation Set) out of the available Adaptation Sets from the Media Server 120;
    - extract metadata information from all received Audio Streams
a Metadata Processor 1236 that may be configured to:
  receive from the Download and Switching information about the Audio Streams received, information that may include the Audio Metadata corresponding to each Audio Stream received
  process and manipulate the Audio Metadata associated with each Audio Stream, based on the information received from the Viewport Processor 1232 that may include information about the user location and/or orientation and/or direction of movement, in order to:
    select/enable the useful Audio Elements 152 composing the new Audio Scene as indicated by the Viewport Processor 1232;
    allow the merge of all Audio Streams into a single Audio Stream.
a Stream Muxer/Merger 1238 that may be configured to merge all selected Audio Streams into one Audio Stream based on the information received from the Metadata Processor 1236, that may include the modified and processed Audio Metadata corresponding to all received Audio Streams
a Media Decoder configured to receive and decode at least one Audio stream for the reproduction of the new Audio Scene as indicated by the Viewport Processor 1232 based on the information about the user location and/or orientation and/or direction of movement FIG. 1*f* shows a system comprising, at the client side, a system (client system) which may embody, for example, parts of the system described in FIG. 5 that additionally or alternatively comprises:
  multiple Media Decoders that may be configured to decode the individual Audio Streams as indicated by the Metadata Processor 1236 (for example with a number of Audio Elements deactivated).
  a mixer/renderer 1238 that may be configured reproduce the final Audio Scene based on the information about the user location and/or orientation and/or direction of movement (i.e., for example, some of the audio elements which are not audible at that specific location should be disabled or not rendered)

File Format Updates for File Playback

For the file format use case multiple main and auxiliary streams may be encapsulated as separate Tracks into a single ISOBMFF file. A single track of such a file would represent a single audio element as mentioned before. Since there is no MPD available, which contains the information that may be used for correct playout, the information needs to be provided on file format level, e.g. by providing/introducing a specific file format box or specific file format boxes on track and movie level. Depending on the use-case, there are different information that may be useful to allow correct rendering of the encapsulated Audio Scenes, however the following set of information is fundamental and should therefore be present:
  Information about the included Audio Scenes, e.g. "location Boundaries"
  Information about all available audio elements, especially which audio element is encapsulated into which track
  Information regarding the location of the encapsulated audio elements
  A list of all audio elements belonging to one Audio Scene, a audio element may belong to multiple Audio Scene With this information all mentioned use cases, including the one with the additional metadata processor and the shared encoding should also work in a file based environment.

Further Considerations on the Examples Above

In examples (e.g., at least one among FIGS. 1*a*-6), at least one scene may be associated to at least one audio element (audio source 152), each audio element being associated to a position and/or area in the visual environment where the audio element is audible, so that different audio streams are provided from the sever system 120 to the client system 102 for different user's positions and/or viewports and/or head orientations and/or movement data and/or interaction metadata and/or virtual positional data in the scene.

In examples, the client system 102 may be configured to decide whether at least one audio element 152 of an audio stream (e.g., A1, A2) and/or one adaptation set is to be reproduced in presence of the current user's viewport and/or head orientation and/or movement data and/or interaction metadata and/or virtual position in the scene, wherein the system 102 is configured to request and/or to receive the at least one audio element at the current user's virtual position.

In examples, the client system (e.g. 102) may be configured to predictively decide whether at least one audio element (152) of an audio stream and/or one adaptation set will become relevant and/or audible based on at least the user's current viewport and/or head orientation and/or movement data and/or interaction metadata and/or virtual positional data (110), and wherein the system is configured to request and/or to receive the at least one audio element and/or audio stream and/or adaptation set at a particular user's virtual position before the predicted user's movement and/or interaction in the scene, wherein the system is configured to reproduce the at least on audio element and/or audio stream, when received, at the particular user's virtual position after the user's movement and/or interaction in the scene. See, for example, FIGS. 8*a* and 8*b* above. In some examples, at least one of the operations of the system 102 or 120 may be performed on the basis of predictive and/or statistical and/or aggregate data.

In examples, the client system (e.g. 102) may be configured to request and/or to receive the at least one audio element (e.g., 152) at a lower bitrate and/or quality level, at the user's virtual position before a user's movement and/or interaction in the scene, wherein the system is configured to request and/or to receive the at least one audio element at a higher bitrate and/or quality level, at the user's virtual position after the user's movement and/or interaction in the scene. See, for example, FIG. 7*b*.

In examples, at least one audio element may be associated to at least one scene, the at last one audio element being associated to a position and/or area in the visual environment associated to the scene, wherein the system is configured to request different streams at different bitrates and/or quality levels for audio elements based on their relevance and/or auditability level at each user's virtual position in the scene, wherein the system is configured to request an audio stream at higher bitrate and/or quality level for audio elements which are more relevant and/or more audible at the current user's virtual position, and/or an audio stream at lower bitrate and/or quality level for audio elements which are less relevant and/or less audible at the current user's virtual position. See, in general terms, FIG. 7*a*. See also FIGS. 2*a* and 2*b* (wherein the more relevant and/or audible sources may be the closer to the user), FIG. 3 (wherein the more relevant and/or audible source is the source of the scene 150a when the user is in position $x_1$, and the more relevant and/or audible source is the source of the scene 150b when the user is in position $x_3$), FIG. 4 (wherein, at time instant $t_2$, the more relevant and/or audible sources may be those of the first scene), FIG. 6 (wherein the more audible sources may be those which are frontally viewed by the user).

In examples, at least one audio element (152) is associated to a scene, each audio element being associated to a position and/or area in the visual environment associated to the scene, wherein the client system 102 is configured to periodically send to the server system 120 the user's current viewport and/or head orientation and/or movement data and/or interaction metadata and/or virtual positional data (110), so that: for a position closer to the at least one audio element (152), a stream at higher bitrate and/or quality is provided, from the server, and for a position more distant from the at least one audio element (152), a stream at lower bitrate and/or quality is provided, from the server. See, for example, FIGS. 2a and 2b.

In examples, a plurality of scenes (e.g. 150A, 150B) may be defined for multiple visual environments such as adjacent and/or neighboring environments, so that first streams are provided associated to a first, current scene (e.g., 150A) and, in case of user's transition (150AB) to a second, further scene (e.g., 150B), to provide both the streams associated to the first scene and the second streams associated to the second scene. See, for example, FIG. 3.

In examples, a plurality of scenes are defined for a first and a second visual environments, the first and second environments being adjacent and/or neighboring environments, wherein first streams associated to the first scene are provided, from the server, for the reproduction of the first scene in case of the user's virtual position being in a first environment associated to the first scene, second streams associated to the second scene are provided, from the server, for the reproduction of the second scene in case of the user's virtual position being in a second environment associated to the second scene, and both first streams associated to the first scene and second streams associated to the second scene are provided in case of the user's virtual position being in a transitional position between the first scene and the second scene. See, for example, FIG. 3.

In examples, first streams associated to the first scene are obtained at a higher bitrate and/or quality when the user is in the first environment associated to the first scene, while the second streams associated to the second scene environment associated to the second environment are obtained at a lower bitrate and/or quality when the user is in the beginning of a transitional position from the first scene to the second scene, and the first streams associated to the first scene are obtained at a lower bitrate and/or quality and the second streams associated to the second scene are obtained at a higher bitrate and/or quality when the user is in the end of a transitional position from the first scene to the second scene. This may be the case, for example, of FIG. 3.

In examples, a plurality of scenes (e.g., 150A, 150B) is defined for multiple visual environments (e.g., adjacent environments), so that the system 102 may requests and/or obtain the streams associated to the current scene at a higher bitrate and/or quality and the streams associated to the second scene at a lower bitrate and/or quality. See, for example, FIG. 4.

In examples, a plurality of N audio elements are defined, and, in case the user's distance to the position or area of these audio elements is larger than a predetermined threshold, the N audio elements are processed to obtain a smaller number M of audio elements (M<N) associated to a position or area close to the position or area of the N audio elements, so as to provide the system with at least one audio stream associated to the N audio elements, in case the user's distance to the position or area of the N audio elements is smaller than a predetermined threshold, or to provide the system with at least one audio stream associated to the M audio elements, in case the user's distance to the position or area of the N audio elements is larger than a predetermined threshold.

See, for example, FIG. 1g.

In examples, at least one visual environment scene is associated to at least one plurality of N audio elements (N>=2), each audio element being associated to a position and/or area in the visual environment, wherein the at least at least one plurality of N audio elements may be provided in at least one representation at high bitrate and/or quality level, and wherein the at least at least one plurality of N audio elements is provided in at least one representation at low bitrate and/or quality level, where the at least one representation is obtained by processing the N audio elements to obtain a smaller number M of audio elements (M<N) associated to a position or area close to the position or area of the N audio elements, wherein the system is configured to request the representation at higher bitrate and/or quality level for the audio elements, in case the audio elements are more relevant and/or more audible at the current user's virtual position in the scene, wherein the system is configured to request the representation at lower bitrate and/or quality level for the audio elements, in case the audio elements are less relevant and/or less audible at the current user's virtual position in the scene. See, for example, FIG. 1g.

In examples, in case the user's distance and/or the relevance and/or the auditability level and/or angular orientation is lower than the predetermined threshold, different streams are obtained for the different audio elements. See, for example, FIG. 1g.

In examples, different audio elements are provided at different viewports, so that, in case one first audio element falls within a current viewport, the first audio element is obtained at a higher bitrate than a second audio element which does not fall within the viewport. See, for example, FIG. 6.

In examples, at least two visual environment scenes are defined, wherein at least one first and second audio elements are associated to a first scene associated to a first visual environment, and at least one third audio element is associated to a second scene associated to a second visual environment, wherein the system 102 is configured to obtain metadata describing that the at least one second audio element is additionally associated with the second visual environment scene, and wherein the system is configured to request and/or receive the at least first and second audio elements, in case the user's virtual position is in the first visual environment, and wherein the system is configured to request and/or receive the at least second and third audio elements, in case the user's virtual position is in the second visual environment scene, and wherein the system is configured to request and/or receive the at least first and second and third audio elements, in case the user's virtual position is in transition between the first visual environment scene and the second visual environment scene. See, for example, FIG. 1d. This may also apply to FIG. 3.

In examples, at least one first audio element may be provided in at least one audio stream and/or adaptation set, and the at least one second audio element is provided in at least one second audio stream and/or adaptation set, and the at least one third audio element is provided in at least one third audio stream and/or adaptation set, and wherein the at least first visual environment scene is described by metadata as a complete scene which may use the at least first and second audio streams and/or adaptation sets, and wherein the second visual environment scene is described by metadata as an incomplete scene which may use the at least third audio stream and/or adaptation set and the at least second audio stream and/or adaptation sets associated with the at least first visual environment scene, wherein the system comprises a metadata processor configured to manipulate the metadata, to allow merging the second audio stream belonging to the first visual environment and the third audio stream associated with the second visual environment into a new single stream, in case the user's virtual position is in the second visual environment. See. For example, FIGS. 1b-1c, 1e, and 1f.

In examples, the system 102 may comprise metadata processor (e.g., 1236) configured to manipulate the metadata in at least one audio stream prior to the at least one audio decoder, based on user's current viewport and/or head orientation and/or movement data and/or interaction metadata and/or virtual positional data.

In examples, the metadata processor (e.g., 1236) may be configured to enable and/or disable at least one audio element in at least one audio stream prior to the at least one audio decoder, based on user's current viewport and/or head orientation and/or movement data and/or interaction metadata and/or virtual positional data, wherein the metadata processor may be configured to disable at least one audio element in at least one audio stream prior to the at least one audio decoder, in case the system decides that the audio element is not to be reproduced anymore as a consequence of a current viewport and/or head orientation and/or movement data and/or interaction metadata and/or virtual positional data, and wherein the metadata processor may be configured to enable at least one audio element in at least one audio stream prior to the at least one audio decoder, in case the system decides the audio element is to be reproduced as a consequence of a user's current viewport and/or head orientation and/or movement data and/or interaction metadata and/or virtual positional data.

Server Side

Here above there is also referred to a server (120) for delivering audio and video streams to a client for a virtual reality, VR, augmented reality, AR, mixed reality, MR, or 360-degree video environment, the video and audio streams to be reproduced in a media consumption device, wherein the server (120) comprises and encoder to encode and/or a storage to store video streams to describe a visual environment, the visual environment being associated to an audio scene; wherein the server further comprises an encoder to encode and/or a storage to store a plurality of streams and/or audio elements and/or adaptation sets to be delivered to the client, the streams and/or audio elements and/or adaptation sets being associated to at least one audio scene, wherein the server is configured to:

select and deliver a video stream on the basis of a request from the client, the video stream being associated to an environment;

select an audio stream and/or audio element and/or adaptation set on the basis of a request from the client, the request being associated to at least the user's current viewport and/or head orientation and/or movement data and/or interaction metadata and/or virtual positional data and to an audio scene associated to the environment; and deliver the audio stream to the client.

Further Embodiments and Variants

Depending on certain implementation requirements, examples may be implemented in hardware. The implementation may be performed using a digital storage medium, for example a floppy disk, a Digital Versatile Disc (DVD), a Blu-Ray Disc, a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a flash memory, having electronically readable control signals stored thereon, which cooperate (or are capable of cooperating) with a programmable computer system such that the respective method is performed. Therefore, the digital storage medium may be computer readable.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine readable carrier. In other words, an example of method is, therefore, a computer program having program instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example comprises a processing unit, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A system for a virtual reality (VR), augmented reality (AR), mixed reality (MR), or 360-degree video environments configured to receive video and audio streams to be reproduced in a media consumption device,
wherein the system comprises:
at least one media video decoder configured to decode video signals from video streams for a representation of VR, AR, MR, or 360-degree video environments to a user, and
at least one audio decoder configured to decode audio signals from audio streams for a representation of audio scenes,
wherein the system is configured to request first audio streams and second audio streams or one audio element of an audio stream or one adaptation set to a server on a basis of at least the user's current viewport or head orientation or movement data or interaction metadata or virtual positional data,
wherein first audio elements in the first audio streams are more relevant or more audible than second audio elements in the second audio streams, wherein the first audio streams are requested or received at a higher bitrate than that of the second audio streams,
wherein a plurality of audio scenes are defined for multiple video environments including adjacent or neighboring video environments,
so that first streams are provided associated to a first audio scene and, in case of user's transition to a second audio scene, to provide both the first streams associated to the first audio scene and second streams associated to the second audio scene,
wherein the first streams associated to the first audio scene are acquired at a higher bitrate when the user is in a first environment associated to the first audio scene,
while the second streams associated to the second audio scene associated to a second environment are acquired at a lower bitrate when the user is in a beginning of a transitional position from the first audio scene to the second audio scene, and
the first streams associated to the first audio scene are acquired at a lower bitrate and the second streams associated to the second audio scene are acquired at a higher bitrate when the user is in an end of a transitional position from the first audio scene to the second audio scene, and
wherein the lower bitrate is lower than the higher bitrate.

2. A system for a virtual reality (VR), augmented reality (AR), mixed reality (MR), or 360-degree video environments configured to receive video and audio streams to be reproduced in a media consumption device,
wherein the system comprises:
at least one media video decoder configured to decode video signals from video streams for a representation of VR, AR, MR or 360-degree video environments to a user, and
at least one audio decoder configured to decode audio signals from at least one audio stream for a representation of an audio scene,
wherein the system is configured to request at least one audio stream to a server on a basis of at least the user's current viewport or head orientation or movement data or interaction metadata or virtual positional data, and
wherein the system is configured to control a request of the at least one audio stream to the server on a basis of a distance of the user's position from the boundaries of neighboring or adjacent video environments associated to different audio scenes,
wherein at least two visual environment scenes are defined, wherein at least one first and second audio elements are associated to a first audio scene associated to a first video environment, and at least one third audio element is associated to a second audio scene associated to a second video environment,
wherein the system is configured to acquire interaction metadata describing that the at least one second audio element is additionally associated with the second video environment,
wherein the system is configured to request or receive the at least one first and second audio elements in case the user's virtual position is in the first video environment,
wherein the system is configured to request or receive the at least one second and third audio elements in case the user's virtual position is in the second video environment, and
wherein the system is configured to request or receive the at least one first and second and third audio elements in case the user's virtual position is in transition between the first video environment and the second video environment.

3. The system of claim 1, configured to provide the server with the user's current viewport or head orientation or movement data or interaction metadata or virtual positional data so as to acquire at least one audio stream or one audio element of an audio stream or one adaptation set from the server.

4. The system of claim 2, configured to provide the server with the user's current viewport or head orientation or movement data or interaction metadata or virtual positional data so as to acquire the at least one audio stream or one audio element of an audio stream or one adaptation set from the server.

5. The system of claim 1, wherein at least one audio scene is associated to at least one audio element, each audio element being associated to a position or area in a video environment where the audio element is audible, so that different audio streams are provided for different user's positions or viewports or head orientations or movement data or interaction metadata or virtual positional data in an audio scene.

6. The system of claim 2, wherein at least one audio scene is associated to at least one audio element, each audio element being associated to a position or area in a video environment where the audio element is audible, so that different audio streams are provided for different user's positions or viewports or head orientations or movement data or interaction metadata or virtual positional data in an audio scene.

7. The system of claim 1, configured to decide whether at least one audio element of an audio stream or one adaptation set is to be reproduced for the current user's viewport or head orientation or movement data or interaction metadata or virtual position in an audio scene, and
wherein the system is configured to request or to receive the at least one audio element at the current user's virtual position.

8. The system of claim 2, configured to decide whether at least one audio element of an audio stream or one adaptation set is to be reproduced for the current user's viewport or head orientation or movement data or interaction metadata or virtual position in an audio scene, and wherein the system is configured to request or to receive the at least one audio element at the current user's virtual position.

9. The system of claim 1, configured to predictively decide whether at least one audio element of an audio stream or one adaptation set will become relevant or audible based on at least the user's current viewport or head orientation or movement data or interaction metadata or virtual positional data,
wherein the system is configured to request or to receive the at least one audio element or audio stream or adaptation set at a particular user's virtual position before a predicted user's movement or interaction in an audio scene, and
wherein the system is configured to reproduce the at least one audio element or audio stream, when received, at the particular user's virtual position after the user's movement or interaction in an audio scene.

10. The system of claim 2, configured to predictively decide whether at least one audio element of an audio stream or one adaptation set will become relevant or audible based on at least the user's current viewport or head orientation or movement data or interaction metadata or virtual positional data,
wherein the system is configured to request or to receive the at least one audio element or audio stream or adaptation set at a particular user's virtual position before a predicted user's movement or interaction in an audio scene, and
wherein the system is configured to reproduce the at least one audio element or audio stream, when received, at the particular user's virtual position after the user's movement or interaction in an audio scene.

11. The system of claim 1, configured to request or to receive the at least one audio element at a lower bitrate, at the user's virtual position before a user's interaction, the interaction resulting from either change in positional data in the same audio scene or entering a next scene separated from the current scene,
wherein the system is configured to request or to receive the at least one audio element at a higher bitrate, at the user's virtual position after the user's interaction in an audio scene.

12. The system of claim 2, configured to request or to receive the at least one audio element at a lower bitrate, at the user's virtual position before a user's interaction, the interaction resulting from either change in positional data in the same audio scene or entering a next scene separated from the current scene,
wherein the system is configured to request or to receive the at least one audio element at a higher bitrate, at the user's virtual position after the user's interaction in an audio scene.

13. The system of claim 1, wherein at least one audio element associated to at least one audio scene is associated to a position or area in a video environment associated to an audio scene,
wherein the system is configured to request or receive streams at higher bitrate for audio elements closer to the user than for audio elements more distant from the user.

14. The system of claim 2, wherein at least one audio element associated to at least one audio scene is associated to a position or area in a video environment associated to an audio scene,
wherein the system is configured to request or receive streams at higher bitrate for audio elements closer to the user than for audio elements more distant from the user.

15. The system of claim 1, wherein at least one audio element is associated to at least one audio scene, the at last one audio element being associated to a position or area in a video environment associated to an audio scene,
wherein the system is configured to request different streams at different bitrates for audio elements based on their relevance or auditability level at each user's virtual position in an audio scene,
wherein the system is configured to request an audio stream at higher bitrate for audio elements which are more relevant or more audible at the current user's virtual position, or
an audio stream at lower bitrate for audio elements which are less relevant or less audible at the current user's virtual position.

16. The system of claim 2, wherein at least one audio element is associated to at least one audio scene, the at last one audio element being associated to a position or area in a video environment associated to an audio scene,
wherein the system is configured to request different streams at different bitrates for audio elements based on their relevance or auditability level at each user's virtual position in an audio scene,
wherein the system is configured to request an audio stream at higher bitrate for audio elements which are more relevant or more audible at the current user's virtual position, or
an audio stream at lower bitrate for audio elements which are less relevant or less audible at the current user's virtual position.

17. The system of claim 1, wherein at least one audio element is associated to an audio scene, each audio element being associated to a position or area in a video environment associated to an audio scene,
wherein the system is configured to periodically send to the server the user's current viewport or head orientation or movement data or interaction metadata or virtual positional data, so that:
for a first position, a stream at higher bitrate is provided, from the server, and
for a second position, a stream at lower bitrate is provided, from the server,
wherein the first position is closer to the at least one audio element than the second position.

18. The system of claim 2, wherein at least one audio element is associated to an audio scene, each audio element being associated to a position or area in a video environment associated to an audio scene,
wherein the system is configured to periodically send to the server the user's current viewport or head orientation or movement data or interaction metadata or virtual positional data, so that:
for a first position, a stream at higher bitrate is provided, from the server, and
for a second position, a stream at lower bitrate is provided, from the server,
wherein the first position is closer to the at least one audio element than the second position.

19. The system of claim 2, wherein a plurality of audio scenes are defined for multiple video environments including adjacent or neighboring video environments,
so that first streams are provided associated to a first audio scene and, in case of user's transition to a second audio scene, to provide both the first streams associated to the first audio scene and the second streams associated to the second audio scene.

20. The system of claim 1, wherein a plurality of audio scenes are defined for a first and a second video environments, the first and second video environments being adjacent or neighboring video environments,
   wherein first streams associated to the first audio scene are provided, from the server, for a reproduction of the first audio scene in case of the user's position or virtual position being in a first video environment associated to the first audio scene,
   second streams associated to the second audio scene are provided, from the server, for a reproduction of the second audio scene in case of the user's position or virtual position being in a second video environment associated to the second audio scene, and
   both first streams associated to the first audio scene and second streams associated to the second audio scene are provided in case of the user's position or virtual position being in a transitional position between the first audio scene and the second audio scene.

21. The system of claim 2, wherein a plurality of audio scenes are defined for a first and a second video environments, the first and second video environments being adjacent or neighboring video environments,
   wherein first streams associated to the first audio scene are provided, from the server, for the reproduction of the first audio scene in case of the user's position or virtual position being in a first video environment associated to the first audio scene,
   second streams associated to the second audio scene are provided, from the server, for the reproduction of the second audio scene in case of the user's position or virtual position being in a second video environment associated to the second audio scene, and
   both first streams associated to the first audio scene and second streams associated to the second audio scene are provided in case of the user's position or virtual position being in a transitional position between the first audio scene and the second audio scene.

22. The system of claim 1, wherein a plurality of audio scenes are defined for a first and a second video environments, which are adjacent or neighboring environments,
   wherein the system is configured to request or receive first streams associated to a first audio scene associated to the first environment, for a reproduction of the first audio scene in case of the user's virtual position being in the first environment,
   wherein the system is configured to request or receive second streams associated to the second audio scene associated to the second environment, for a reproduction of the second audio scene in case of the user's virtual position being in the second environment, and
   wherein the system is configured to request or receive both first streams associated to the first audio scene and second streams associated to the second audio scene in case of the user's virtual position being in a transitional position between the first environment and the second environment.

23. The system of claim 2, wherein a plurality of audio scenes are defined for a first and a second video environments, which are adjacent or neighboring environments,
   wherein the system is configured to request or receive first streams associated to a first audio scene associated to the first environment, for a reproduction of the first audio scene in case of the user's virtual position being in the first environment,
   wherein the system is configured to request or receive second streams associated to the second audio scene associated to the second environment, for a reproduction of the second audio scene in case of the user's virtual position being in the second environment, and
   wherein the system is configured to request or receive both first streams associated to the first audio scene and second streams associated to the second audio scene in case of the user's virtual position being in a transitional position between the first environment and the second environment.

24. The system of claim 1, wherein a plurality of audio scenes is defined for multiple environments including adjacent or neighboring environments,
   so that the system is configured to acquire audio streams associated to a first current audio scene associated to a first, current environment, and,
   in case the distance of the user's position or virtual position from a boundary of an audio scene is below a predetermined threshold, the system further acquires audio streams associated to a second, adjacent or neighboring video environment associated to the second audio scene.

25. The system of claim 2, wherein a plurality of audio scenes is defined for multiple environments including adjacent or neighboring environments,
   so that the system is configured to acquire the audio streams associated to a first current audio scene associated to a first, current environment, and,
   in case the distance of the user's position or virtual position from a boundary of an audio scene is below a predetermined threshold, the system further acquires audio streams associated to a second, adjacent or neighboring video environment associated to the second audio scene.

26. The system of claim 1, wherein a plurality of audio scenes is defined for multiple video environments,
   so that the system requests or acquires the audio streams associated to a current audio scene at a higher bitrate and the audio streams associated to the second audio scene at a lower bitrate,
   wherein the lower bitrate is lower than the higher bitrate.

27. The system of claim 2, wherein a plurality of audio scenes is defined for multiple video environments,
   so that the system requests or acquires the audio streams associated to a current audio scene at a higher bitrate and audio streams associated to the second audio scene at a lower bitrate,
   wherein the lower bitrate is lower than the higher bitrate.

28. The system of claim 1, wherein a plurality of N audio elements are defined, and, in case the user's distance to a position or area of the plurality of N audio elements is larger than a predetermined threshold, the plurality of N audio elements are processed to acquire a smaller number M of audio elements associated to a position or area close to the position or area of the plurality of N audio elements, so as
   to provide the system with at least one audio stream associated to the plurality of N audio elements, in case the user's distance to the position or area of the plurality of N audio elements is smaller than a predetermined threshold, or
   to provide the system with at least one audio stream associated to the M audio elements, in case the user's distance to the position or area of the plurality of N audio elements is larger than a predetermined threshold.

29. The system of claim 2, wherein a plurality of N audio elements are defined, and, in case the user's distance to a position or area of the plurality of N audio elements is larger than a predetermined threshold, the plurality of N audio elements are processed to acquire a smaller number M of audio elements associated to a position or area close to the position or area of the plurality of N audio elements, so as
- to provide the system with at least one audio stream associated to the plurality of N audio elements, in case the user's distance to the position or area of the plurality of N audio elements is smaller than a predetermined threshold, or
- to provide the system with at least one audio stream associated to the M audio elements, in case the user's distance to the position or area of the plurality of N audio elements is larger than a predetermined threshold.

30. The system of claim 1, wherein at least one video environment is associated to a plurality of N audio elements, each audio element being associated to a position or area in a video environment,
wherein at least one of the plurality of N audio elements is provided in at least one representation at high bitrate, and
wherein at least one of the plurality of N audio elements is provided in at least one representation at low bitrate, where the at least one representation is acquired by processing the N audio elements to acquire a smaller number M of audio elements associated to a position or area close to a position or area of the N audio elements,
wherein the system is configured to request a representation at higher bitrate for audio elements, in case the audio elements are more relevant or more audible at the current user's virtual position in an audio scene,
wherein the system is configured to request a representation at lower bitrate for audio elements, in case the audio elements are less relevant or less audible at the current user's virtual position in an audio scene.

31. The system of claim 2, wherein at least one video environment is associated to a plurality of N audio elements, each audio element being associated to a position or area in a video environment,
wherein at least one of the plurality of N audio elements is provided in at least one representation at high bitrate, and
wherein at least one of the plurality of N audio elements is provided in at least one representation at low bitrate, where the at least one representation is acquired by processing the N audio elements to acquire a smaller number M of audio elements associated to a position or area close to a position or area of the N audio elements,
wherein the system is configured to request a representation at higher bitrate for audio elements, in case the audio elements are more relevant or more audible at the current user's virtual position in an audio scene,
wherein the system is configured to request a representation at lower bitrate for audio elements, in case the audio elements are less relevant or less audible at the current user's virtual position in an audio scene.

32. The system of claim 17, wherein, in case the user's distance is lower than a predetermined distance threshold, or the relevance is lower than a predetermined relevance threshold, or the audibility level is lower than a predetermined threshold, different audio streams are acquired for the different audio elements.

33. The system of claim 1, configured to request or acquire audio streams on a basis of the user's orientation or user's direction of movement or user's interactions in an audio scene.

34. The system of claim 2, configured to request or acquire a audio streams on a basis of the user's orientation or user's direction of movement or user's interactions in an audio scene.

35. The system of claim 1, wherein the viewport is associated to the position or virtual position or movement data or head orientation.

36. The system of claim 2, wherein the viewport is associated to the position or virtual position or movement data or head orientation.

37. The system of claim 1, wherein different audio elements are provided at different viewports, wherein the system is configured to request or receive, in case one first audio element falls within a viewport, the first audio element at a higher bitrate than a second audio element which does not fall within the viewport.

38. The system of claim 2, wherein different audio elements are provided at different viewports, wherein the system is configured to request or receive, in case one first audio element falls within a viewport, the first audio element at a higher bitrate than a second audio element which does not fall within the viewport.

39. The system of claim 2, configured so as to request or receive first audio streams and second audio streams, wherein the first audio elements in the first audio streams are more relevant or more audible than the second audio elements in the second audio streams,
wherein the first audio streams are requested or received at a higher bitrate than that of the second audio streams.

40. The system of claim 2, wherein the system comprises a metadata processor configured to manipulate metadata in at least one audio stream prior to the at least one audio decoder based on user's current viewport or head orientation or movement data or interaction metadata or virtual positional data.

41. The system of claim 1, configured to disable the decoding of audio elements element selected the basis of the user's current viewport or head orientation or movement data or metadata or virtual position.

42. The system of claim 2, configured to disable the decoding of audio elements element selected the basis of the user's current viewport or head orientation or movement data or metadata or virtual position.

43. The system of claim 1, configured to merge at least one first audio stream associated to a current audio scene to at least one stream associated to a neighboring, adjacent or future audio scene.

44. The system of claim 2, configured to merge at least one first audio stream associated to a current audio scene to at least one stream associated to a neighboring, adjacent or future audio scene.

45. The system of claim 1, configured to acquire or collect statistical or aggregated data on the user's current viewport or head orientation or movement data or metadata or virtual positional data, so as to transmit the request to the server associated to the statistical or aggregated data.

46. The system of claim 2, configured to acquire or collect statistical or aggregated data on the user's current viewport or head orientation or movement data or metadata or virtual positional data, so as to transmit the request to the server associated to the statistical or aggregated data.

47. The system of claim 1, configured to deactivate the decoding or reproduction of at least one stream on a basis of metadata associated to the at least one stream and on the basis of the user's current viewport or head orientation or movement data or metadata or virtual positional data.

48. The system of claim 2, configured to deactivate the decoding or reproduction of at least one stream on a basis of metadata associated to the at least one stream and on the basis of the user's current viewport or head orientation or movement data or metadata or virtual positional data.

49. The system of claim 1, further configured to:
manipulate metadata associated with a group of selected audio streams based on at least the user's current or estimated viewport or head orientation or movement data or metadata or virtual positional data, so as to:
select or activate audio elements composing an audio scene to be reproduced; or
merge all selected audio streams into a single audio stream.

50. The system of claim 2, further configured to:
manipulate metadata associated with a group of selected audio streams based on at least the user's current or estimated viewport or head orientation or movement data or metadata or virtual positional data, so as to:
select or activate audio elements composing an audio scene to be reproduced; or
merge all selected audio streams into a single audio stream.

51. The system of claim 1, wherein information is provided from the server, for each audio element or audio object, wherein the information includes descriptive information about locations in which an audio scene or the audio elements are active.

52. The system of claim 2, wherein information is provided from the server, for each audio element or audio object, wherein the information includes descriptive information about locations in which an audio scene or the audio elements are active.

53. The system of claim 1, configured to choose between reproducing one audio scene and composing or mixing or muxing or superposing or combining at least two audio scenes on the basis of the current or future or viewport or head orientation or movement data or metadata or virtual position or a user's selection, the two audio scenes being associated to different neighboring or adjacent video environments.

54. The system of claim 2, configured to choose between reproducing one audio scene and composing or mixing or muxing or superposing or combining at least two audio scenes on the basis of the current or future or viewport or head orientation or movement data or metadata or virtual position or a user's selection, the two audio scenes being associated to different neighboring or adjacent video environments.

55. The system of claim 1, configured to create or use at least one adaptation sets so that:
a number of adaptation sets are associated with one audio scene; or
additional information is provided that relates each adaptation set to one viewpoint, or one audio scene; or
additional information is provided that includes
information about boundaries of one audio scene, or
information about a relation between one adaptation set and one audio scene, wherein an audio scene is encoded in three streams that are encapsulated into three Adaptation Sets adaptation sets, or
information about a connection between boundaries of an audio scene and the multiple adaptation sets.

56. The system of claim 2, configured to create or use at least one adaptation sets so that:
a number of adaptation sets are associated with one audio scene; or
additional information is provided that relates each adaptation set to one viewpoint, or one audio scene; or
additional information is provided that includes
information about boundaries of one audio scene, or
information about a relation between one adaptation set and one audio scene, wherein an audio scene is encoded in three streams that are encapsulated into three adaptation sets,) or
information about a connection between boundaries of an audio scene and the multiple adaptation sets.

57. The system according to claim 1, configured to:
receive a stream for an audio scene associated to a neighboring or adjacent environment;
start decoding or reproducing an audio stream for the neighboring or adjacent environment at a detection of a transition of a boundary between two environments.

58. The system according to claim 2, configured to:
receive a stream for an audio scene associated to a neighboring or adjacent environment;
start decoding or reproducing an audio stream for the neighboring or adjacent environment at a detection of a transition of a boundary between two environments.

59. The system of claim 1, wherein the system is further configured to:
request or receive at least one first adaptation set comprising at least one audio stream associated with at least one first audio scene;
request or receive at least one second adaptation set comprising at least one second audio stream associated with at least two audio scenes, including the at least one first audio scene; and
merge the at least one first audio stream and the at least one second audio stream into a new audio stream to be decoded, based on metadata available regarding user's current viewport or head orientation or movement data or metadata or virtual positional data or information describing an association of the at least one first adaptation set to the at least one first audio scene or an association of the at least one second adaptation set to the at least one first audio scene.

60. The system of claim 2, wherein the system is further configured to:
request or receive at least one first adaptation set comprising at least one audio stream associated with at least one first audio scene;
request or receive at least one second adaptation set comprising at least one second audio stream associated with at least two audio scenes, including the at least one first audio scene; and
merge the at least one first audio stream and the at least one second audio stream into a new audio stream to be decoded, based on metadata available regarding user's current viewport or head orientation or movement data or metadata or virtual positional data or information describing an association of the at least one first adaptation set to the at least one first audio scene or an association of the at least one second adaptation set to the at least one first audio scene.

61. The system of claim 1, configured to receive information about user's current viewport or head orientation or movement data or metadata or virtual positional data or any information characterizing changes triggered by the user's actions; and receive information about an availability of adaptation sets and information describing an association of at least one adaptation set to at least one audio scene or viewpoint or viewport or position or virtual position or movement data or orientation.

62. The system of claim 2, configured to receive information about user's current viewport or head orientation or movement data or metadata or virtual positional data or any information characterizing changes triggered by the user's actions; and receive information about an availability of adaptation sets and information describing an association of at least one adaptation set to at least one audio scene or viewpoint or viewport or position or virtual position or movement data or orientation.

63. The system of claim 1, configured to decide if at least one audio element from at least one audio scene embedded in at least one audio stream and at least one additional audio element from at least one additional audio scene embedded in at least one additional audio stream are to be reproduced; and cause, in case of a positive decision, an operation of merging or composing or muxing or superposing or combining at the least one additional stream of the additional audio scene to the at least one stream of the at least one audio scene.

64. The system of claim 2, configured to decide if at least one audio element from at least one audio scene embedded in at least one audio stream and at least one additional audio element from at least one additional audio scene embedded in at least one additional audio stream are to be reproduced; and cause, in case of a positive decision, an operation of merging or composing or muxing or superposing or combining at the least one additional stream of the additional audio scene to the at least one stream of the at least one audio scene.

65. The system of claim 1, configured to manipulate audio metadata associated with selected audio streams, based on at least the user's current viewport or head orientation or movement data or metadata or virtual positional data, in order to:

select or enable or activate the audio elements composing an audio scene decided to be reproduced; and enable the merge of all selected audio streams into a single audio stream.

66. The system of claim 2, configured to manipulate audio metadata associated with selected audio streams, based on at least the user's current viewport or head orientation or movement data or metadata or virtual positional data, in order to:

select or enable or activate the audio elements composing an audio scene decided to be reproduced; and enable the merge of all selected audio streams into a single audio stream.

67. A system for a virtual reality (VR), augmented reality (AR), mixed reality (MR), or 360-degree video environments configured to receive video and audio streams to be reproduced in a media consumption device, wherein the system comprises:

at least one media video decoder configured to decode video signals from video streams for a representation of VR, AR, MR, or 360-degree video environments to a user, and at least one audio decoder configured to decode audio signals from audio streams for a representation of audio scenes, wherein the system is configured to request first audio streams and second audio streams or one audio element of an audio stream or one adaptation set to a server on a basis of at least the user's current viewport or head orientation or movement data or interaction metadata or virtual positional data, wherein first audio elements in the first audio streams are more relevant or more audible than second audio elements in the second audio streams, wherein the first audio streams are requested or received at a higher bitrate than that of the second audio streams, wherein at least two visual environment scenes are defined, wherein at least one first and second audio elements are associated to a first audio scene associated to a first video environment, and at least one third audio element is associated to a second audio scene associated to a second video environment, wherein the system is configured to acquire interaction metadata describing that the at least one second audio element is additionally associated with the second video environment, wherein the system is configured to request or receive the at least one first and second audio elements in case the user's virtual position is in the first video environment, wherein the system is configured to request or receive the at least one second and third audio elements in case the user's virtual position is in the second video environment, and wherein the system is configured to request or receive the at least one first and second and third audio elements in case the user's virtual position is in transition between the first video environment and the second video environment.

68. The system of claim 67, wherein the at least one first audio element is provided in at least one audio stream or adaptation set, and the at least one second audio element is provided in at least one second audio stream or adaptation set, and the at least one third audio element is provided in at least one third audio stream or adaptation set, and wherein the at least one first video environment is described by interaction metadata as an audio scene which may use the at least one first and second audio streams or adaptation sets, and wherein the second video environment is described by interaction metadata as an audio scene which may use the at least one third audio stream or adaptation set and the at least one second audio stream or adaptation sets associated with the at least one first video environment, wherein the system comprises a metadata processor configured to manipulate the interaction metadata, to merge the second audio stream belonging to the first video environment and the third audio stream associated with the second video environment into a new single stream, in case the user's virtual position is in the second video environment.

69. A system for a virtual reality (VR), augmented reality (AR), mixed reality (MR), or 360-degree video environments configured to receive video and audio streams to be reproduced in a media consumption device, wherein the system comprises:
at least one media video decoder configured to decode video signals from video streams for a representation of VR, AR, MR or 360-degree video environments to a user, and
at least one audio decoder configured to decode audio signals from audio streams for a representation of audio scenes,
wherein the system is configured to request first audio streams and second audio streams or one audio element of an audio stream or one adaptation set to a server on a basis of at least the user's current viewport or head orientation or movement data or interaction metadata or virtual positional data,
wherein first audio elements in the first audio streams are more relevant or more audible than second audio elements in the second audio streams, wherein the first audio streams are requested or received at a higher bitrate than that of the second audio streams,
wherein the system comprises a metadata processor configured to manipulate metadata in at least one audio stream prior to the at least one audio decoder based on user's current viewport or head orientation or movement data or interaction metadata or virtual positional data,
wherein the metadata processor is configured to enable or disable at least one audio element in at least one audio stream prior to the at least one audio decoder based on user's current viewport or head orientation or movement data or interaction metadata or virtual positional data, wherein
the metadata processor is configured to disable at least one audio element in at least one audio stream prior to the at least one audio decoder in case the system decides that the audio element is not to be reproduced anymore as a consequence of a current viewport or head orientation or movement data or interaction metadata or virtual positional data, and wherein
the metadata processor is configured to enable at least one audio element in at least one audio stream prior to the at least one audio decoder, in case the system decides the audio element is to be reproduced as a consequence of a user's current viewport or head orientation or movement data or interaction metadata or virtual positional data.

70. A server for delivering audio and video streams to a client for a virtual reality (VR), augmented reality (AR), mixed reality (MR), or 360-degree video environments, the video and audio streams to be reproduced in a media consumption device,
wherein the server comprises an encoder to encode or a storage to store video streams to describe a video environment, the video environment being associated to an audio scene;
wherein the server further comprises an encoder to encode or a storage to store a plurality of streams or audio elements or adaptation sets to be delivered to the client, the audio streams or audio elements or adaptation sets being associated to at least one audio scene,
wherein the server is configured to:
select and deliver a video stream on a basis of a request from the client, the video stream being associated to an environment;
select an audio stream or audio element or adaptation set on a basis of a request from the client, the request being associated to at least the user's current viewport or head orientation or movement data or interaction metadata or virtual positional data and to an audio scene associated to the environment; and
deliver the audio stream to the client,
wherein the request is based on a distance of the user's position from the boundaries of neighboring or adjacent video environments associated to different audio scenes
wherein at least two visual environment scenes are defined, wherein at least one first and second audio elements are associated to a first audio scene associated to a first video environment, and at least one third audio element is associated to a second audio scene associated to a second video environment,
wherein the server is configured to provide interaction metadata describing that the at least one second audio element is additionally associated with the second video environment,
wherein the server is configured to provide the at least one first and second audio elements in case the user's virtual position is in the first video environment,
wherein the server is configured to provide the at least one second and third audio elements in case the user's virtual position is in the second video environment, and
wherein the server is configured to provide the at least one first and second and third audio elements in case the user's virtual position is in transition between the first video environment and the second video environment.

71. A server for delivering audio and video streams to a client for a virtual reality (VR), augmented reality (AR), mixed reality (MR), or 360-degree video environments, the video and audio streams to be reproduced in a media consumption device,
wherein the server comprises an encoder to encode or a storage to store video streams to describe a video environment, the video environment being associated to an audio scene;
wherein the server further comprises an encoder to encode or a storage to store a plurality of audio streams or audio elements or adaptation sets to be delivered to the client, the audio streams or audio elements or adaptation sets being associated to at least one audio scene,
wherein the server is configured to:
select and deliver a video stream on a basis of a request from the client, the video stream being associated to an environment;
select an audio stream or audio element or adaptation set on a basis of a request from the client, the request being associated to at least the user's current viewport or head orientation or movement data or interaction metadata or virtual positional data and to an audio scene associated to the environment; and
deliver the audio stream to the client,
wherein first audio elements in the first audio streams are more relevant or more audible than second audio elements in the second audio streams, wherein the first audio streams are requested or received at a higher bitrate than that of the second audio streams,
wherein a plurality of audio scenes are defined for multiple video environments including adjacent or neighboring video environments,
so that first streams are provided associated to a first audio scene and, in case of user's transition to a second audio scene, to provide both the first streams associated to the first audio scene and the second streams associated to the second audio scene,
wherein the first streams associated to the first audio scene are at a higher bitrate when the user is in a first environment associated to the first audio scene, while the second streams associated to the second audio scene associated to a second environment are at a lower bitrate when the user is in a beginning of a transitional position from the first audio scene to the second audio scene, and the first streams associated to the first audio scene are at a lower bitrate and the second streams associated to the second audio scene are at a higher bitrate when the user is in an end of a transitional position from the first audio scene to the second audio scene, wherein the lower bitrate is lower than the higher bitrate.

72. The server of claim 70, wherein the audio streams are encapsulated into adaptation sets, each adaptation set including a plurality of streams associated to different representations, at different bitrate, of a same audio content, wherein the selected adaptation set is selected on a basis of the request from the client.

73. The server of claim 71, wherein the audio streams are encapsulated into adaptation sets, each adaptation set including a plurality of streams associated to different representations, at different bitrate, of a same audio content, wherein the selected adaptation set is selected on a basis of the request from the client.

74. A method for a virtual reality (VR), augmented reality (AR), mixed reality (MR), or 360-degree video environments configured to receive video and/audio streams to be reproduced in a media consumption device, comprising:

decoding video signals from video streams for a representation of VR, AR, MR or 360-degree video environments to a user, decoding audio signals from audio streams for a representation of audio scenes, requesting to, or acquiring from, a server at least one audio stream on a basis of the user's current viewport or positional data or head orientation or movement data or metadata or virtual positional data or metadata, and controlling a request of the at least one stream to the server on a basis of a distance of the user's position from boundaries of neighboring or adjacent video environments associated to different audio scenes wherein at least two visual environment scenes are defined, wherein at least one first and second audio elements are associated to a first audio scene associated to a first video environment, and at least one third audio element is associated to a second audio scene associated to a second video environment, wherein the method includes acquiring interaction metadata describing that the at least one second audio element is additionally associated with the second video environment, wherein the method includes requesting or receiving the at least one first and second audio elements in case the user's virtual position is in the first video environment, wherein the method includes requesting or receiving the at least one second and third audio elements in case the user's virtual position is in the second video environment, and wherein the method includes requesting or receiving the at least one first and second and third audio elements in case the user's virtual position is in transition between the first video environment and the second video environment.

75. A method for a virtual reality (VR), augmented reality (AR), mixed reality (MR), or 360-degree video environments configured to receive video and/audio streams to be reproduced in a media consumption device, comprising:

decoding video signals from video streams for a representation of VR, AR, MR or 360-degree video environments to a user, decoding audio signals from audio streams for a representation of audio scenes, requesting to, or acquiring from, a server at least one audio stream on a basis of the user's current viewport or positional data or head orientation or movement data or metadata or virtual positional data or metadata, and wherein first audio elements in the first audio streams are more relevant or more audible than second audio elements in the second audio streams, wherein the first audio streams are requested or received at a higher bitrate than that of the second audio streams wherein a plurality of audio scenes are defined for multiple video environments including adjacent or neighboring video environments, so that first streams are provided associated to a first audio scene and, in case of user's transition to a second audio scene, to provide both the first streams associated to the first audio scene and the second streams associated to the second audio scene, wherein the first streams associated to the first audio scene are acquired at a higher bitrate when the user is in a first environment associated to the first audio scene, while the second streams associated to the second audio scene associated to the second environment are acquired at a lower bitrate when the user is in a beginning of a transitional position from the first audio scene to the second audio scene, and the first streams associated to the first audio scene are acquired at a lower bitrate and the second streams associated to the second audio scene are acquired at a higher bitrate when the user is in an end of a transitional position from the first audio scene to the second audio scene, wherein the lower bitrate is lower than the higher bitrate.

76. A non-transitory digital storage medium having a computer program stored thereon to perform a method for a virtual reality (VR), augmented reality (AR), mixed reality (MR), or 360-degree video environments configured to receive video and/audio streams to be reproduced in a media consumption device, when the computer program is run by a computer, the method comprising:

decoding video signals from video streams for a representation of VR, AR, MR or 360-degree video environments to a user, decoding audio signals from audio streams for a representation of audio scenes, requesting to, or acquiring from, a server at least one audio stream on a basis of the user's current viewport or positional data or head orientation or movement data or metadata or virtual positional data or metadata, and controlling the request of the at least one stream to the server on a basis of a distance of the user's position from boundaries of neighboring or adjacent video environments associated to different audio scenes, wherein at least two visual environment scenes are defined, wherein at least one first and second audio elements are associated to a first audio scene associated to a first video environment, and at least one third audio element is associated to a second audio scene associated to a second video environment, wherein the method includes acquiring interaction metadata describing that the at least one second audio element is additionally associated with the second video environment, wherein the method includes requesting or receiving the at least one first and second audio elements in case the user's virtual position is in the first video environment, wherein the method includes requesting or receiving the at least one second and third audio elements in case the user's virtual position is in the second video environment, and wherein the method includes requesting or receiving the at least one first and second and third audio elements in case the user's virtual position is in transition between the first video environment and the second video environment.

77. A non-transitory digital storage medium having a computer program stored thereon to perform a method for a virtual reality (VR), augmented reality (AR), mixed reality (MR), or 360-degree video environments configured to receive video and/audio streams to be reproduced in a media consumption device, when the computer program is run by a computer, the method comprising:
  decoding video signals from video streams for a representation of VR, AR, MR or 360-degree video environments to a user,
  decoding audio signals from audio streams for a representation of audio scenes,
  requesting to, or acquiring from, a server at least one audio stream on a basis of the user's current viewport or positional data or head orientation or movement data or metadata or virtual positional data or metadata, and wherein first audio elements in the first audio streams are more relevant or more audible than second audio elements in the second audio streams, wherein the first audio streams are requested or received at a higher bitrate than that of the second audio streams, wherein a plurality of audio scenes are defined for multiple video environments including adjacent or neighboring video environments, so that first streams are provided associated to a first audio scene and, in case of user's transition to a second audio scene, to provide both the first streams associated to the first audio scene and the second streams associated to the second audio scene, wherein the first streams associated to the first audio scene are acquired at a higher bitrate when the user is in a first environment associated to the first audio scene while the second streams associated to the second audio scene associated to the second environment are acquired at a lower bitrate when the user is in a beginning of a transitional position from the first audio scene to the second audio scene, and the first streams associated to the first audio scene are acquired at a lower bitrate and the second streams associated to the second audio scene are acquired at a higher bitrate when the user is in an end of a transitional position from the first audio scene to the second audio scene, wherein the lower bitrate is lower than the higher bitrate.

* * * * *